US012025981B2

(12) United States Patent
Levandowski et al.

(10) Patent No.: US 12,025,981 B2
(45) Date of Patent: Jul. 2, 2024

(54) SYSTEM AND METHOD FOR AUTOMATICALLY DETECTING ERRATIC BEHAVIOUR OF ANOTHER VEHICLE WITH A VEHICLE'S AUTONOMOUS DRIVING SYSTEM

(71) Applicant: KACHE.AI, San Francisco, CA (US)

(72) Inventors: Anthony Levandowski, San Francisco, CA (US); Catherine Culkin, San Francisco, CA (US)

(73) Assignee: Kache.AI, San Francisco, CA (US)

( * ) Notice: Subject to any disclaimer, the term of this patent is extended or adjusted under 35 U.S.C. 154(b) by 68 days.

(21) Appl. No.: 16/796,334

(22) Filed: Feb. 20, 2020

(65) Prior Publication Data

US 2021/0018917 A1 Jan. 21, 2021

Related U.S. Application Data

(63) Continuation of application No. 16/511,968, filed on Jul. 15, 2019.

(51) Int. Cl.
*G05D 1/00* (2006.01)
*G05D 1/02* (2020.01)
(Continued)

(52) U.S. Cl.
CPC ......... *G05D 1/0088* (2013.01); *G05D 1/0287* (2013.01); *G06N 20/00* (2019.01);
(Continued)

(58) Field of Classification Search
None
See application file for complete search history.

(56) References Cited

U.S. PATENT DOCUMENTS 9,524,648 B1 * 12/2016 Gopalakrishnan ... G08G 5/0069
10,564,639 B1 2/2020 Zhu
(Continued)

FOREIGN PATENT DOCUMENTS

KR 10-2001-0095460 11/2001

OTHER PUBLICATIONS

PCT International Preliminary Report on Patentability in International Application PCT/US2019/041720, dated Jan. 28, 2021, 13 pages.
(Continued)

*Primary Examiner* — Christian Chace
*Assistant Examiner* — Katherine Marie Fitzharris
(74) *Attorney, Agent, or Firm* — Spencer Fane, LLP

(57) ABSTRACT

Systems and methods for implementing one or more autonomous features for autonomous and semi-autonomous control of one or more vehicles are provided. More specifically, image data may be obtained from an image acquisition device and processed utilizing one or more machine learning models to identify, track, and extract one or more features of the image utilized in decision making processes for providing steering angle and/or acceleration/deceleration input to one or more vehicle controllers. In some instances, techniques may be employed such that the autonomous and semi-autonomous control of a vehicle may change between vehicle follow and lane follow modes. In some instances, at least a portion of the machine learning model may be updated based on one or more conditions.

20 Claims, 44 Drawing Sheets

(51) Int. Cl.
*G06N 20/00* (2019.01)
*G06T 7/292* (2017.01)
*G06T 7/593* (2017.01)
*G06T 7/80* (2017.01)
*H04N 13/246* (2018.01)

(52) U.S. Cl.
CPC .............. *G06T 7/292* (2017.01); *G06T 7/593* (2017.01); *G06T 7/80* (2017.01); *G06T 7/85* (2017.01); *H04N 13/246* (2018.05); *G05D 2201/0213* (2013.01); *G06T 2207/10012* (2013.01)

(56) References Cited

U.S. PATENT DOCUMENTS

| | | | | |
|---|---|---|---|---|
| 2013/0073138 | A1 | 3/2013 | Callow | |
| 2014/0324268 | A1 | 10/2014 | Montemerlo | |
| 2015/0081156 | A1 | 3/2015 | Trepagnier | |
| 2015/0105961 | A1 | 4/2015 | Callow | |
| 2015/0178578 | A1* | 6/2015 | Hampiholi | G08G 1/205 348/149 |
| 2016/0068156 | A1 | 3/2016 | Horii | |
| 2016/0068158 | A1 | 3/2016 | Elwart | |
| 2017/0267237 | A1 | 9/2017 | Oyama | |
| 2018/0060555 | A1 | 3/2018 | Boesen | |
| 2018/0096541 | A1 | 4/2018 | O'Brien et al. | |
| 2018/0107215 | A1 | 4/2018 | Djuric | |
| 2018/0188742 | A1 | 7/2018 | Wheeler | |
| 2018/0194286 | A1 | 7/2018 | Stein | |
| 2018/0237012 | A1* | 8/2018 | Jammoussi | H04W 4/46 |
| 2018/0348763 | A1 | 12/2018 | Jiang | |
| 2018/0349782 | A1 | 12/2018 | Zheng | |
| 2019/0025843 | A1 | 1/2019 | Wilkinson | |
| 2019/0086914 | A1* | 3/2019 | Yen | G05D 1/0212 |
| 2019/0088135 | A1* | 3/2019 | Do | G05D 1/0055 |
| 2019/0147255 | A1 | 5/2019 | Homayounfar | |
| 2019/0206260 | A1 | 7/2019 | Pilkington | |
| 2019/0258251 | A1 | 8/2019 | Ditty | |
| 2019/0329768 | A1 | 10/2019 | Shalev-Shwartz | |
| 2019/0369637 | A1 | 12/2019 | Shalev-Shwartz | |
| 2019/0377354 | A1 | 12/2019 | Shalev-Shwartz | |
| 2019/0384303 | A1 | 12/2019 | Muller | |
| 2020/0019165 | A1 | 1/2020 | Levandowski | |
| 2020/0183395 | A1 | 6/2020 | Levandowski | |
| 2020/0192372 | A1 | 6/2020 | Levandowski | |
| 2020/0192373 | A1 | 6/2020 | Levandowski | |
| 2020/0192374 | A1 | 6/2020 | Riggs | |
| 2020/0192375 | A1 | 6/2020 | Riggs | |
| 2020/0192376 | A1 | 6/2020 | Levandowski | |
| 2020/0192377 | A1 | 6/2020 | Levandowski | |
| 2020/0192378 | A1 | 6/2020 | Levandowski | |
| 2020/0192379 | A1 | 6/2020 | Levandowski | |
| 2020/0192380 | A1 | 6/2020 | Bernstein | |
| 2020/0192381 | A1 | 6/2020 | Levandowski | |
| 2020/0201329 | A1 | 6/2020 | Levandowski | |
| 2020/0223451 | A1 | 7/2020 | Shashua | |
| 2020/0348672 | A1 | 11/2020 | Shashua | |
| 2021/0018918 | A1 | 1/2021 | Levandowski | |
| 2021/0034068 | A1 | 2/2021 | Shalev-Shwartz | |
| 2021/0056327 | A1 | 2/2021 | Cohen | |
| 2021/0072765 | A1 | 3/2021 | Eagelberg | |
| 2021/0110483 | A1 | 4/2021 | Shalev-Shwartz | |
| 2021/0179096 | A1 | 6/2021 | Shalev-Shwartz | |
| 2021/0271254 | A1 | 9/2021 | Chen | |

OTHER PUBLICATIONS

PCT International Search Report and Written Opinion in International Application PCT/US2019/041720, dated Dec. 20, 2019, 19 pages.

* cited by examiner

300

2800

| OBJECT ID (2806) | HEIGHT (2808) | WIDTH (2810) | CENTER (2812) | LOCATION OF CENTER (2814) |
|---|---|---|---|---|
| A45FA | 35 | 70 | 345, 400 | 2745, 2440 |
| B3AE3 | 210 | 500 | 105, 250 | 1750, 1450 |

SYSTEM AND METHOD FOR AUTOMATICALLY DETECTING ERRATIC BEHAVIOUR OF ANOTHER VEHICLE WITH A VEHICLE'S AUTONOMOUS DRIVING SYSTEM

CROSS-REFERENCE TO RELATED APPLICATIONS

This application is a continuation of and claims priority to U.S. patent application Ser. No. 16/511,968, filed Jul. 15, 2019 and is a continuation of and claims priority to PCT International Patent Application No. PCT/US2019/041720, filed Jul. 12, 2019, which in turn claim priority to U.S. Provisional Patent Application No. 62/697,912, filed Jul. 13, 2018, U.S. Provisional Patent Application No. 62/697,915, filed Jul. 13, 2018, U.S. Provisional Patent Application No. 62/697,919, filed Jul. 13, 2018, U.S. Provisional Patent Application No. 62/697,922, filed Jul. 13, 2018, U.S. Provisional Patent Application No. 62/697,930, filed Jul. 13, 2018, U.S. Provisional Patent Application No. 62/697,938, filed Jul. 13, 2018, U.S. Provisional Patent Application No. 62/697,940, filed Jul. 13, 2018, U.S. Provisional Patent Application No. 62/697,946, filed Jul. 13, 2018, U.S. Provisional Patent Application No. 62/697,952, filed Jul. 13, 2018, U.S. Provisional Patent Application No. 62/697,957, filed Jul. 13, 2018, U.S. Provisional Patent Application No. 62/697,960, filed Jul. 13, 2018, U.S. Provisional Patent Application No. 62/697,962, filed Jul. 13, 2018, U.S. Provisional Patent Application No. 62/697,965, filed Jul. 13, 2018, U.S. Provisional Patent Application No. 62/697,969, filed Jul. 13, 2018, and to U.S. Provisional Patent Application No. 62/697,971, filed Jul. 13, 2018, the disclosures of each of which are hereby incorporated by reference herein in their entirety, for all that they teach and for all purposes.

FIELD

The present disclosure is generally directed to vehicle systems, in particular, toward autonomous vehicles.

BACKGROUND

Driving a vehicle, in particular, a semi-truck or load-carrying vehicle requires a great deal of attention from the driver. New vehicles and trucks are trying to alleviate some of the burden of driving by introducing some level of autonomy with the vehicle. Self-driving is one form of autonomy being developed. Unfortunately, current self-driving vehicles require a great deal of hardware and a suite of different sensors to function effectively or safely. This additional hardware increases the cost for the self-driving/autonomous systems and slows adoption of this technology.

BRIEF DESCRIPTION OF THE DRAWINGS

FIG. 28 depicts an example data structure 2800 in accordance with embodiments of the present disclosure.

DETAILED DESCRIPTION

Embodiments of the present disclosure will be described in connection with a vehicle, and in accordance with at least some situations or configurations, a semi-truck or freight vehicle and associated systems.

Figure 1:
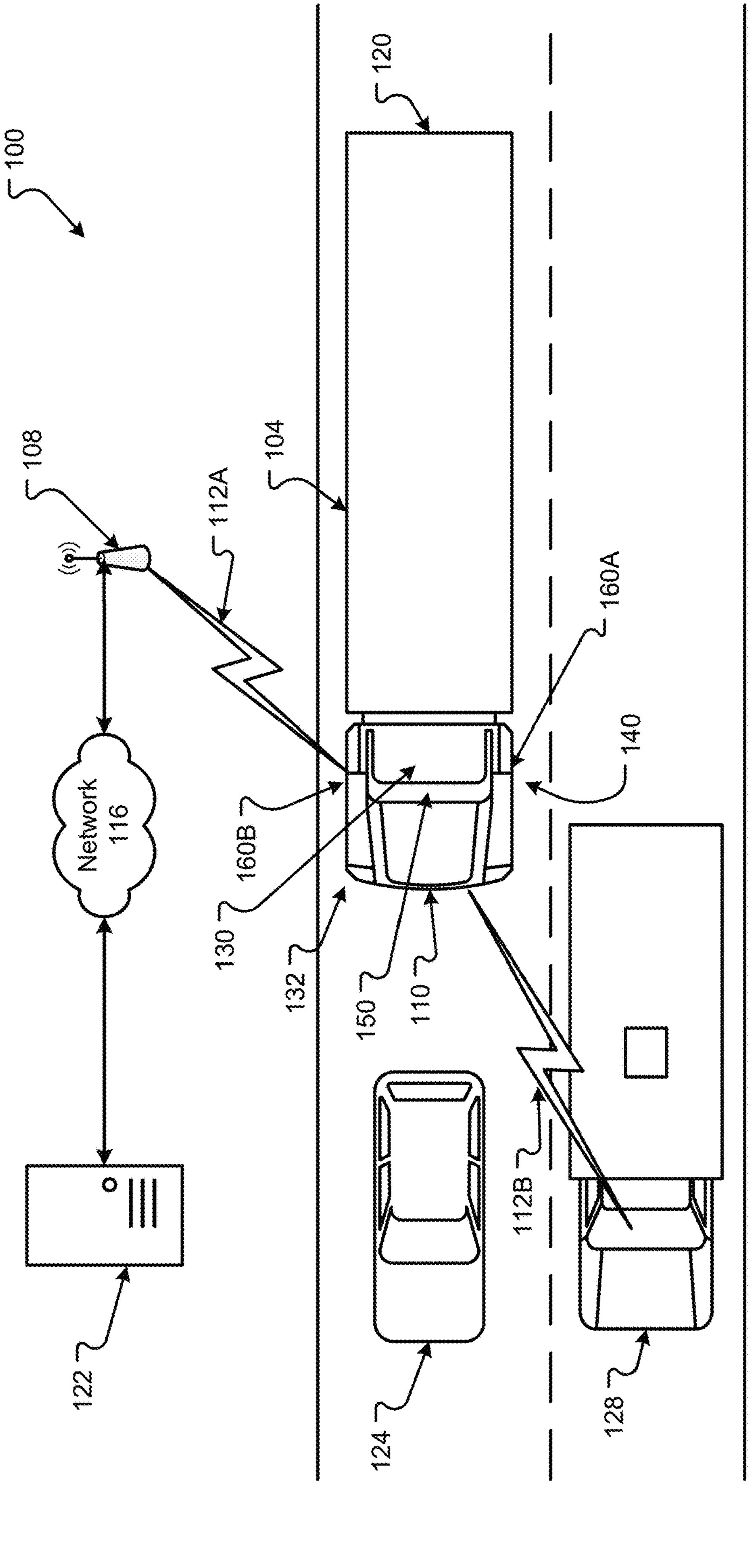
FIG. 1 depicts a plurality of vehicles, in an environment, in accordance with embodiments of the present disclosure.

FIG. 1 shows a plan view of a vehicle 104 in an environment 100, in accordance with embodiments of the present disclosure. The vehicle 104 comprises a vehicle front 110, vehicle aft or rear 120, vehicle roof 130, at least one vehicle side 160, a vehicle undercarriage 140, and a vehicle interior 150. The vehicle 104 may include one or more interior components inside an interior space 150, exterior components on the exterior parts of the vehicle, systems to control the vehicle movement, vehicle speed, vehicle acceleration, vehicle deceleration, climate control, infotainment, other controls systems, structural components, etc.

Although shown in the form of a semi-truck or freight truck, it should be appreciated that the vehicle 104 described herein may include any conveyance or model of a conveyance, where the conveyance was designed for the purpose of moving freight, such as people, animals, cargo, and the like, or as a conveyance of people. Vehicles may include, but are in not limited to, cars, trucks, motorcycles, busses, automobiles, trains, trams, other railed conveyances, boats, ships, marine conveyances, submarine conveyances, airplanes, space craft, flying machines, human-powered conveyances, and the like.

For the purpose of effectuating autonomous driving or other autonomous operations, the vehicle 104 may include a number of sensors, devices, and/or systems that are capable of assisting in driving operations with or without human input. The sensors and systems may include, but are in no way limited to, one or more of cameras and/or other optical sensors (e.g., independent, stereo, combined image, multispectral, etc.), infrared (IR) sensors, ultraviolet (UV) sensors, radio frequency (RF) sensors, ultrasonic sensors (e.g., transducers, transceivers, etc.), RADAR sensors (e.g., object-detection sensors and/or systems), LIDAR systems, odometer sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 104 and/or on an outside of the vehicle 104. The sensors and systems may also be disposed in one or more portions of a vehicle 104 (e.g., the frame, a body panel, a compartment, etc.).

The vehicle sensors and systems may be selected and/or configured to suit a level of operation associated with the vehicle 104. Among other things, the number of sensors used in a system may be altered to increase or decrease information available to a vehicle control system (e.g., affecting control capabilities of the vehicle 104). Additionally or alternatively, the sensors and systems may be part of one or more advanced driver assistance systems (ADAS) associated with a vehicle 104. In any event, the sensors and systems may be used to provide driving assistance at any level of operation (e.g., from fully-manual to fully-autonomous operations, etc.) as described herein. In some configurations, the vehicle 104 includes only optical sensors to lower costs of implementing the system.

The vehicle 104 may operate at a predetermined, configurable, or static level of autonomy for vehicle driving operations. At Level 0, or fully-manual driving operations, a driver (e.g., a human driver) may be responsible for all the driving control operations (e.g., steering, accelerating, braking, etc.) associated with the vehicle. Level 0 is a no automation level. At Level 1, the vehicle may be responsible for a limited number of the driving operations associated with the vehicle, while the driver is still responsible for most driving control operations. For example, cruise control may be a Level 1 autonomous level where the vehicle may control the throttle control and/or braking operations. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In Level 2, the driver may be required to perform some aspects of driving operations not controlled by the vehicle but, like Levels 0 and 1, a driver monitors or controls at least some of the driving operations of the vehicle 104.

At Level 3, the vehicle 104 controls driving operations with the driver separated from controlling the driving operations of the vehicle 104, except when the vehicle 104 requests an operator to act or intervene in some operation. Thus, the driver only conducts operations when required or needed by the vehicle 104. At Level 4, the vehicle 104 conducts driving operations even if a driver ignores or fails to response to a request to intervene. Level 4 may be referred to as a “High Automation” level. At Level 5, the vehicle 104 can control all the driving operations associated with the vehicle in all driving modes regardless of what the driver may be doing. The vehicle 104, in Level 5, may continually monitor traffic, vehicular, roadway, and/or other conditions in the environment 100 while the vehicle is in operation.

The vehicle 104 may also be in communication with one or more outside entities, for example, a computing system 122, another vehicle 128, etc. Communication may be a wireless interconnection 112 as described herein. The wireless interconnection 112 can be directly to the other entity, for example, the vehicle 128, or to a communication antenna 108 (e.g., a cellular tower, a wireless network endpoint, etc.). Then, the communication signal may be sent through a network 116 (e.g., a local area network (LAN), a wide area network (WAN), etc.) to the computing system 122. The computing system 122 can be any type of computer, as described herein, including a server or server system.

FIG. 1 generally shows a vehicle sensing environment 100 at least partially viewed by the sensors disposed in, on, and/or about the vehicle 104. Each sensor may include an operational detection range R and operational detection angle $\alpha$. The operational detection range R may define the effective detection limit, or distance, of the sensor. In some cases, this effective detection limit may be defined as a distance from a portion of the sensor (e.g., a lens, sensing surface, etc.) to a point in space offset from the sensor. The effective detection limit may define a distance, beyond which, the sensing capabilities of the sensor deteriorate, fail to work, or are unreliable. The effective detection limit may define a distance, within which, the sensing capabilities of the sensor are able to provide accurate and/or reliable detection information. The operational detection angle $\alpha$ may define at least one angle of a span, between horizontal and/or vertical limits, of a sensor. As can be appreciated, the operational detection limit and the operational detection angle $\alpha$ of a sensor together may define the effective detection zone (e.g., the effective detection area, and/or volume, etc.) of a sensor.

In some embodiments, the vehicle 104 may include an imaging system to detect visual information in an environment surrounding the vehicle 104. The visual information detected in the environment surrounding the imaging system may be processed (e.g., via one or more sensor and/or system processors, etc.) to generate a complete 360-degree view of an environment 100 around the vehicle 104. The imaging system may be configured to generate changing 360-degree views of the environment 100 in real-time, for instance, as the vehicle 104 drives.

Sensor data and information may be collected by one or more sensors or systems of the vehicle 104 monitoring the vehicle sensing environment 100. This information may be processed (e.g., via a processor, computer-vision system, etc.) to determine targets (e.g., objects, signs, people, markings, roadways, conditions, etc.) inside one or more detection areas associated with the vehicle sensing environment 100. In some cases, information from multiple sensors may be processed to form composite sensor detection information. For example, a first sensor and a second sensor may correspond to a first camera and a second camera aimed in a forward traveling direction of the vehicle 104. In this example, images collected by the two cameras may be combined to form stereo image information. This composite information may increase the capabilities of a single sensor in the one or more sensors by, for example, adding the ability to determine depth associated with targets in the one or more detection zones. Similar image data may be collected by rear view cameras (e.g., sensors) aimed in a rearward traveling direction of the vehicle 104.

In some embodiments, multiple sensors may be effectively joined to increase a sensing zone and provide increased sensing coverage. For instance, multiple sensors disposed on the front 110 of the vehicle 104 may be joined to provide a zone of coverage that spans across an entirety of the front 110 of the vehicle 104. These overlapping detection zones may provide redundant sensing, enhanced sensing, and/or provide greater detail in sensing within a particular portion of a larger zone. Additionally or alternatively, the sensors of the vehicle 104 may be arranged to create a complete coverage, via one or more sensing zones around the vehicle 104. In some areas, the sensing zones of two or more sensors may intersect at an overlap zone. In some areas, the angle and/or detection limit of two or more sensing zones may meet at a virtual intersection point or plane.

The vehicle 104 may include a number of sensors disposed proximal to the rear 120 of the vehicle 104. These sensors can include, but are in no way limited to, an imaging sensor, camera, IR, a radio object-detection and ranging sensors, RADAR, RF, ultrasonic sensors, and/or other object-detection sensors. Among other things, these sensors may detect targets near or approaching the rear of the vehicle 104. For example, another vehicle approaching the rear 120 of the vehicle 104 may be detected by one or more of the ranging and imaging system (e.g., LIDAR), rear-view cameras, and/or rear facing RADAR sensors. As described above, the images from the rear-view cameras may be processed to generate a stereo view (e.g., providing depth associated with an object or environment, etc.) for targets visible to both cameras This sensor arrangements may provide critical sensor information to a vehicle control system in at least one of the autonomous driving levels described above. For instance, when the vehicle 104 is driving autonomously (e.g., Level 3, Level 4, or Level 5) and detects other vehicles stopped in a travel path, the sensor detection information may be sent to the vehicle control system of the vehicle 104 to control a driving operation (e.g., braking, decelerating, etc.) associated with the vehicle 104 (in this example, slowing the vehicle 104 as to avoid colliding with the stopped other vehicles). As yet another example, the vehicle 104 may be operating and one or more of the imaging system, and/or the side-facing sensors, may detect targets at a side 160 of the vehicle 104. It should be appreciated that the sensors may detect a target that is both at a side 160 and a front 110 of the vehicle 104 (e.g., disposed at a diagonal angle to a centerline of the vehicle 104 running from the front 110 of the vehicle 104 to the rear 120 of the vehicle). Additionally or alternatively, the sensors may detect a target that is both, or simultaneously, at a side 160 and a rear 120 of the vehicle 104 (e.g., disposed at a diagonal angle to the centerline of the vehicle 104).

Figure 2A:
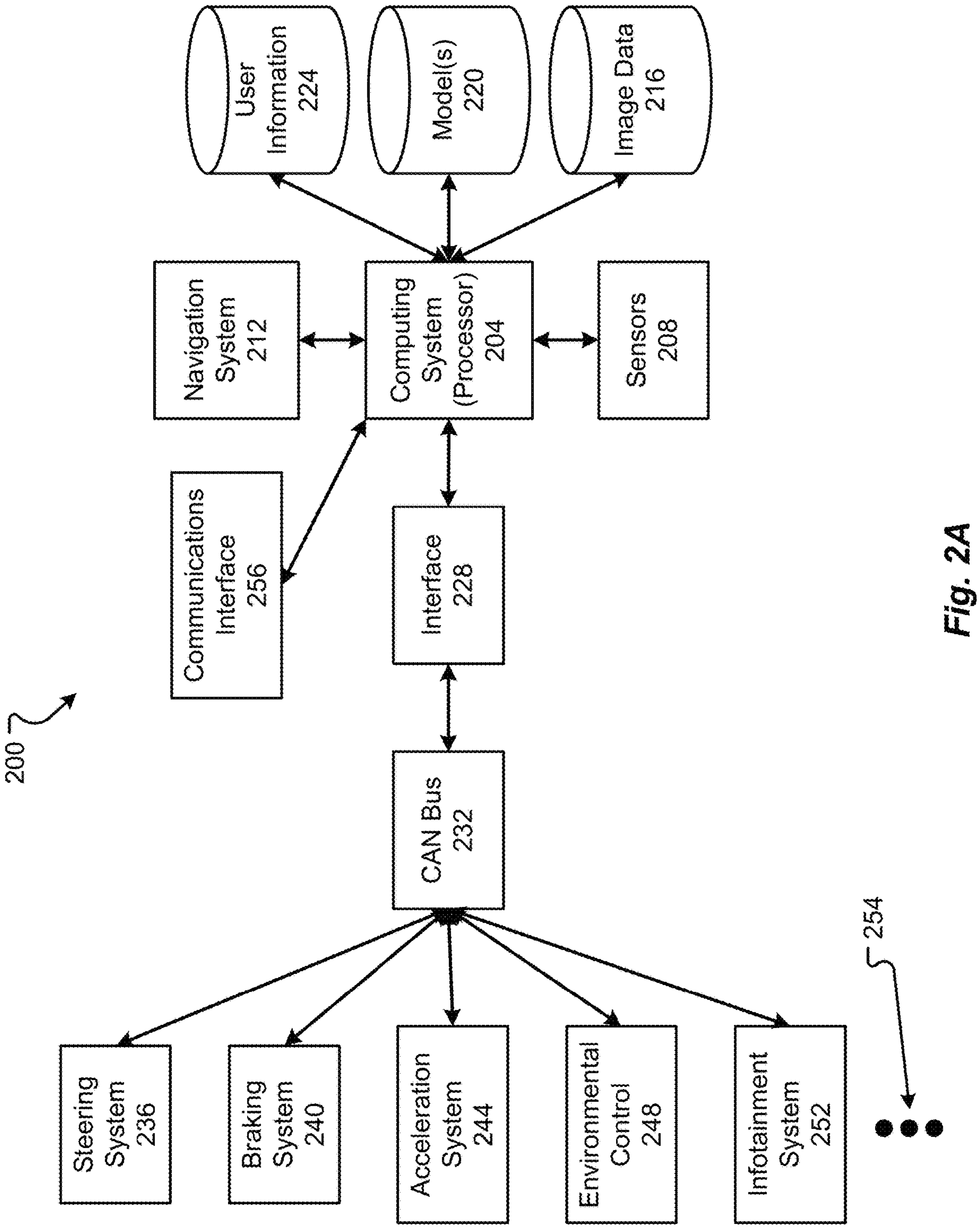
FIG. 2A depicts a block diagram of an embodiment of a vehicle computing environment of a vehicle in accordance with embodiments of the present disclosure.

FIG. 2A is a block diagram of an embodiment of a vehicle computing environment 200 of the vehicle 104 in accordance with embodiments of the present disclosure. The computing environment 200 may include one or more vehicle sensors and systems 208, computing system (processor) 204, interface 228, vehicle control systems (e.g., steering system 236, braking system 240, acceleration system 244, environmental control 248, infotainment system 252, etc.), a communication system to the vehicle control systems (e.g., a control area network (CAN) bus 232, a navigation system 212, one or more data stores (e.g., user information 224, model(s) 220, image data 216, etc.). These associated components may be electrically and/or communicatively coupled to one another via at least one bus or other interconnection. In some configurations, the one or more associated components may send and/or receive signals across a communication network to a separate entity, for example, server 122.

The computing system 204 can include any hardware and/or software to conduct operations, as described herein, in accordance with embodiments of the present disclosure. The computing system 204 may be as described in conjunction with FIGS. 2C and 2D. Interconnected to the computing system 204 may be one or more data stores 216-224, the sensors 208, the navigation system, and/or the interface 228, which are described hereinafter.

In accordance with embodiments of the present disclosure, the interface 228 may comprise any type of known communication medium or collection of communication media and may use any type of protocols, such as SIP, TCP/IP, SNA, IPX, AppleTalk, and the like, to transport messages between the computing system 204 and the interface 228 and then translate those messages for transmission onto the CAN bus 232. The interface 228 may include wired and/or wireless communication technologies. Other examples of the interface 228 may include, without limitation, a Local Area Network (LAN), such as an Ethernet network, a Token-Ring network and/or the like, a Wide Area Network (WAN), a virtual network, including without limitation a virtual private network ("VPN"); an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the interface 228 need not be limited to any one network type, and instead may be comprised of a number of different networks and/or network types. The interface 228 may comprise a number of different communication media such as coaxial cable, copper cable/wire, fiber-optic cable, antennas for transmitting/receiving wireless messages, and combinations thereof.

The vehicle 104 can include a navigation system 212 (e.g., global positioning system (GPS), etc.) and/or one or more sensors 208, for example, sensors for orientation, odometer, camera, infrared (IR), and/or other optional sensors, for example LIDAR, RADAR, ultrasonic, and/or other sensor or system. These driving vehicle sensors and systems may be similar, if not identical, to the sensors and systems described above.

The camera sensors may include one or more components configured to detect image information associated with an environment of the vehicle 104. In some embodiments, the camera sensors may include a lens, filter, image sensor, and/or a digital image processer. It is an aspect of the present disclosure that multiple camera sensors may be used together to generate stereo images providing depth measurements. Examples of the camera sensors as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 104 using any known or future-developed standard and/or architecture.

The infrared (IR) sensors may include one or more components configured to detect image information associated with an environment of the vehicle 104. The IR sensors may be configured to detect targets in low-light, dark, or poorly-lit environments. The IR sensors may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors may include at least one processor configured to interpret the returned IR light and determine locational properties of targets. The IR sensors may be configured to detect and/or measure a temperature associated with a target (e.g., an object, pedestrian, other vehicle, etc.). Examples of IR sensors as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 104 using any known or future-developed standard and/or architecture.

An orientation sensor may include one or more sensors configured to determine an orientation of the vehicle 104 relative to at least one reference point. In some embodiments, the orientation sensor may include at least one pressure transducer, stress/strain gauge, accelerometer, gyroscope, and/or geomagnetic sensor. Examples of the navigation sensor as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, and may perform orientation detection and/or determination functions using any known or future-developed standard and/or architecture.

The odometry sensor and/or system may include one or more components that is configured to determine a change in position of the vehicle 104 over time. In some embodiments, the odometry system may utilize data from one or more other sensors and/or systems 208 in determining a position (e.g., distance, location, etc.) of the vehicle 104 relative to a previously measured position for the vehicle 104. Additionally or alternatively, the odometry sensors may include one or more encoders, Hall speed sensors, and/or other measurement sensors/devices configured to measure a wheel speed, rotation, and/or number of revolutions made over time. Examples of the odometry sensor/system as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro® incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar®, F18 commutating optical encoder, Dynapar® HS35R family of phased array encoder sensors, other industry-equivalent odometry sensors and/or systems, and may perform change in position detection and/or determination functions using any known or future-developed standard and/or architecture.

The vehicle 104 can include other optional sensors, which can supplement the visual sensors described above. For example, a LIDAR sensor/system may include one or more components configured to measure distances to targets using laser illumination. In some embodiments, the LIDAR sensor/system may provide 3D imaging data of an environment around the vehicle 104. The imaging data may be processed to generate a full 360-degree view of the environment around the vehicle 104. The LIDAR sensor/system may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system into a measurement environment. The rotating reflective surface may be configured to continually rotate 360 degrees about an axis, such that the plurality of laser beams is directed in a full 360-degree range around the vehicle 104. A photodiode receiver of the LIDAR sensor/system may detect when light from the plurality of laser beams emitted into the measurement environment returns (e.g., reflected echo) to the LIDAR sensor/system. The LIDAR sensor/system may calculate, based on a time associated with the emission of light to the detected return of light, a distance from the vehicle 104 to the illuminated target. In some embodiments, the LIDAR sensor/system may generate over 2.0 million points per second and have an effective operational range of at least 100 meters. Examples of the LIDAR sensor/system as described herein may include, but are not limited to, at least one of Velodyne.R® LiDAR® HDL-64E 64-channel LIDAR sensors, Velodyne® LiDAR® HDL-32E 32-channel LIDAR sensors, Velodyne® LiDAR® PUCK® VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 104 using any known or future-developed standard and/or architecture.

A RADAR sensors may include one or more radio components that are configured to detect objects/targets in an environment of the vehicle 104. In some embodiments, the RADAR sensors may determine a distance, position, and/or movement vector (e.g., angle, speed, etc.) associated with a target over time. The RADAR sensors may include a transmitter configured to generate and emit electromagnetic waves (e.g., radio, microwaves, etc.) and a receiver configured to detect returned electromagnetic waves. In some embodiments, the RADAR sensors may include at least one processor configured to interpret the returned electromagnetic waves and determine locational properties of targets. Examples of the RADAR sensors as described herein may include, but are not limited to, at least one of Infineon BASIC® RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 104 using any known or future-developed standard and/or architecture.

The ultrasonic sensors may include one or more components that are configured to detect objects/targets in an environment of the vehicle 104. In some embodiments, the ultrasonic sensors may determine a distance, position, and/or movement vector (e.g., angle, speed, etc.) associated with a target over time. The ultrasonic sensors may include an ultrasonic transmitter and receiver, or transceiver, configured to generate and emit ultrasound waves and interpret returned echoes of those waves. In some embodiments, the ultrasonic sensors may include at least one processor configured to interpret the returned ultrasonic waves and determine locational properties of targets. Examples of the ultrasonic sensors as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar®-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 104 using any known or future-developed standard and/or architecture.

In some embodiments, the driving vehicle sensors may include other sensors and/or combinations of the sensors described above. Additionally or alternatively, one or more of the sensors described above may include one or more processors configured to process and/or interpret signals detected by the one or more sensors. In some embodiments, the processing of at least some sensor information provided by the vehicle sensors and systems 208 may be processed by at least one sensor processor. Raw and/or processed sensor data may be stored in a sensor data memory storage medium. In some embodiments, the sensor data memory may store instructions used by the sensor processor 204 for processing sensor information provided by the sensors and systems 208. In any event, the sensor data memory may be a disk drive, optical storage device, solid-state storage device such as a random access memory ("RAM") and/or a read-only memory ("ROM"), which can be programmable, flash-updateable, and/or the like.

The navigation system 212 may include one or more sensors having receivers and antennas that are configured to utilize a satellite-based navigation system including a network of navigation satellites capable of providing geolocation and time information to at least one component of the vehicle 104. For instance, the navigation system 212 may receive global positioning, location, and/or navigational information from a navigation source. In some embodiments, the navigation source may be a global navigation satellite system (GNSS) similar, if not identical, to NAVSTAR GPS, GLONASS, EU Galileo, and/or the BeiDou Navigation Satellite System (BDS), etc.

Examples of the navigation sensor as described herein may include, but are not limited to, at least one of Garmin® GLO® family of GPS and GLONASS combination sensors, Garmin® GPS 15x® family of sensors, Garmin® GPS 16x® family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The vehicle control systems may include separate systems for steering 236, braking 240, acceleration 244, environmental control 248, infotainment 252, and/or other systems. There may be more or fewer systems than those shown in FIG. 2A, as represented by ellipses 254. The vehicle control systems 236-252 may receive processed CAN Bus signals representing commands from the computing system 204 and control an aspect of the vehicle 104 in response to those commands. Further, controlling an aspect of the vehicle 104 may include presenting information via one or more display devices associated with the vehicle, sending commands to one or more computing devices associated with the vehicle, and/or controlling a driving operation of the vehicle 104. The vehicle control systems 236-252 may correspond to one or more computing systems that control driving operations of the vehicle 104 in accordance with the Levels of driving autonomy described above. The acceleration system 244 may operate a speed of the vehicle 104 by controlling an output signal to the accelerator and/or braking system 240 of the vehicle. The steering system 236 may additionally control steering and/or other driving functions of the vehicle 104.

The vehicle control systems 236-252 may communicate, in real-time, with the driving sensors and systems 204, 208 forming a feedback loop. In particular, upon receiving information describing a condition of targets in the environment surrounding the vehicle 104, the computing system 204 may autonomously make changes to a driving operation of the vehicle 104. The computing system 204 may then send subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 104 to operate autonomously in the environment.

In some embodiments, the computing system 204 may receive control information, e.g., model(s) 220, from one or more control sources, e.g., server 122. The control source 122 may provide vehicle control information including models 220 that direct autonomous driving control commands, vehicle operation override control commands, and the like. The control source 122 may correspond to an autonomous vehicle control system, a traffic control system, an administrative control entity, and/or some other controlling server. It is an aspect of the present disclosure that the vehicle control system and/or other components of the vehicle 104 may exchange communications, for example, image data 216 saved from camera or other visual sensors, with the control source 122 across the communication network and via the communications subsystem.

Information associated with controlling driving operations of the vehicle 104 may be stored in a control data memory storage medium. The control data memory may store models, used by the computing system 204 for controlling driving operations of the vehicle 104, historical control information, autonomous driving control rules, and the like in a data store 220. In some embodiments, the control data memory may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 104 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 104. In some embodiments, the human input may be configured to control one or more functions of the vehicle 104 and/or systems of the vehicle 104 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

The communications componentry 256 can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications interface 256 and/or interface 228 can also include inter- and intra-vehicle communications capabilities such as hotspot and/or access point connectivity for any one or more of the vehicle occupants and/or vehicle-to-vehicle communications. Additionally, and while not specifically illustrated, the communications interface 256 and/or the interface 228 can include one or more communications links (that can be wired or wireless) and/or communications busses, including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety.) As discussed, the communications interface 256 enables communications between any if the inter-vehicle systems and subsystems as well as communications with non-collocated resources, such as those reachable over a network such as the Internet.

The communications interface 256, in addition to well-known componentry (which has been omitted for clarity), can include interconnected elements including one or more of, but not limited to: one or more antennas, an interleaver/deinterleaver, an analog front end (AFE), memory/storage/cache, controller/microprocessor, MAC circuitry, modulator/demodulator, encoder/decoder, a plurality of connectivity managers, GPU, accelerator, a multiplexer/demultiplexer, transmitter, receiver and wireless radio components such as a Wi-Fi PHY/Bluetooth® module, a Wi-Fi/BT MAC module, transmitter and receiver. The various elements in the communications interface 256 are connected by one or more links/busses.

The communications interface 256 can have one more antennas, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 104 and/or in another vehicle.

Antenna(s) generally interact with the Analog Front End (AFE), which is needed to enable the correct processing of the received modulated signal and signal conditioning for a transmitted signal. The AFE can be functionally located between the antenna and a digital baseband system in order to convert the analog signal into a digital signal for processing and vice-versa.

The communications interface 256 can also include a controller/microprocessor and a memory/storage/cache. The communications interface 256 can interact with the memory/storage/cache which may store information and operations necessary for configuring and transmitting or receiving the information described herein. The memory/storage/cache may also be used in connection with the execution of application programming or instructions by the controller/microprocessor, and for temporary or long term storage of program instructions and/or data. As examples, the memory/storage/cache may comprise a computer-readable device, RAM, ROM, DRAM, SDRAM, and/or other storage device(s) and media.

The controller/microprocessor may comprise a general purpose programmable processor or controller for executing application programming or instructions related to the communications interface 256. Furthermore, the controller/microprocessor can perform operations for configuring and transmitting/receiving information as described herein. The controller/microprocessor may include multiple processor cores, and/or implement multiple virtual processors. Optionally, the controller/microprocessor may include multiple physical processors. By way of example, the controller/microprocessor may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The communications interface 256 can further include a transmitter and receiver which can transmit and receive signals, respectively, to and from other devices, subsystems and/or other destinations using the one or more antennas and/or links/busses. Included in the communications interface 256 circuitry is the medium access control or MAC Circuitry. MAC circuitry provides for controlling access to the wireless medium. In an exemplary embodiment, the MAC circuitry may be arranged to contend for the wireless medium and configure frames or packets for communicating over the wired/wireless medium.

The communications interface 256 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications interface 256 also includes a GPU, an accelerator, a Wi-Fi/BT/BLE PHY module and a Wi-Fi/BT/BLE MAC module and wireless transmitter 588 and receiver 592. In some embodiments, the GPU may be a graphics processing unit, or visual processing unit, comprising at least one circuit and/or chip that manipulates and changes memory to accelerate the creation of images in a frame buffer for output to at least one display device. The GPU may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 2B:
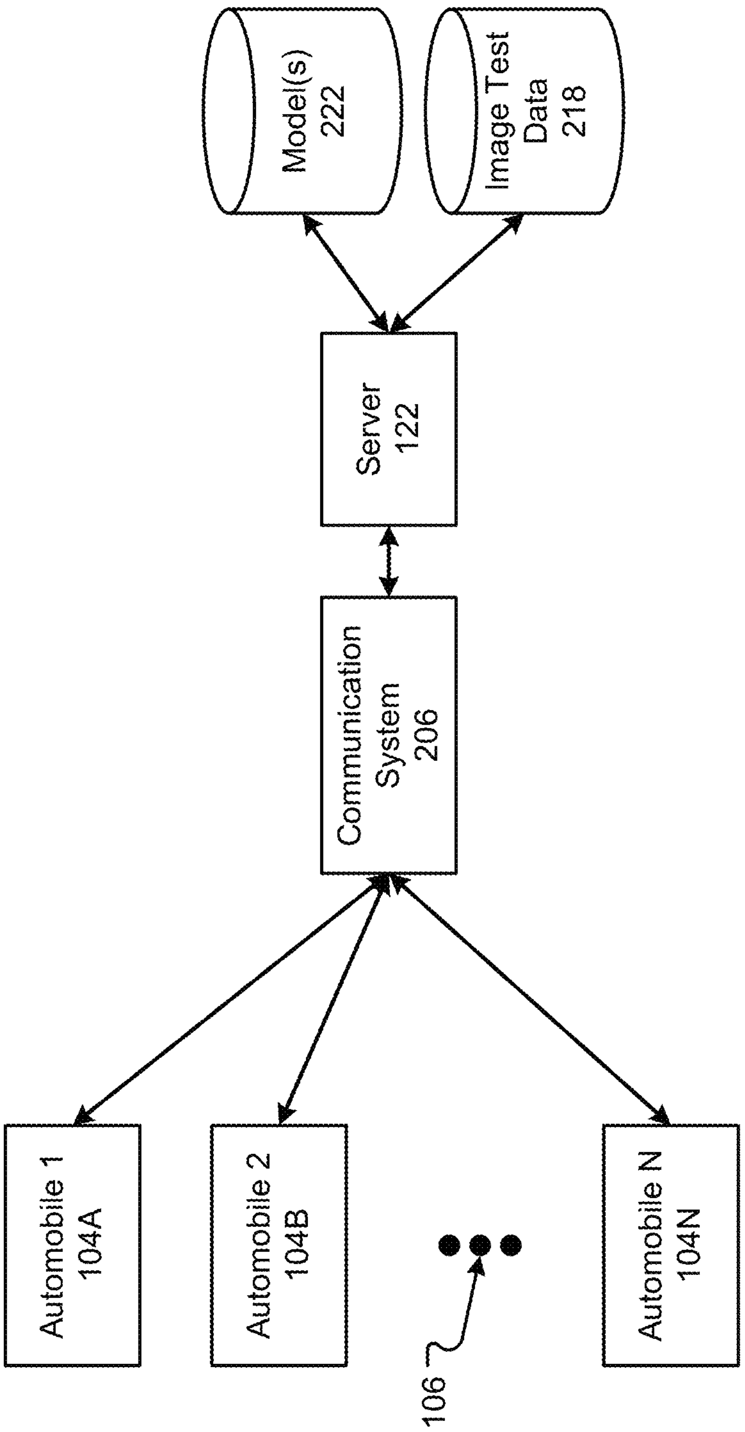
FIG. 2B depicts a hardware/software configuration for a server or cloud computing function of a system, which may supply driving models, in accordance with embodiments of the present disclosure.
Figure 2C:
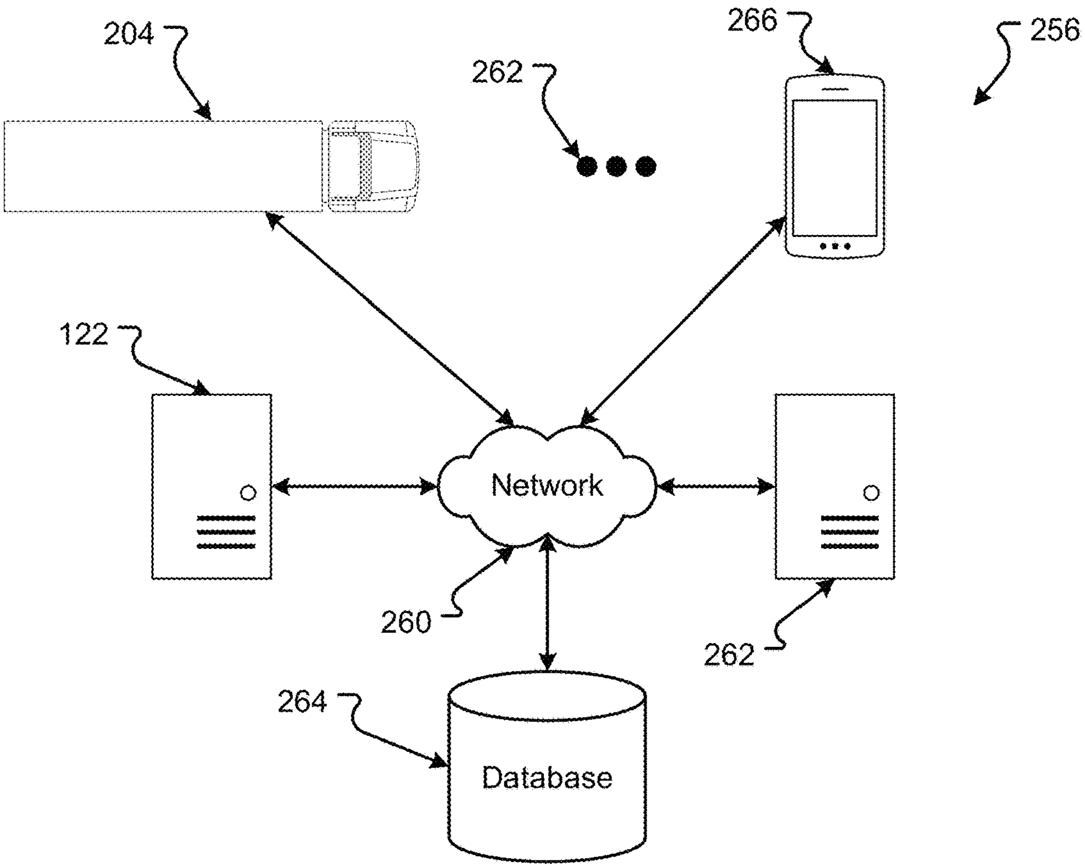
FIG. 2C depicts a computing environment that may function as a server, user computer, or other system provided and described herein, in accordance with embodiments of the present disclosure.

The data stores 216-224 may be any type of hardware/software as described in conjunction with FIGS. 2C and/or 2D that can form a database or other system for writing, storing, and/or reading data. The databases 216-224 can be stored in a single database as separate partitions or portions or may be discrete data stores, possible with separate hardware. The image data store 216 can store one or more images generated from the image sensors described above. The image data can include an entire frame of image data or a portion of image data. Further, the image data may also include one or more items of metadata associated with the image data, including, but not limited to, a time and/or date the image was taken, an identifier and/or location for the sensor that captured the image, the type of sensor that captured the sensor, a reason for capturing an image (e.g., an incident occurred that required user interface), etc. The image data 216 may persist for some period of time or event and may be shared with the server 122 to improve model accuracy.

The model(s) 220 data store includes one or more models used by the computing system 204 to autonomously operate the vehicle 104. The model(s) 220 and their functionality may be as described hereinafter. One or more model(s) 220 may be stored in the model(s) data store 220 and variously retrieved and implemented by the computing system 204 based on the conditions of the environment 100.

User information 224 can be stored in a separate database. The user information 224 can include user profiles, data about vehicle use, or other informational data. The user profiles can include information about a user identity, user experiences in the vehicle, data about the user's driving style or habits, a user's calendar or other personal information, etc. This information may be used to customize the experience of the user with the vehicle 104.

FIG. 2B represents a hardware/software configuration for the server 122 or cloud computing function of the system. The server 122 can be any computing system as described in conjunction with FIGS. 2C and/or 2D. The communications system 206 may the same as or similar to the communication interface 256, as described in conjunction with FIG. 2A. As such, these components will not be described further. The model(s) data store 222 may be similar to the model(s) data store 220, but may store more models and may provide models to different vehicles 104 based on those vehicle's circumstances or conditions. The image test data 218 can be the accumulation of all image data 216 from the one or more vehicles 104 provided to the server 122 to create or refine the model(s) 222. The image test data 218 is explained hereinafter.

FIG. 2C shows a computing environment 256 that may function as the servers, user computers, or other systems provided and described herein, in accordance with embodiments of the present disclosure. The computing environment 256 includes one or more user computers, or computing devices, such as a vehicle computing device 204, a communication device 266, and/or other devices, as represented by ellipses 262. The computing devices 204, 266, 258 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 204, 266, 258 may also have any of a variety of applications, including for example, database client and/or server applications, and web browser applications. Alternatively, the computing devices 204, 266, 258 may be any other electronic device, such as a thin-client computer, Internet-enabled mobile telephone, and/or personal digital assistant, capable of communicating via a network 260 and/or displaying and navigating web pages or other types of electronic documents. Although the exemplary computing environment 256 is shown with two computing devices, any number of user computers or computing devices may be supported.

The computing environment 256 may also include one or more servers 122, 262. In this example, server 262 is shown as a web server and server 122 is shown as an application server. The web server 262, which may be used to process requests for web pages or other electronic documents from computing devices 204, 266, and 258. The web server 262 can be running an operating system including any of those discussed above, as well as any commercially-available server operating systems. The web server 262 can also run a variety of server applications, including SIP (Session Initiation Protocol) servers, HTTP(s) servers, FTP servers, CGI servers, database servers, Java servers, and the like. In some instances, the web server 262 may publish operations available operations as one or more web services.

The computing environment 256 may also include one or more file and or/application servers 122, which can, in addition to an operating system, include one or more applications accessible by a client running on one or more of the computing devices 204, 266, 258. In at least some configurations, the application server 122 can provide models to the vehicles 104 and/or receive image data to update the models. The server(s) 122 and/or 262 may be one or more general purpose computers capable of executing programs or scripts in response to the computing devices 204, 266, 258. As one example, the server 122, 262 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 122 may also include database servers, including without limitation those commercially available from Oracle®, Microsoft®, Sybase®, IBM® and the like, which can process requests from database clients running on a computing device 204, 262, 258.

The web pages created by the server 262 and/or 122 may be forwarded to a computing device 204, 262, and 258 via a web (file) server 262, 122. Similarly, the web server 262 may be able to receive web page requests, web services invocations, and/or input data from a computing device 204, 262, 258 (e.g., a user computer, etc.) and can forward the web page requests and/or input data to the web (application) server 122. In further embodiments, the server 122 may function as a file server. Although for ease of description, FIG. 2C illustrates a separate web server 262 and file/application server 122, those skilled in the art will recognize that the functions described with respect to servers 262, 122 may be performed by a single server and/or a plurality of specialized servers, depending on implementation-specific needs and parameters. The computer systems 204, 262, 258, web (file) server 262 and/or web (application) server 122 may function as the system, devices, or components described in FIGS. 1-2D.

The computing environment 256 may also include a database 264. The database 264 may reside in a variety of locations. By way of example, database 264 may reside on a storage medium local to (and/or resident in) one or more of the computers 204, 262, 258, 262, 122. Alternatively, it may be remote from any or all of the computers 204, 262, 258, 262, 122, and in communication (e.g., via the network 610) with one or more of these. The database 264 may reside in a storage-area network ("SAN") familiar to those skilled in the art. Similarly, any necessary files for performing the functions attributed to the computers 204, 262, 258, 266, 122 may be stored locally on the respective computer and/or remotely, as appropriate. The database 264 may be a relational database, such as Oracle 20i®, that is adapted to store, update, and retrieve data in response to SQL-formatted commands. Database 264 may represent databases and/or data stores 216, 218, 220, 222, and/or 224.

Figure 2D:
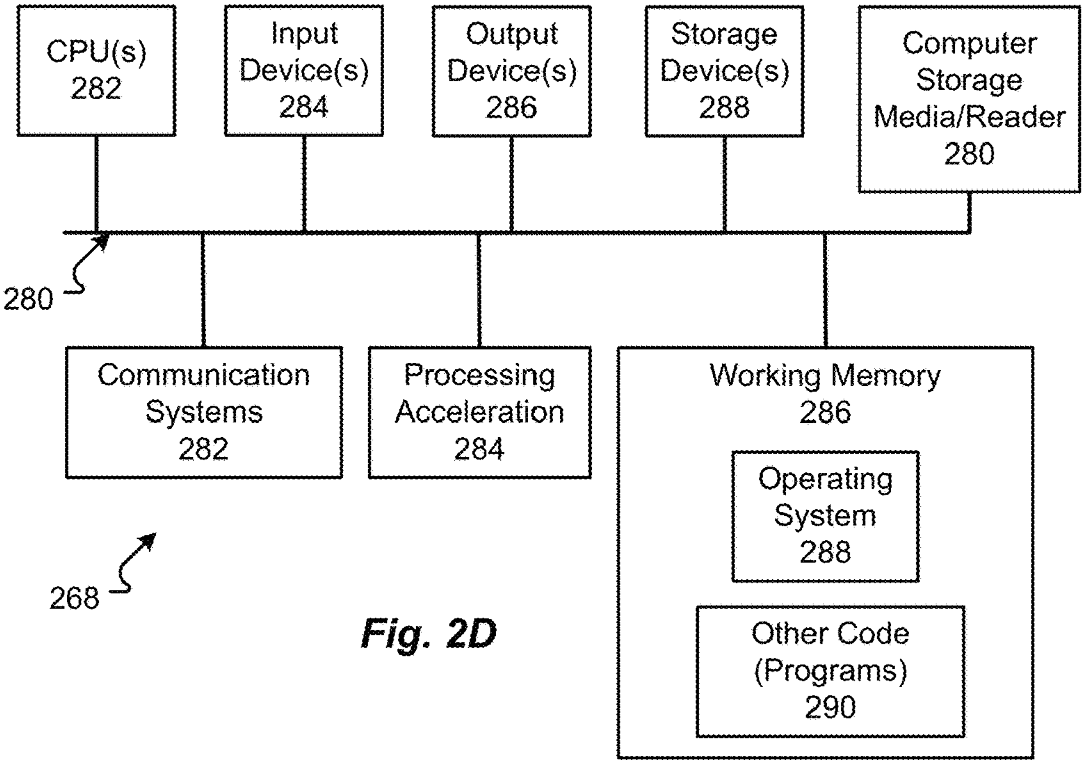
FIG. 2D depicts an example of a computer system upon which a server, computer, computing device, or other system or components may be deployed or executed in accordance with embodiments of the present disclosure.

FIG. 2D illustrates one embodiment of a computer system 268 upon which the servers 122, 262, user computers 204, computing devices, or other systems or components described above may be deployed or executed. The computer system 268 is shown comprising hardware elements that may be electrically coupled via a bus 270. The hardware elements may include one or more central processing units (CPUs) 272; one or more input devices 274 (e.g., a mouse, a keyboard, etc.); and one or more output devices 276 (e.g., a display device, a printer, etc.). The computer system 268 may also include one or more storage devices 278. By way of example, storage device(s) 278 may be disk drives, optical storage devices, solid-state storage devices such as a random access memory ("RAM") and/or a read-only memory ("ROM"), which can be programmable, flash-updateable and/or the like.

The computer system 268 may additionally include a computer-readable storage media/reader 280; a communications system 282 (e.g., a modem, a network card (wireless or wired), an infra-red communication device, etc.); and working memory 286, which may include RAM and ROM devices as described above. The computer system 268 may also include a processing acceleration unit 284, which can include a digital signal processor (DSP), a special-purpose processor, and/or the like.

The computer-readable storage media/reader 280 can further be connected to a computer-readable storage medium, together (and, optionally, in combination with storage device(s) 278) comprehensively representing remote, local, fixed, and/or removable storage devices plus storage media for temporarily and/or more permanently containing computer-readable information. The communications system 282 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 268 may also comprise software elements, shown as being currently located within a working memory 286, including an operating system 288 and/or other code 290. It should be appreciated that alternate embodiments of a computer system 268 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 272 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core® family of processors, the Intel® Xeon® family of processors, the Intel® Atom® family of processors, the Intel Itanium® family of processors, Intel® Core® i5-4670K and i7-4770K 22 nm Haswell, Intel® Core® i5-3570K 22 nm Ivy Bridge, the AMD® FX® family of processors, AMD® FX-4300, FX-6300, and FX-8350 32 nm Vishera, AMD® Kaveri processors, Texas Instruments® Jacinto C6000® automotive infotainment processors, Texas Instruments® OMAP® automotive-grade mobile processors, ARM® Cortex®-M processors, ARM®. Cortex-A and ARM926EJ-S® processors, other industry-equivalent processors, and may perform computational functions using any known or future-developed standard, instruction set, libraries, and/or architecture.

Figure 3A:
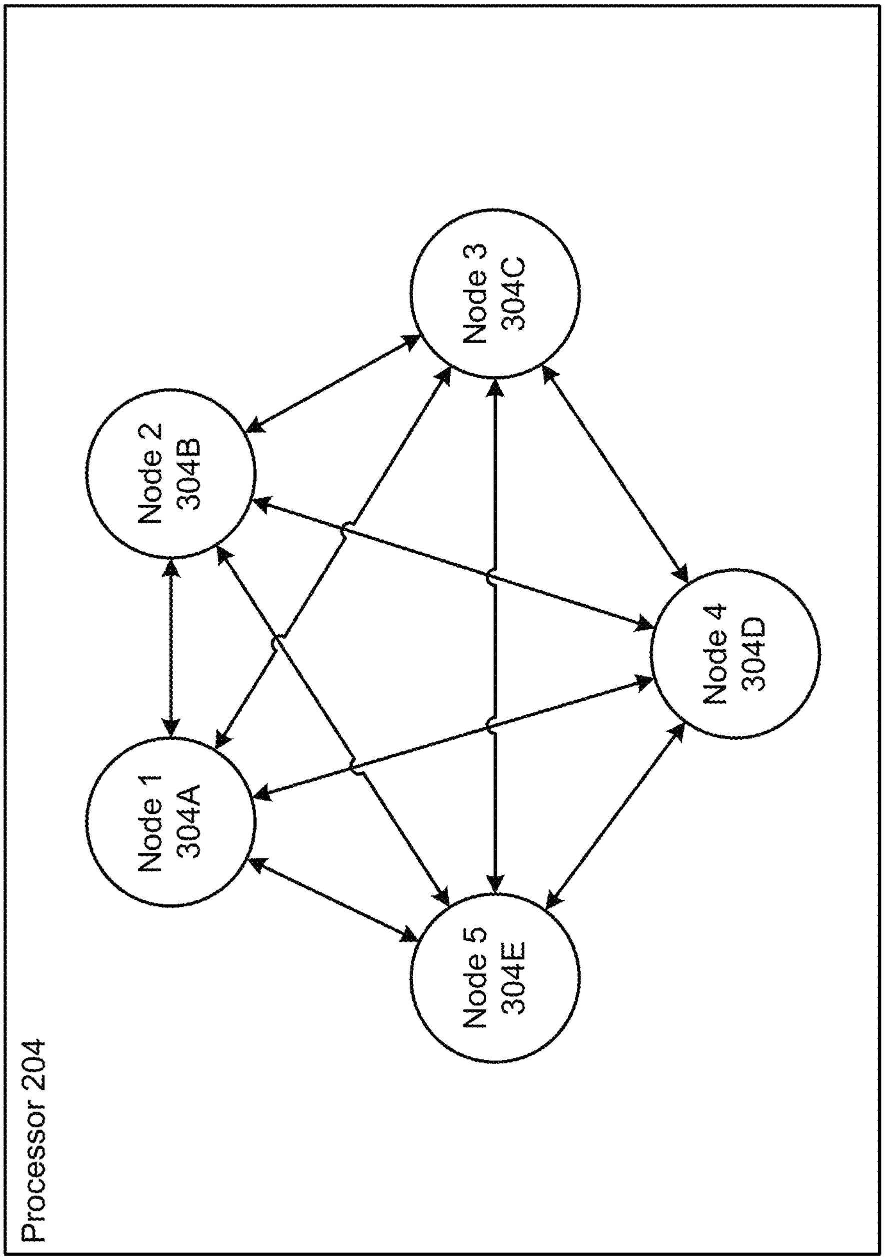
FIG. 3A depicts one or more software structures including one or more nodes and/or a data structure in accordance with embodiments of the present disclosure.
Figure 3B:
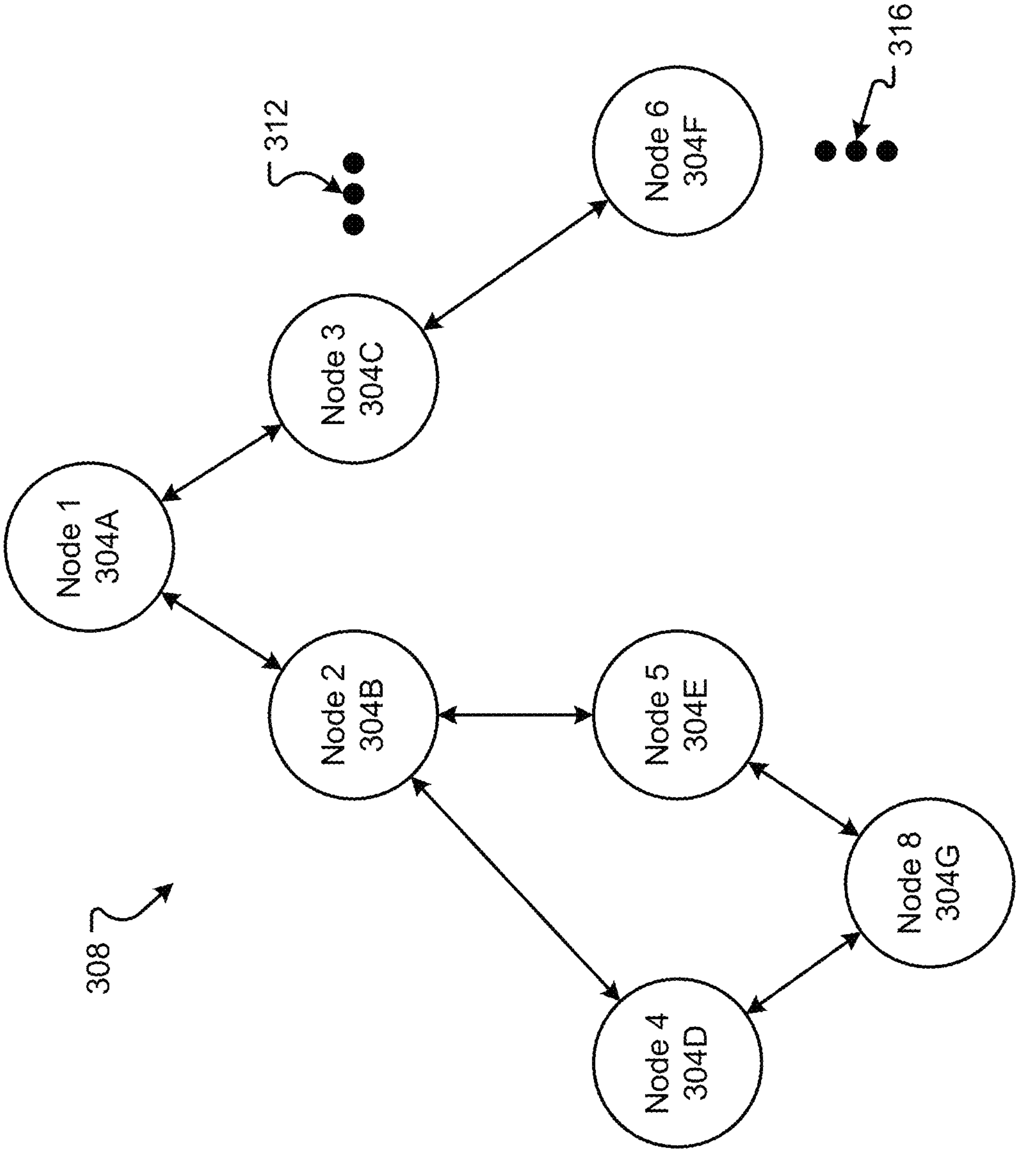
FIG. 3B depicts one or more software structures including one or more nodes and/or a data structure in accordance with embodiments of the present disclosure.

An embodiment of software structure 300, 308, 336 that may be stored within the working memory 286 of the vehicle 104 may be as shown in FIGS. 3A and/or 3B and/or 3C. In at least some configurations, the software structures 300, 308, 336 are comprised of one or more software nodes 304. In some examples, the one or more software nodes 304 may include, but are not limited to one or more robot operating system (ROS) nodes 304. The nodes 304 depicted in FIGS. 3A, 3B, and 3C may be a middleware that allows for software development, which provides services designed for heterogeneous computer cluster used for hardware abstraction, low-level device control, implementation of commonly used functionality, message-passing between processes, and package management. Node based processes are represented in a graph architecture where processing takes place in nodes that may receive, post and multiplex sensor, control, state, planning, actuator and other messages. In some examples, a node may post or otherwise provide information, such as an image, processed image, extracted features, a message indicating that an image, processed image, extracted features are available, a location to such information, etc. to a common, private, or otherwise shared communication pathway; one or more other nodes may then receive, and/or retrieve information associated with the posted information. The nodes can be used to implement the CNN processes described hereinafter.

The software structure 300, 308, 336 can include an arrangement of nodes 304A-304M as a matrix, as shown in FIG. 3A. The matrix of nodes 304A-304E allows exchange of information, commands, etc. between various nodes until an output may be generated. In other configurations, the nodes 304A-304G may be arranged as a hierarchy, where a parent process, e.g., 304A, completes a process with a result that is returned to a child process, e.g., 304B and/or 304C. The processes are completed node-by-node until an output is generated. The output can be a command sent through the interface 228 and CAN Bus 232 to control a system 236-252 of the vehicle 104. In some examples, the nodes may be arranged as a combination of a matrix and a hierarchical organizational structure and may operate in a parallel manner.

Figure 3C:
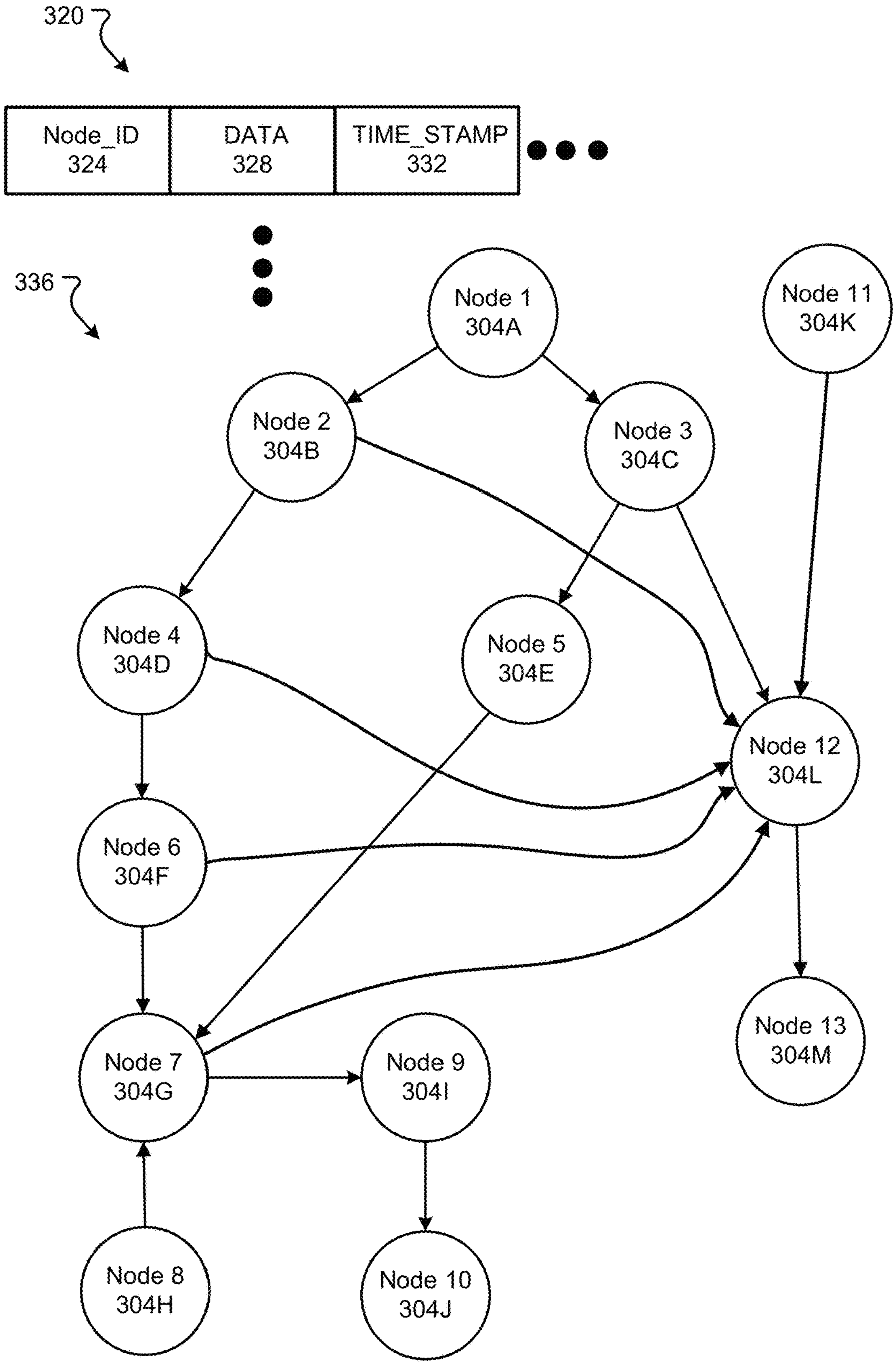
FIG. 3C depicts one or more software structures including one or more nodes and/or a data structure in accordance with embodiments of the present disclosure.

FIG. 3C depicts additional details of an example message 320 that may be communicated from a node 304 to another node 304. For example, a first node 304A may perform a process and generate an output, status, or otherwise to be communicated to another node, for example node 304B and 304C. Thus, the first node 304A may post a message to a common information pathway, such as a shared bus, where the message 320 may include a node identification 324, data 328, and a timestamp 332. The node identification 324 may include a unique identifier specific to the node 304A or may include a unique identifier specific to a type of information (for example, processed image information, lane markings, distance etc.) relevant to one or more other nodes 304. Accordingly, the one or more other nodes, for example 304B and 304C, may subscribe or otherwise be configured to identify the node identification 304A and then receive the message posted by the first node 304A. Accordingly, the nodes 304B and 304C may operate on, retrieve, or otherwise process information in the data portion 328 of the message 320. In some instances, the timestamp 332 may be relevant to a receiving node in that the receiving node may determine whether such information is relevant or desired for a given period of time. For example, node 304B may require processed image information once a second while node 304C may require processed image information once every five milliseconds.

Further depicted in FIG. 3C is an example of node structure 336 for processing one or more images and generating an output(s) to control a vehicle, such as vehicle 104. More specifically, a first node 304A may be configured to acquire an image or otherwise is associated with a sensor 208 to acquire data, such as an image, and make such data available to one or more nodes in the node structure 336. In at least one example, the first node 304A may post a message, such as message 320, indicating that image data is available. In another example, the first node 304A may include the image data in the message. Accordingly, second and third nodes 304B and 304C, having subscribed to the first node 304A and/or having subscribed to a specified data type or category of information, may receive the message provided by the first node 304A and proceed to obtain, by retrieving for instance, image information. Accordingly, the second node 304B may correspond to an object identifier or object detector configured to identify/detect and then output information associated with one or more objects (such as a location of the object and object information (size, distance, category, type etc.) from the image provided by the first node 304A. The object detector may detect and classify all objects in an image, such as different types of vehicles, different road signs, inanimate and moving objects, buildings, etc. Each identified object may be associated with an object ID, where the object ID may be made accessible to one or more nodes. In accordance with at least one example, a fourth node 304D may be configured to track one or more objects provided by node 304B. Thus, the fourth node 304D may provide access to one or more objects, one or more object tracks, locations of objects, etc. For example, an object, such as a vehicle, detected in a first image may be tracked via second, third, and fourth images, where the images may correspond to or otherwise be associated with one or more frames of video. Based on a type of enacted autonomous driving mode (e.g., following a vehicle, following a line, or following a GPS track), a heading may be calculated at a sixth node 304F. In some examples, a heading for each mode may be computed in parallel; that is, the sixth node 304F may include a plurality of nodes, where one or more of the plurality of nodes are utilized to determine a heading.

In accordance with at least one example, the third node 304C may correspond to a lane detector and may be configured to detect or find one or more lane markers from the image made available by the first node 304A; the third node 304C may output or otherwise make accessible lane marker information. The fifth node 304E may utilize the lane marker information to determine a heading for the vehicle 104, where the heading from the fifth node 304E and the sixth node 304F may be provided to or otherwise made accessible to the seventh node 304G. The seventh node 304G may determine a path, or otherwise select a path based on a follow mode, for the vehicle based on the headings determined at the fifth and sixth nodes 304E and 304F; in some instances, an external input provided by an eighth node 304H may also be utilized when determining a path for the vehicle 104 to follow. The path determined at the seventh node 304G may be made accessible to a controller to generate or otherwise determine a steering angle correction to be made to the vehicle at a ninth node 304I, where the steering angle correction may be accessed by a tenth node 304J which may actuate a steering angle change.

In accordance with some examples of the present disclosure, one or more of the lane detection information from the third node 304C, object identification information from the second node 304B, tracking information from the fourth node 304D, heading information from the sixth node 304F, path information from the seventh node 304G, and additional sensor information provided form an eleventh node 304K may be accessed by a twelfth node 304L to determine acceleration and/or braking for the vehicle 104. The determined acceleration and/or braking may be accessed by the thirteenth node 304M which may then actuate a change in throttle position or an amount of braking applied to the vehicle 104. While the software structure 336 provides a general overview of how one or more nodes may be utilized to control one or more autonomous aspects of a vehicle, it should be appreciated that additional nodes and/or fewer nodes may be utilized. Moreover, the outputs and/or determinations of each node should not be considered limiting; rather each node may provide additional or fewer outputs or determinations than what has been described.

Accordingly, the second node 304B may correspond to an object tracker configured to identify and then output one or more objects (such as a location of the object and object information (size, distance, category, type etc.) from the image provided by the first node 304A.

Figure 4:
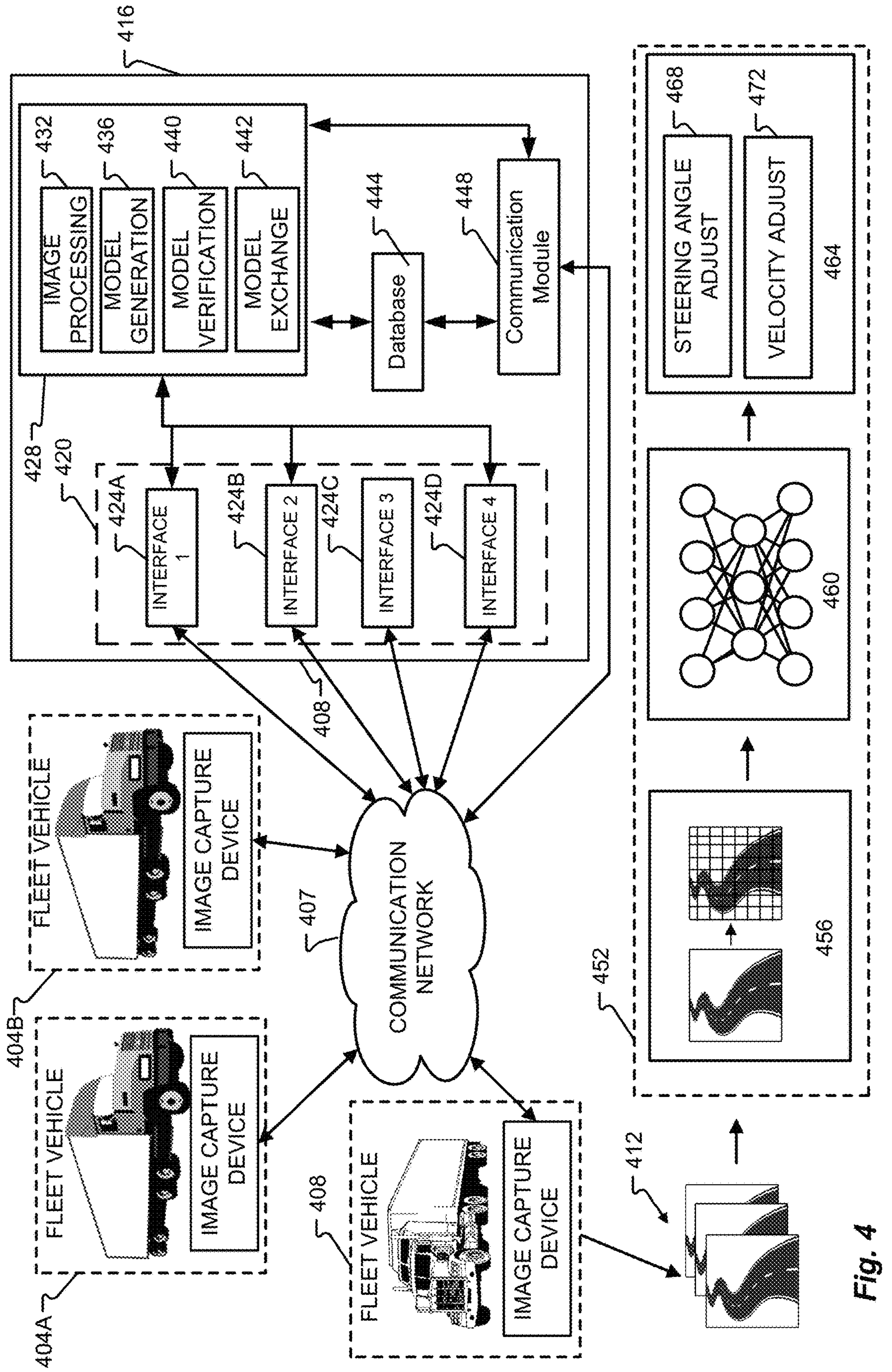
FIG. 4 depicts details of an autonomous model generation system in accordance with embodiments of the present disclosure.

FIG. 4 depicts an autonomous model generation system 400 in accordance with embodiments of the present disclosure. In embodiments, the autonomous model generation system 400, may include an autonomous vehicle model generation system 416, which may receive one or more images from one or more fleet vehicles 404A-B and/or fleet vehicle 408, process the one or more images, and generate an autonomous model. In some embodiments, the generated autonomous model may be specific to the fleet vehicle 404A-B and/or fleet vehicle 408, a user, and/or one or more environmental parameters, such as location, weather, time of day, etc.

In accordance with embodiments of the present disclosure, the autonomous vehicle model generation system 416 may include one or more interfaces 420 including interfaces interface 424A-D, for example, for receiving one or more images from a fleet vehicle 404 and/or 408. In some embodiments, the autonomous vehicle model generation system 416 may be a portal that provides functionalities for a point of access on the web or Internet. That is, as will be described below, an autonomous vehicle model generation system 416 may provide centralized management capabilities for autonomous vehicle model generation and distribution. Accordingly, user of a fleet vehicle 404 and/or 408, an autonomous vehicle model manager, and/or an autonomous vehicle model custodian may interact with one or more of the interfaces 424A-424D, to provide and receive images, updated models, new models and the like.

In accordance with embodiments of the present disclosure, the autonomous vehicle model generation system 416 may receive one or more images, for example images 412, from one or more of a fleet vehicle 404A-B and/or a fleet vehicle 408. The images may be captured by an image capture device, such as the previously described camera for instance, and communicated to the autonomous vehicle model generation system 416 via the communication network 407. The autonomous vehicle model generation system 416 may then utilize the model manager 428 to obtain information about a current autonomous model, for example autonomous vehicle model 452, residing at the specified fleet vehicle 404A-B. The information about the current autonomous model residing at the specified fleet vehicle 404A-B may be an autonomous model itself, an identifier of the autonomous model and/or data indicating one or more parameters of the autonomous model and/or vehicle. In accordance with embodiments of the present disclosure, the model manager 428 may perform image processing, such as pre-processing on the one or more received images from the fleet vehicle 404A.

In accordance with embodiments of the present disclosure, the pre-processed and/or imaged processed data and/or information may then be provided to the model generation module 436 which may generate one or more autonomous vehicle models. The model manager 428 may access model information in the database 444, or otherwise, such that a series of images may be utilized during the model generation process. As one example, a convolutional neural network may be utilized to create the autonomous vehicle model. The autonomous vehicle model may then undergo a model verification process at the model verification module 440 and be provided to the model exchange 442 for distribution and/or storage to the model verification module 440 and/or fleet vehicle 404A-B and/or fleet vehicle 408. In accordance with embodiments of the present disclosure, an autonomous vehicle model 452 may be distributed to the fleet vehicle 404A-B and/or fleet vehicle 408; that is, a same autonomous vehicle model 452 may be provided to each of the fleet vehicle 404A-B and/or fleet vehicle 408. In addition, or alternatively, a different autonomous vehicle model may be provided to the fleet vehicle 404A, fleet vehicle 404B, and/or fleet vehicle 408. The autonomous vehicle model may be communicated to the fleet vehicle utilizing the communication 448 and/or the communication network 407.

As an example of an autonomous vehicle model that may be generated by the model manager 428 and/or reside at a fleet vehicle 404 and/or 408, the autonomous vehicle model 452 may include one or more image processing portions 456, convolutional neural network portions 460, and/or the vehicle adjustment portions 464. Accordingly, and as one example in accordance with embodiments of the present disclosure, the autonomous vehicle model 452 may be implemented at the model verification module 440 and/or the fleet vehicle. Thus, the autonomous vehicle model 452 may receive one or more images 412, process the images at the image processing portion 456, perform feature extraction and classification at the convolutional neural network 460, and adjust one or more of a steering angle and/or velocity utilizing the steering angle adjust 468 and velocity adjust 472 of the vehicle adjust portion 464.

In accordance with embodiments of the present disclosure, the autonomous vehicle model generation system 416 may generate autonomous vehicle models based on information specific to a vehicle, information specific to a user, information specific to a location, information specific to a time of day, information specific to a time of year, information specific to a change in one of the previously mentioned specific information types, and/or combinations thereof. As one non-limiting example, the autonomous vehicle model generation system 416 may generate an autonomous vehicle model specific to a location, where the generated autonomous vehicle model for the specific location may provide classifications having a higher confidence than an autonomous vehicle model suited to another different location. In accordance with embodiments of the present disclosure, a generated autonomous vehicle model may be an entire autonomous vehicle model, a portion of a model, and/or a single node of the model.

Figure 5:
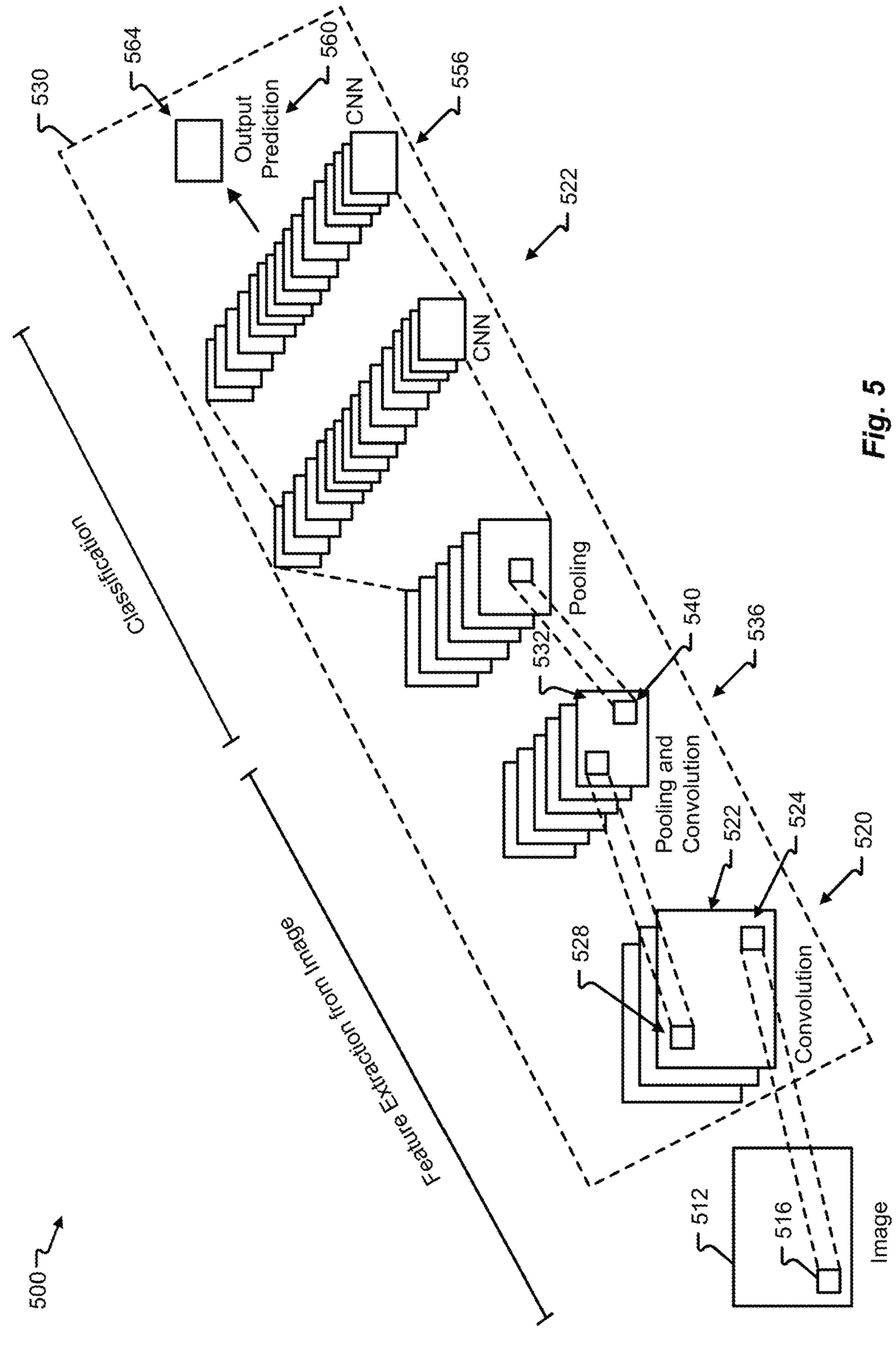
FIG. 5 depicts additional details of one or more autonomous vehicle models that may reside at a fleet vehicle, database, and/or be generated by an autonomous vehicle model generation system in accordance with embodiments of the present disclosure.

FIG. 5 depicts additional details of the one or more autonomous vehicle models that may reside at the fleet vehicle, database 444, and/or be generated by the autonomous vehicle model generation system 416. The model may include a machine learning algorithm 530 which takes data, trains a model on the data, and uses the trained model to make predictions on new data. At each step, the model 530 makes predictions and gets feedback about how accurate its generated predictions were. This feedback, which is provided in terms of an error according to some measure (for example distance from the correct solution), is used to correct the errors made in a prediction. As depicted in FIG. 5, the model 530 may receive an image 512 and perform a convolution on the image 512. The primary purpose of convolution is to extract features from the input image 512 while preserving the spatial relationship between pixels by learning image features using small squares of input data. For example, one or more filters, kernels, and/or feature detectors 516 may be applied to the image 512; the image 512 may be a preprocessed image in some embodiments. For example, the image 512 may correspond to an image that is a subsampled representation of an original image. Moreover, the image 512 may be an image from a series of images, such as video. The resulting element 524 may be a single element of the entire convolved feature, activation map, or feature map 522. As can be appreciated, an autonomous vehicle model may include specific filters, or feature detectors, 516, and utilize a varying number of strides to obtain the feature map 522. Moreover, the feature detectors 516, the number of features detectors, and other model parameters may be specific to a fleet vehicle, user, time of day, location etc. In addition, the resulting feature map 522 may be subsampled, subjected to non-linear processing such as ReLU, and pooled resulting in a rectified feature map 532 for example. In accordance with embodiments of the present disclosure, the process of subsampling and pooling may be performed multiple times.

As shown in FIG. 5, two sets of convolution, ReLU & Pooling layers are depicted where the second convolution layer performs convolution on the output of the first pooling layer using six filters to produce a total of six feature maps. ReLU is then applied individually on all of these six feature maps. A max pooling operation may then be applied separately on each of the six rectified feature maps. Together these layers extract the useful features from the images, introduce non-linearity, and reduce feature dimension while aiming to make the features somewhat equivariant to scale and translation. The output of the 2nd Pooling Layer acts as an input to the Fully Connected Layer 522.

The Fully Connected layer 522 may be a traditional Multi Layer Perceptron that uses a classifier in the output layer, such as a softmax activation function or a support vector machine (SVM). The term "Fully Connected" implies that every neuron in the previous layer is connected to every neuron on the next layer. However, in some embodiments, the layer 522 may not be fully connected. The output from the convolutional and pooling layers represent high-level features of the input image. The purpose of the Fully Connected layer is to use these features for classifying the input image into various classes based on the training dataset. As discussed above, the Convolution+Pooling layers act as Feature Extractors from the input image while Fully Connected layer acts as a classifier.

In accordance with embodiments of the present disclosure, the CNN 522 and 556 may be trained in accordance with a defined training process. Backpropagation may be used to generate gradients of error with respect to weights within the network and such gradients may be filtered to minimize the output error. A training set of images may be used to train the autonomous vehicle model to optimize all weights and parameters of the CNN to classify not only features within images, but also other inputs, such as steering angle, acceleration, and the like. Accordingly, when a new (unseen) image and or other unseen inputs are provided to the autonomous vehicle model, the autonomous vehicle model would go through forward propagation and output 564*a* probability for each classification for the image and an associated action based on the classification in the image at 560.

Figure 6:
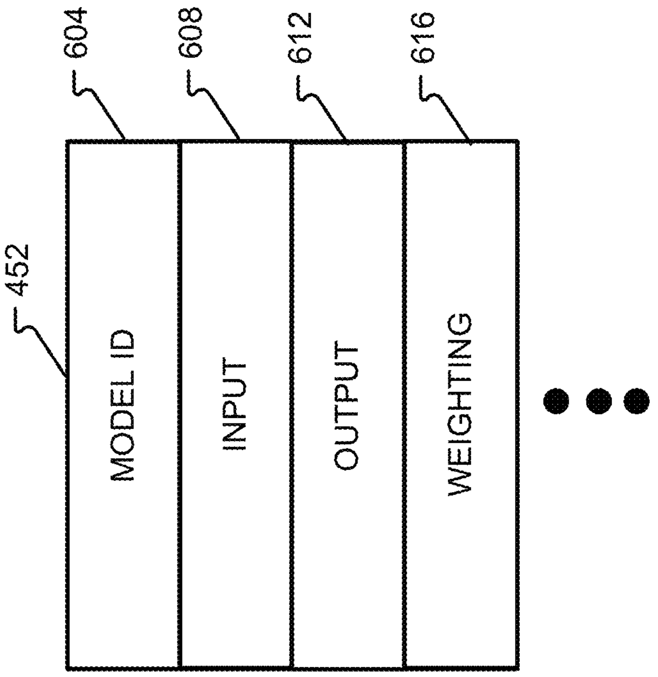
FIG. 6 depicts additional details of an autonomous vehicle model in accordance with embodiments of the present disclosure.

As depicted in FIG. 6, additional details of the autonomous vehicle model 452 are depicted. That is, the autonomous vehicle model 452 may include one or more model identifiers 604, one or more inputs 608, one or more outputs 612, and/or one or more weightings 616. As previously discussed, each of the autonomous vehicle models may be comprised of one or more node nodes. In some examples, each node may be, or otherwise include a robot operating system (ROS) node. Each of the nodes may be addressable in such manner such that each node may be replaced, updated, modified, changed, deleted, and/or added and such that one or more nodes may communicate with one another.

Figure 7:
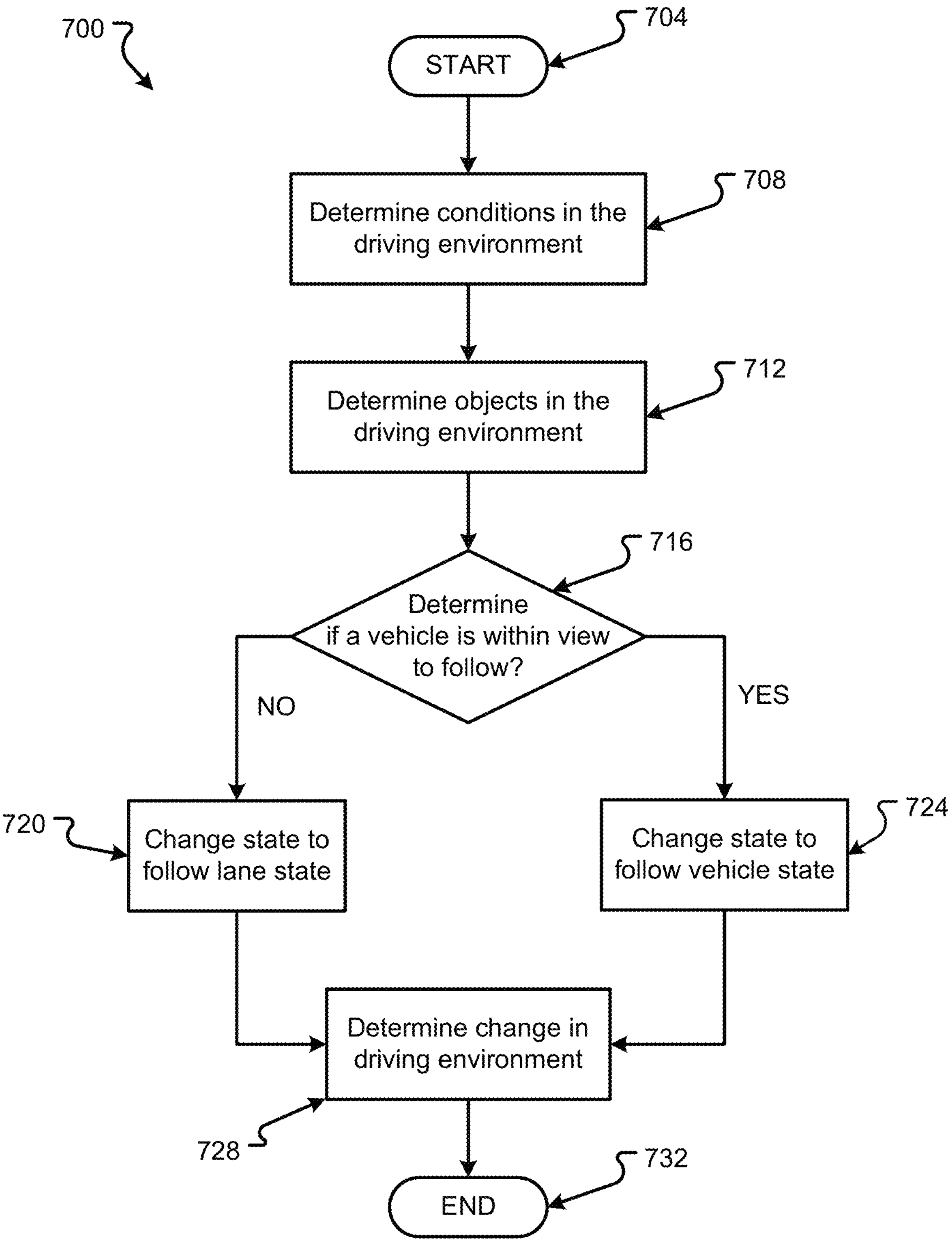
FIG. 7 depicts a first method for autonomously driving a vehicle in accordance with embodiments of the present disclosure.

FIG. 7 shows a method for autonomously driving a vehicle in accordance with embodiments of the present disclosure. A general order for the steps of the method 700 is shown in FIG. 7. Generally, the method 700 starts with a start operation 704 and ends with an end operation 732. The method 700 can include more or fewer steps or can arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an application specific integrated circuit (ASIC), a field programmable gate array (FPGA), a system-on-chip (SOC), or other hardware device. Hereinafter, the method 700 shall be explained with reference to the systems, components, devices, modules, software, signals, data structures, interfaces, methods, etc. described in conjunction with FIGS. 1-6 and 8-28.

The processor 204 can determine one or more conditions of the driving environment, in step 708. The image processing node executed by the processor 204 can receive sensor data, which can include one or more images from the image sensors 208. The sensor data can be an image, other sensor data, and/or image and other sensor data associated with the driving environment of the vehicle. The image processing node, executed by the processor 204, which implements a machine learning (ML) model in a convolutional neural network (CNN), may process the image. Within the image, different edges, the position of those edges, and other information can be determined. Conditions can include an edge or other information, such as movement of an edge over time, location of other sensed data, etc.

Figure 22A:
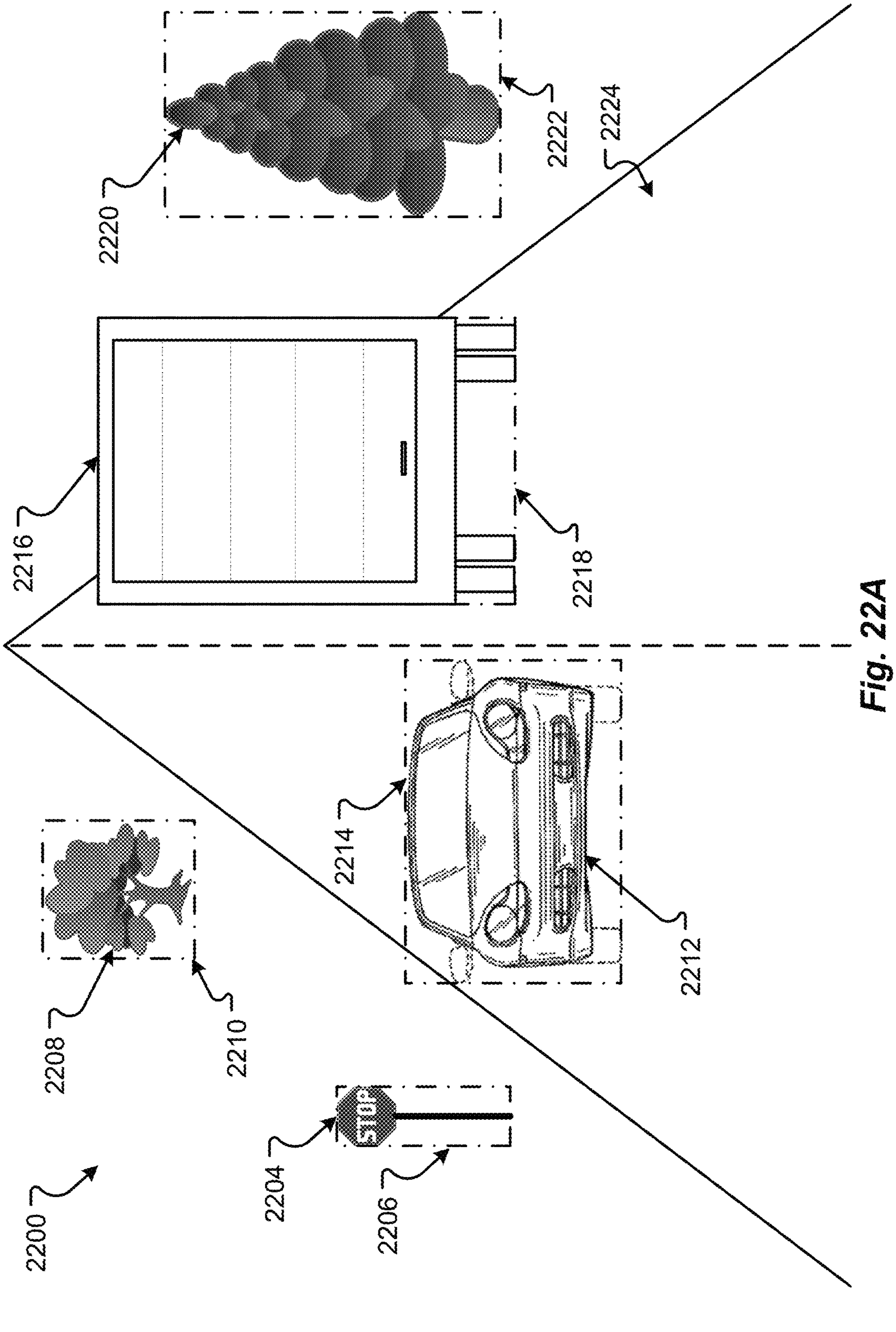
FIG. 22A depicts additional details related to object detection in accordance with embodiments of the present disclosure.

From the conditions, an object detection node, executed by the processor 204, may identify and determine one or more objects within the image and within the driving environment, in step 712. For example, as shown in FIG. 22A, one or more objects 2204-2220 may exist in the image 2200 provided by the image sensor. The ML model deployed by the object detection node can determine what items are objects (items of interest in the image 2200). The shape of the object can inform the processor 204 as to what type of object is being sensed. Thus, the object detection node can determine that object 2204 is a stop sign, objects 2208 and 2220 are trees, and objects 2212 and 2216 are vehicles. This information may then be stored by the processor 204 for determining actions required for driving in the environment 100.

Figure 22B:
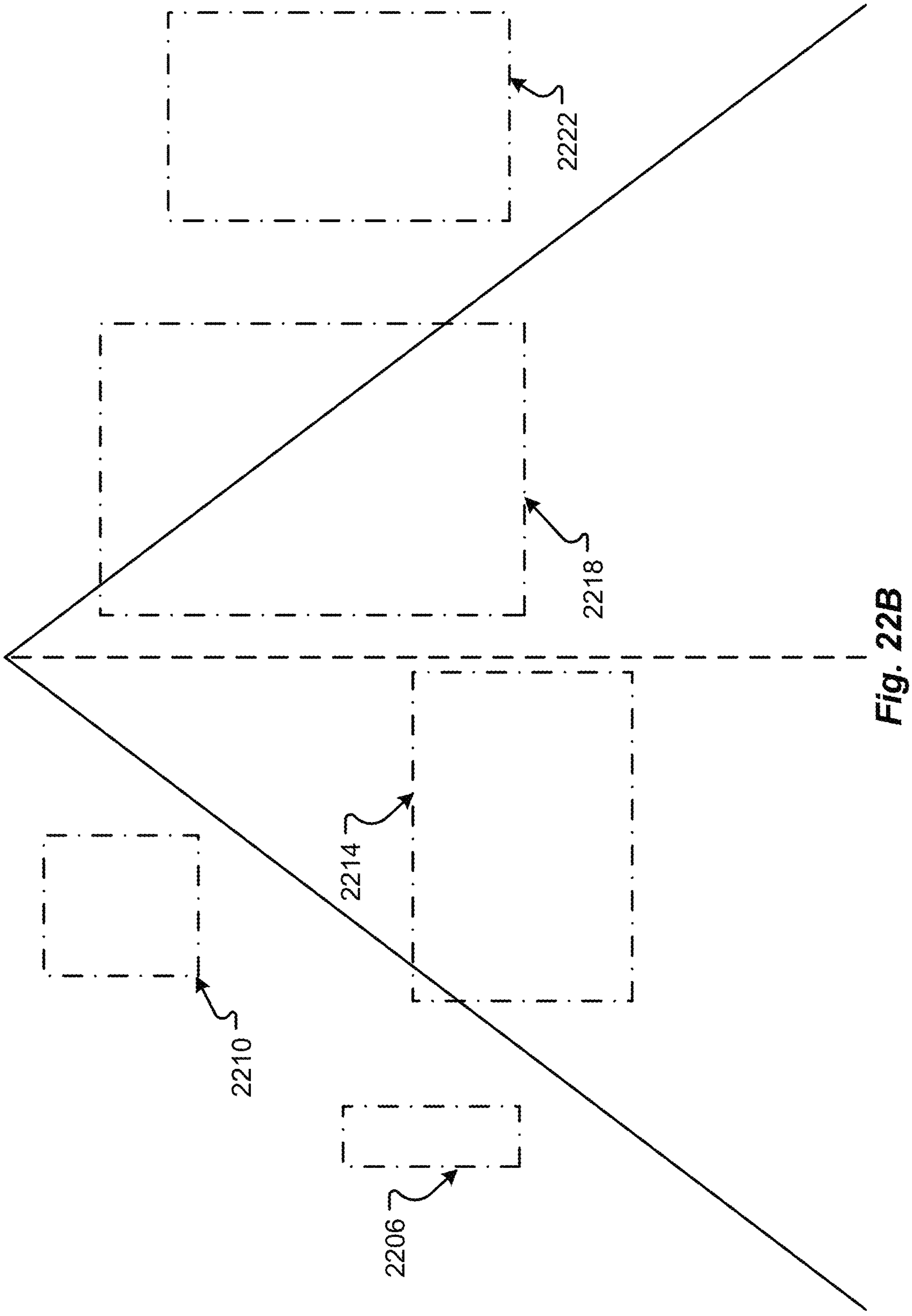
FIG. 22B depicts additional details related to object detection in accordance with embodiments of the present disclosure.

Detecting an object may be a multipart process. After rough objects are identified, the object detection node can automatically draw a box over the object(s) in the image. For example, the object detection node may draw boxes 2206, 2210, 2214, 2218, and 2222 around objects 2204-2220. The image 2200 with only the boxes showing the location of the objects may be as shown in FIG. 22B. The operation shown in FIG. 22B may actually occur before identifying the objects in each box 2206-2222, which may be as shown in FIG. 22A. The ML model may then identify the object in each of the boxes, including identifying object 2216 in box 2218 as a second vehicle.

Figure 22C:
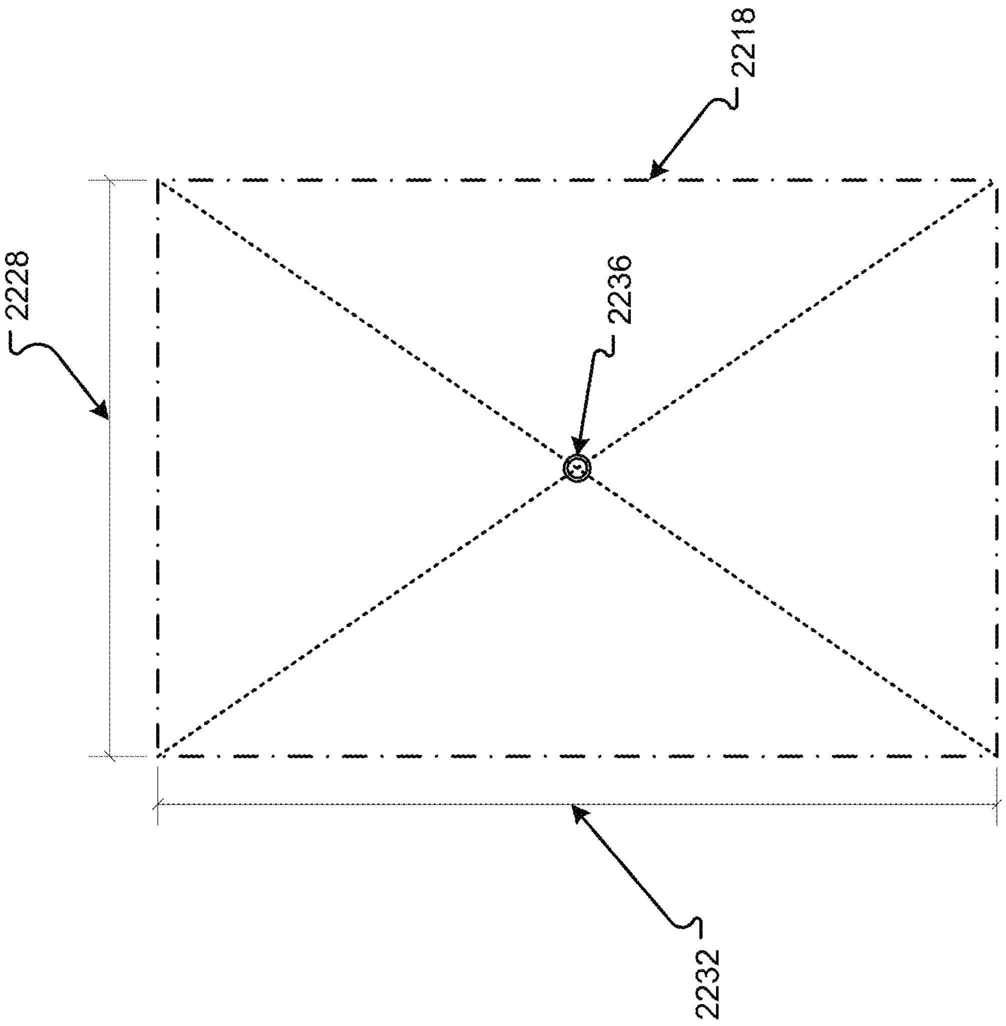
FIG. 22C depicts additional details related to object detection in accordance with embodiments of the present disclosure.

As shown in FIG. 22A, the boxes 2206-2220 can mimic the size of the object both in height and width in the two-dimensional image 2200. Thus, the boxes 2206-2220 delineate the extents (e.g., the dimensions) of the object within the image. As shown in FIG. 22C, the box 2218 for object 2216 can provide the width 2228 and/or height 2232 of the second vehicle in the image 2200, which may be measured in pixels in the image 2200. Further, the object detection node can determine a center 2236 of the box, and thus, the center of the object 2216 in the image 2200. The location of the center 2236, in the image 2200, may be stored.

The object detection node executed by the processor 204 can then determine if one of the objects, in view in the image 2200 is a second or another vehicle 2212, 2216, in step 716. For example, the processor 204 can determine if vehicle 124 is being seen by the sensors 208 of vehicle 104. As shown in FIG. 22A, the object detection node can determine that object 2216 is a second vehicle in the same lane 2224 as the present vehicle. If a second vehicle 2216 is in view in the image and may be followed (e.g., is traveling in the same lane 2224 in the same direction), the process 700 proceeds YES to step 724. However, if no second vehicle is in view or the objects are not vehicles, the process 700 proceeds NO to step 720.

In step 720, the processor changes the autonomous driving mode to "lane follow," to follow a lane 2224 viewed in the driving environment. In the lane follow mode, the processor 204 follows road features, e.g., the marked lanes, curbs, tire tracks, etc. Lane following may be as described hereinafter in conjunction with FIGS. 12 and 25A-25D. Thus, the processor 204 can still control the operation of the vehicle 104 autonomously when there is no vehicle to follow.

The processor 204, in contrast, can change the autonomous state to follow automatically an identified second vehicle 124, in step 724. Thus, a particular distance from the vehicle 124 and alignment to that vehicle 124 may be maintained through controls sent through the CAN bus 232 to the control systems 236-254. If the vehicle 124 moves, e.g., changes lanes, the vehicle 104 may then change lanes to continue to follow the vehicle 124. In this way, the needed computational effort by the processor 204 is greatly reduced.

Figure 22D:
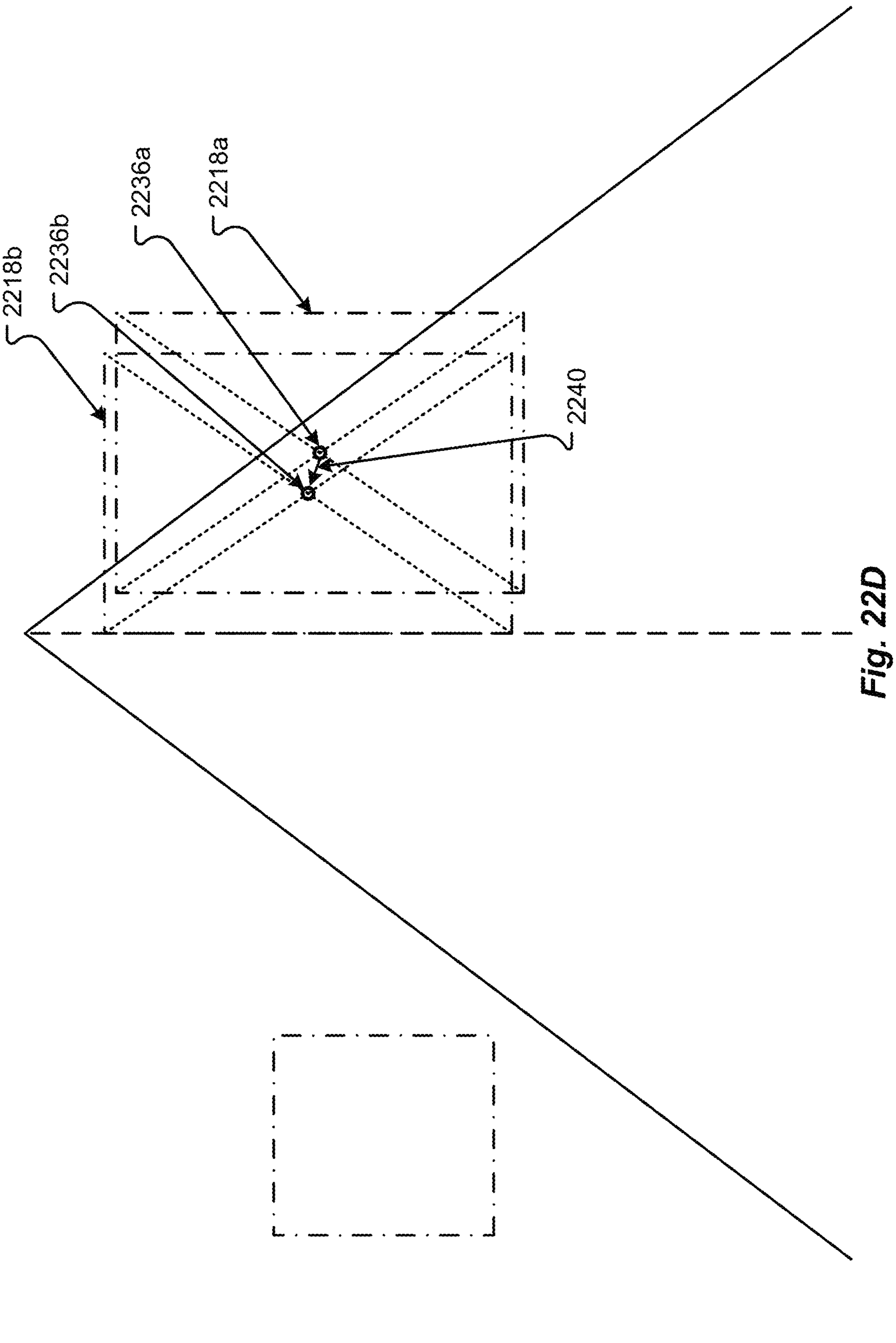
FIG. 22D depicts additional details related to object detection in accordance with embodiments of the present disclosure.
Figure 22E:
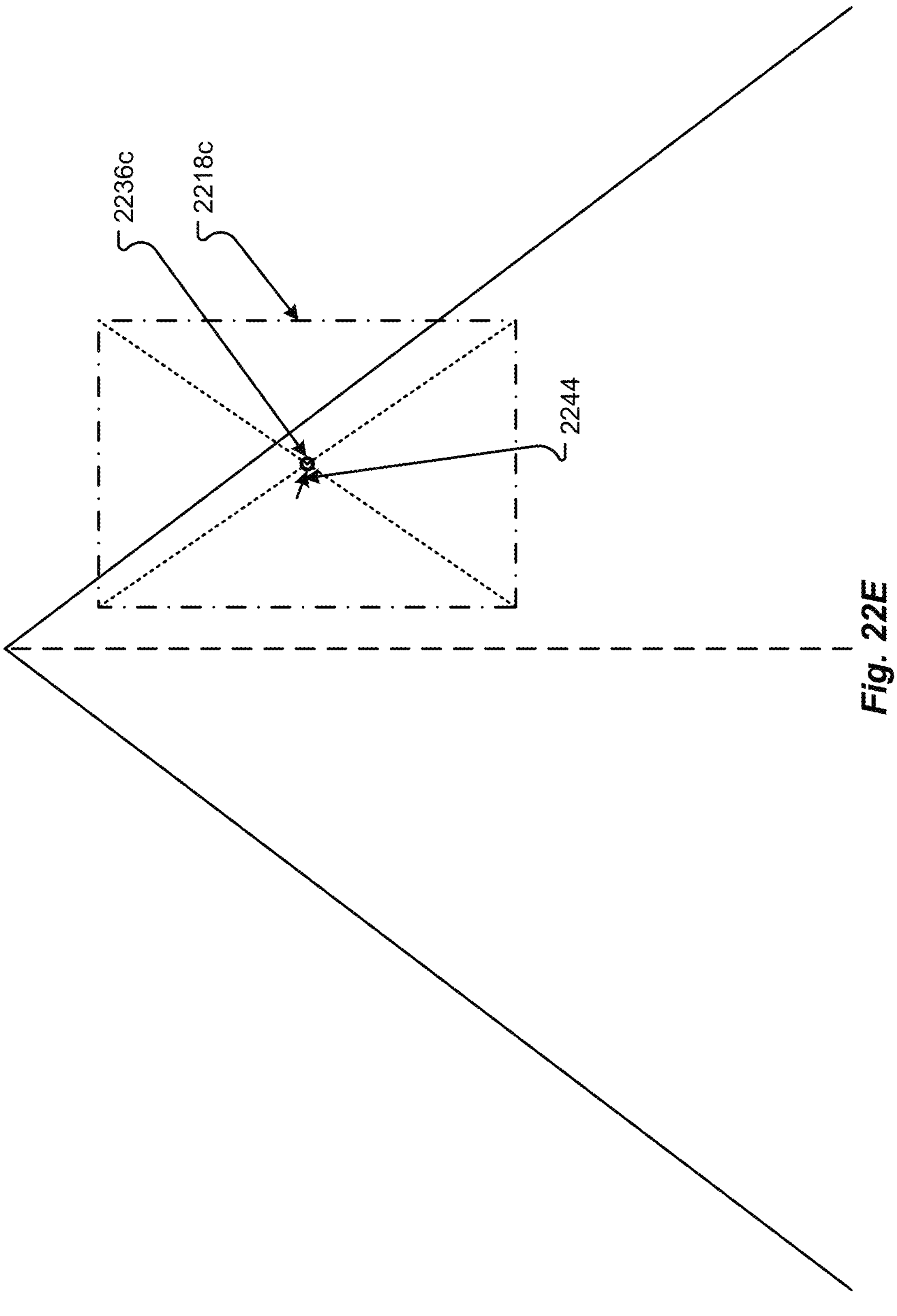
FIG. 22E depicts additional details related to object detection in accordance with embodiments of the present disclosure.

The control node can follow the second vehicle 2216, as shown in FIGS. 22A-22E by maintaining the location of the center 2236 of the box 2218 in each image provided to the processor. For example, as shown in FIG. 22D, the second vehicle 2216 may have moved in the driving environment. The movement of the second vehicle 2216 in the driving environment can appear as a shifting of a first location of the box **2218*a* in a first image to a second location of the box 2218*b* in a subsequent image. The vehicle follow node can witness the change as a change in position of the center 2236*a* from a first location to a second location of the center 2236*b* along vector 2240. To adjust to the movement, the control node can issue a steering change at a determined steering angle and a velocity change (either by braking or by accelerating) to the vehicle controls 236-254 that will reverse the vector 2240. Thus, as shown in FIG. 22E, a reverse vector 2244 is applied by changing steering and/or speed. This control change can then move the location of the center 2236*c*, and thus, box 2218*c*, back to the same position as center 2236*a*. Thus, to follow the second vehicle, the control object maintains the center 2236 of the box 2218** in a same position in subsequent images.

Further, the ability to drive autonomously is simplified as only a single object need be tracked for driving in the environment 100. Also, the second vehicle may also be blocking the view of the lanes, and thus, the vehicle may need to follow the second vehicle to continue autonomous driving.

However, the processor 204 can still monitor the images from the sensors 208 to determine a change in environment 100, in step 728. For example, the processor 204 can monitor the environment 100 to determine if the vehicle 124 deviates from the desired route necessitating a change to another vehicle to follow. Further, the processor 204 can continue to follow the vehicle 124 while trying to identify possible threats or obstacles for the vehicle 104. In this way, more processing is spent on safety then on simply driving the vehicle 104.

It should be noted that the center 2236 may not be maintained in the same exact position in all driving situations. For example, when cornering or turning, maintain the center 2236 in the same position may cause the vehicle 104 to drift out of the lane or take the corner to sharply, which may be dangerous. Thus, the control node can determine when the vehicle is turning. And when the vehicle is turning, the position used to follow the center 2236 of the box 2218 may be adjusted by at least one pixel in the image to ensure the vehicle 104 turns properly and safely.

In some configurations, the second vehicle 2216 may be in a caravan with the vehicle 104. A caravan is a joint trip taken by two or more vehicles that know each other and are associated. The association may be by belonging to a same group, organization, company, etc. The caravan can include a communication link established between the vehicles. For example, the communication link 112B may be established and/or maintained between the first vehicle 104 and the second vehicle 128. When determining objects, the object detection node may identify the second vehicle 2216 as part of the caravan. The identification of the second vehicle may be by identifying indicia (e.g., a license plate, an image of the vehicle, a bumper sticker, bar code, QR code, another marking, a dent or disfigurement, and/or other indicia) on the second vehicle 2216. The indicia may be received and known to the object detection node.

Figure 8:
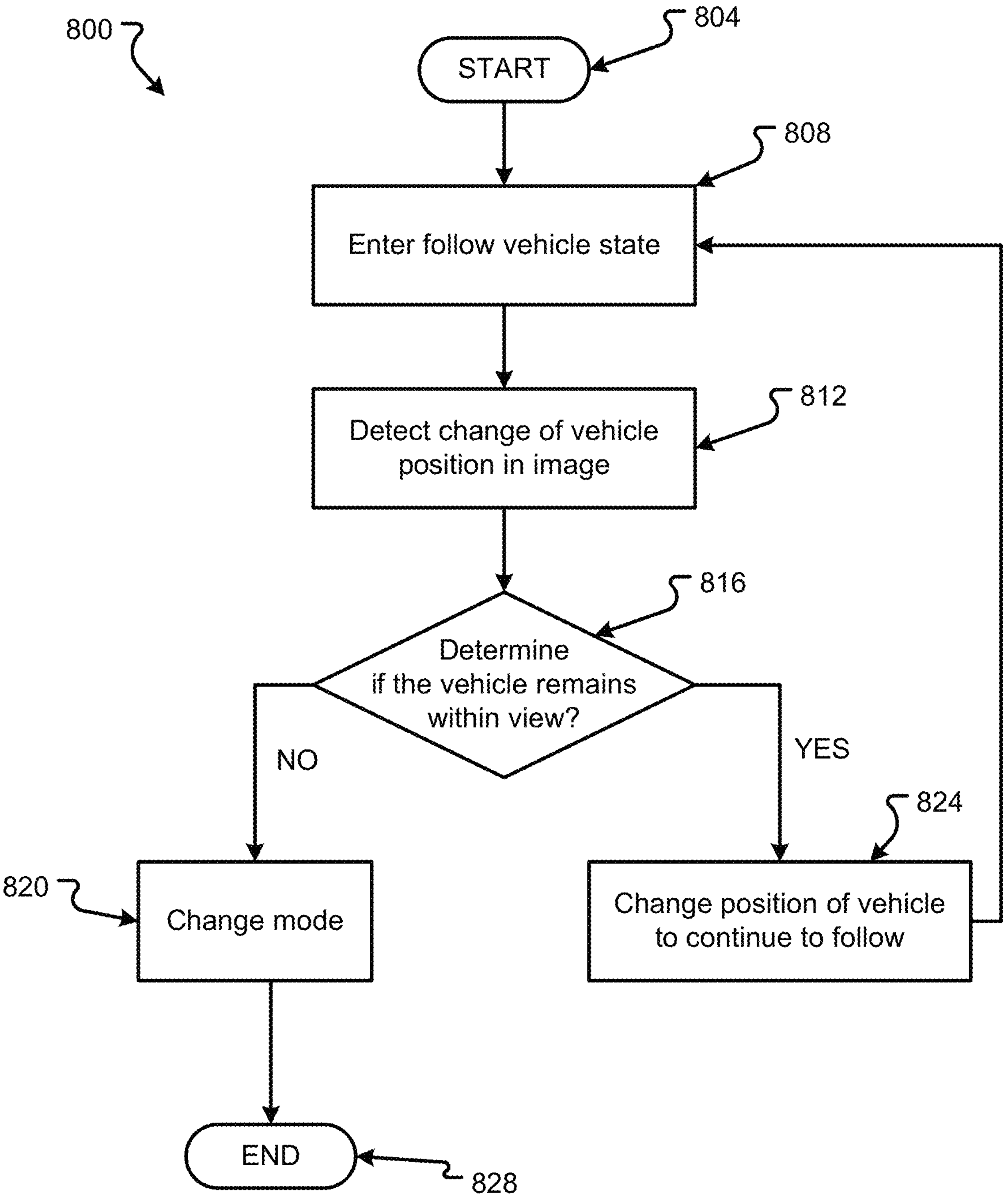
FIG. 8 depicts a second method for autonomously driving a vehicle in accordance with embodiments of the present disclosure.

FIG. 8 shows a method for autonomously driving a vehicle in accordance with embodiments of the present disclosure. A general order for the steps of the method 800 is shown in FIG. 8. Generally, the method 800 starts with a start operation 804 and ends with an end operation 828. The method 800 can include more or fewer steps or can arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, an ASIC, a FPGA, a SOC, or other hardware device. Hereinafter, the method 800 shall be explained with reference to the systems, components, devices, modules, software, signals, data structures, interfaces, methods, etc. described in conjunction with FIGS. 1-7 and 9-28.

The control node, executed by the processor 204, can enter the autonomous state to follow an identified second vehicle 124, in step 808. Thus, a particular distance from the second vehicle 124 (e.g., as determined by a radar or other sensor) and alignment (e.g., as determined by the images as described in conjunction with FIGS. 22A-22E) to that vehicle 124 may be maintained through controls sent through the CAN bus 232 to the control systems 236-254. The processor 204 follows the vehicle 124 along the route by monitoring that vehicle 124 and maintaining an orientation to that vehicle 124.

Thus, the processor 204 can detect a change of position of the vehicle 124, in step 812. In processing the image data through the object detection nodes, a change in position of the vehicle 124 may be determined by a shift in the position of the vehicle 124 object in one image to a subsequent image, as described in previously in conjunction with FIGS. 22D and 22E. Then, if the vehicle 124 moves, e.g., changes lanes, the vehicle 104 may then determine whether the vehicle 124 remains in view, in step 816. The vehicle 104 can continue along a route regardless of a vehicle 124 staying on the same route. Thus, in some situations, the vehicle 124 may exit the route and disappear from the image generated by the sensors 208. The processor 204 can determine that the vehicle 124 has deviated from the route and no longer is present in the images of the sensor 208. If the vehicle 124 no longer is visible in the images, the process 800 may proceed NO to step 820. When the vehicle 124 remains in the image, the process 800 can proceed YES to step 824.

In step 820, the processor 204 can change the driving mode. The driving mode may be switched to the lane follow mode, as described in conjunction with FIG. 7. In other situations, the processor 204 can change the mode by selecting a new third vehicle to follow while still in the follow vehicle mode.

Should the vehicle 124 remain visible, the processor 204 can decide how to follow the vehicle and change position of the vehicle 104 to continue to follow vehicle 124, in step 824. In some situations, the positional change of the vehicle 124 may be small or inconsequential, e.g., lane drift. In these situations, the processor 204 can decide not to follow or ignore the change of precise position of the second vehicle. In other situations, the vehicle 124 may change lanes, accelerate, decelerate, etc. The processor 204 may decide to imitate these changes by issuing commands through the CAN bus 232 to the control systems 236-254. Thus, the processor 204 maintains the vehicle 104 in a relation with vehicle 124 and changes automatically the position of the first vehicle to match the change in the position of the second vehicle as described previously in conjunction with FIGS. 22D, 22E.

Figure 9:
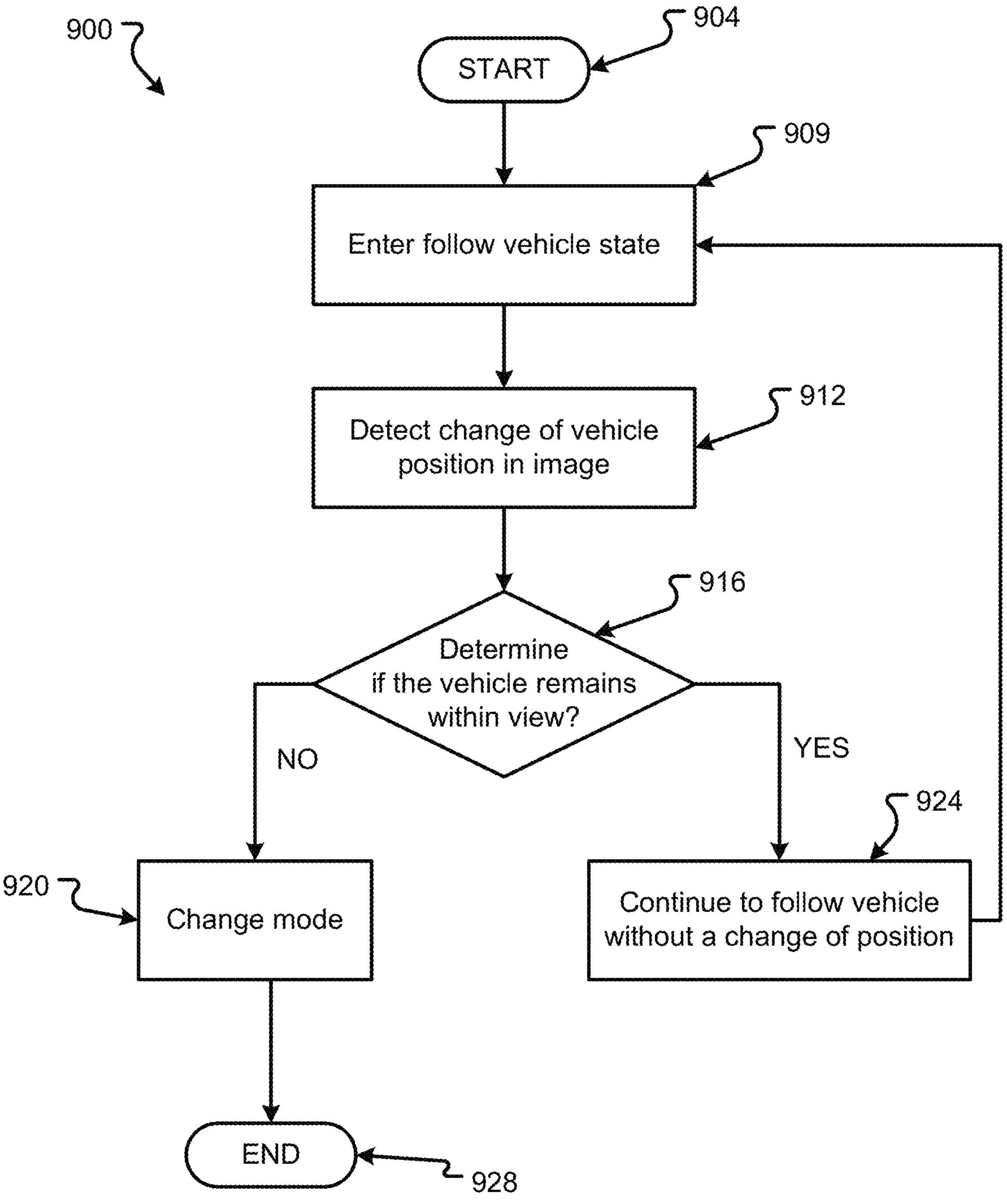
FIG. 9 depicts a third method for autonomously driving a vehicle in accordance with embodiments of the present disclosure.

FIG. 9 shows a method for autonomously driving a vehicle in accordance with embodiments of the present disclosure. A general order for the steps of the method 900 is shown in FIG. 9. Generally, the method 900 starts with a start operation 904 and ends with an end operation 928. The method 900 can include more or fewer steps or can arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, an ASIC, a FPGA, a SOC, or other hardware device. Hereinafter, the method 900 shall be explained with reference to the systems, components, devices, modules, software, signals, data structures, interfaces, methods, etc. described in conjunction with FIGS. 1-8 and 10-28.

The processor 204 can enter the autonomous state to follow an identified vehicle 124, in step 908. Thus, an association but not necessarily a particular distance or alignment to that vehicle 124 may be maintained through controls sent through the CAN bus 232 to the control systems 236-254. The processor 204 follows the vehicle 124 along the route by monitoring that vehicle 124 and maintaining an association with that vehicle 124. The association is a relationship with the vehicle 124, in that, the vehicle 104 follows vehicle 124 but allows some changes in where the vehicle 124 is compared to vehicle 104.

Thus, the processor 204 can detect a change of position of the vehicle 124, in step 912. In processing the image data through the ROS nodes 304, a change in position of the vehicle 124 may be determined by a shift in the position of the vehicle 124 object in one image to a subsequent image, as described previously in conjunction with FIGS. 22A-22E. Then, if the vehicle 124 moves, e.g., changes lanes, the vehicle 104 may then determine whether the vehicle 124 remains in view, in step 916. The vehicle 104 can continue along a route regardless of a vehicle 124 staying on the same route. Thus, in some situations, the vehicle 124 may exit the route and disappear from the image generated by the sensors 208. The processor 204 can determine that the vehicle 124 has deviated from the route and no longer is present in the images of the sensor 208. If the vehicle 124 is no longer is visible in the images, the process 900 may proceed NO to step 920. When the vehicle 124 remains in the image, the process 900 can proceed YES to step 924.

In step 920, the processor 204 can change the driving mode. The driving mode may be switched to the lane follow mode, as described in conjunction with FIG. 7. In other situations, the processor 204 can change the mode by selecting a new vehicle to follow while still in the follow vehicle mode.

Figure 23A:
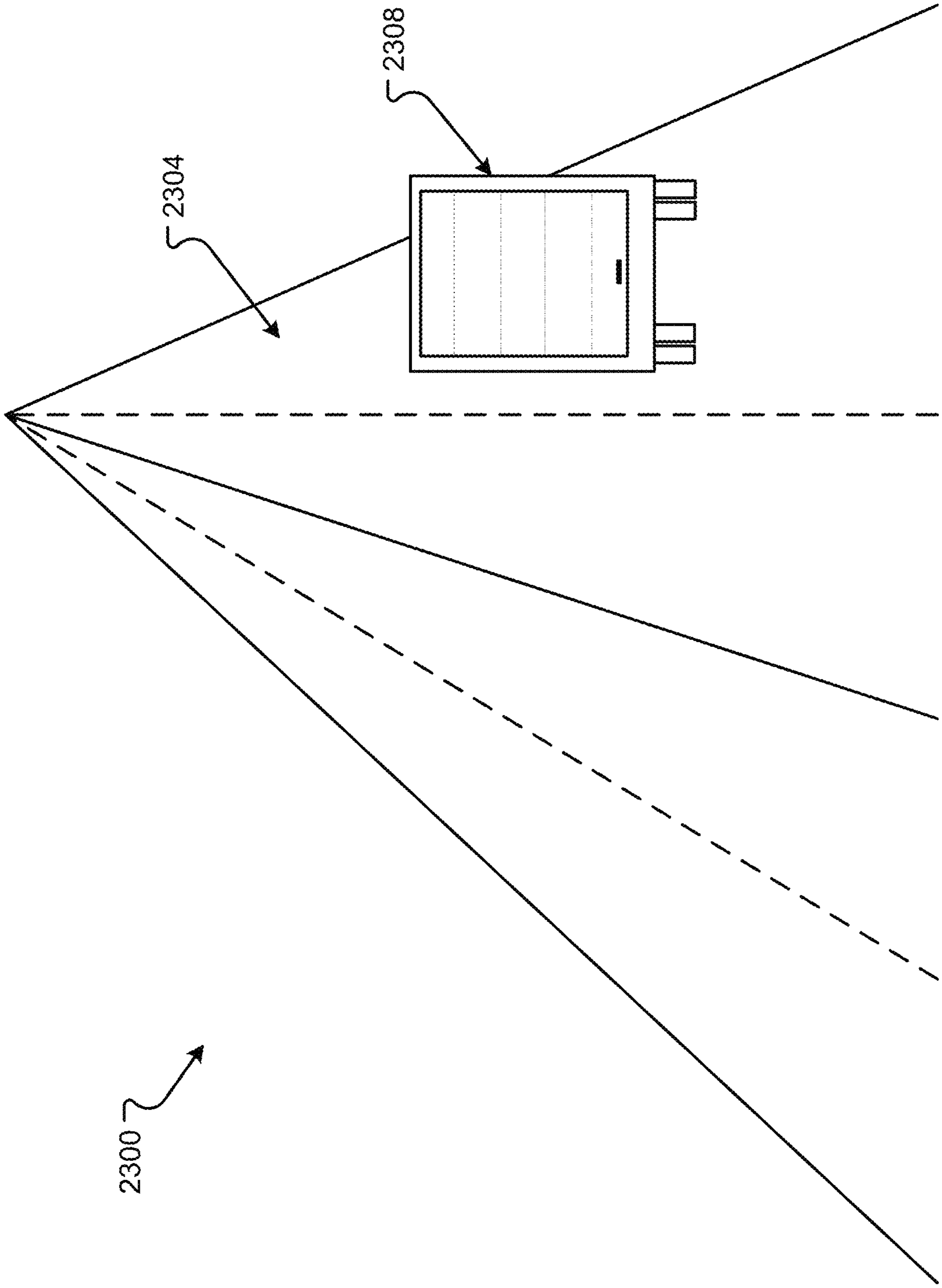
FIG. 23A depicts additional details related to following a vehicle in accordance with embodiments of the present disclosure.
Figure 23B:
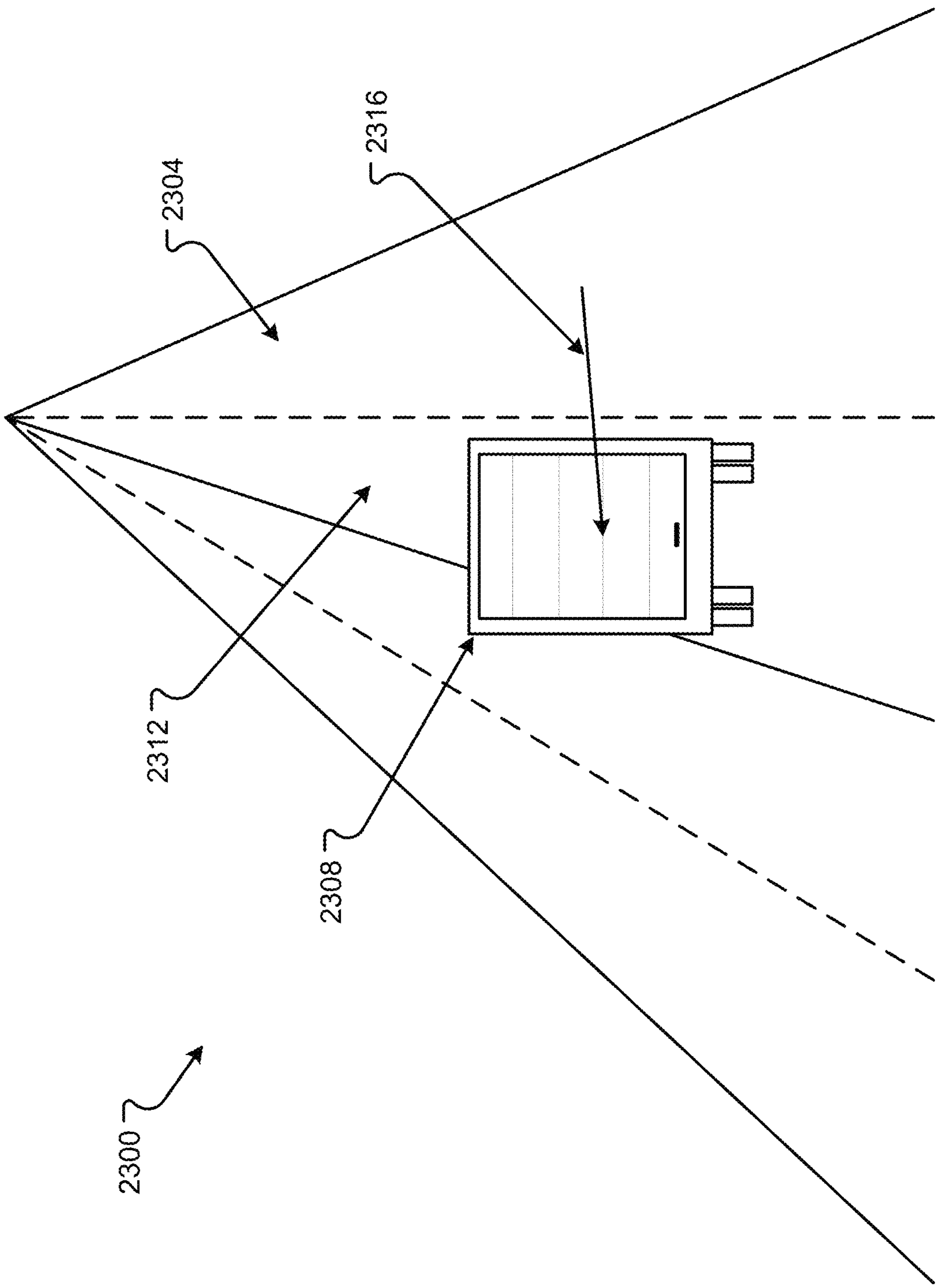
FIG. 23B depicts additional details related to following a vehicle in accordance with embodiments of the present disclosure.

Should the vehicle 124 remain visible, the processor 204 can decide how to follow the vehicle 124 and change or not change the position of the vehicle 104 to continue to follow vehicle 124, in step 924. In some situations, the positional change of the vehicle 124 may be small or inconsequential, e.g., lane drift. In these situations, the processor 204 can decide not to follow the change of position precisely. In other situations, the vehicle 124 may change lanes, accelerate, decelerate, etc. For example, as shown in FIGS. 23A and 23B, the vehicle 104 may be proceeding in driving environment 2300 along lane 2304. The vehicle 104 may be following vehicle 2308 presently. Then, the vehicle 2308 may change lanes from lane 2304 to lane 2312, as shown in FIG. 23B by vector 2316.

The processor 204 may decide to still not imitate these changes, but allow variation in the position of the vehicle 2308 compared to the vehicle 104. In some driving situations, mimicking the change in position may be dangerous. If someone is in lane 2312 to the side of vehicle 104, it may not be possible for vehicle 104 to change lanes similar to vehicle 2308.

If the change in position is not mimicked, the relationship in distance and orientation between the vehicle 104 and the second vehicle 2308 may change. For example, vehicle 124 may move in front of vehicle 2308 in the other lane. If the vehicle 2308 begins to move away from vehicle 104, then the processor 204 may attempt to keep some distal relationship with vehicle 124 by issuing commands through the CAN bus 232 to the control systems 236-254. However, if the vehicle 124 remains relatively proximal to vehicle 104, the processor 204 may not make any changes in the position or driving settings and stay in the same lane 2304 and/or at the same speed. Thus, the processor 204 maintains the vehicle 104 in a follow mode with the second vehicle 2308 but not necessarily in parrot every movement of vehicle 2308.

Figure 10:
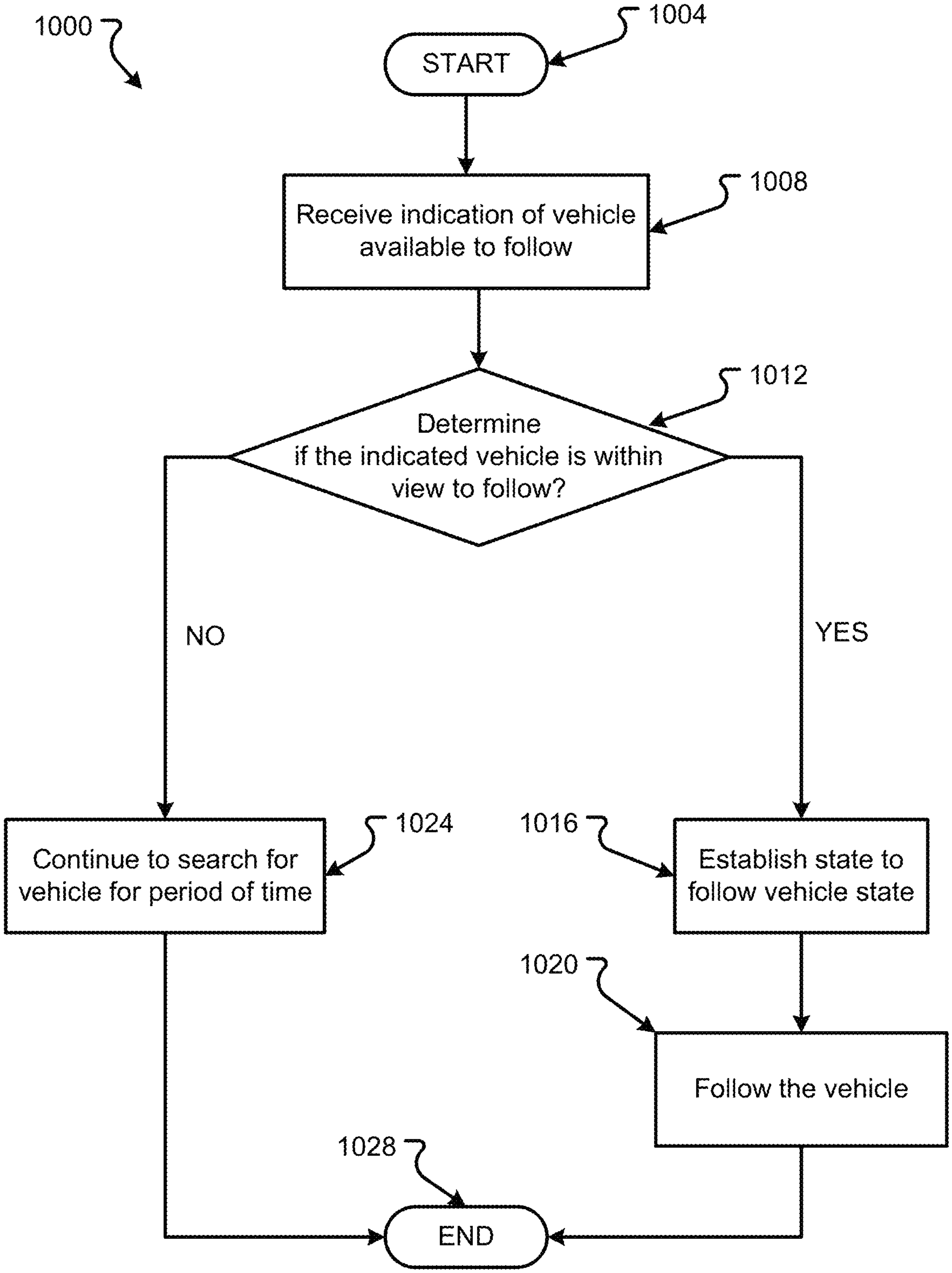
FIG. 10 depicts a fourth method for autonomously driving a vehicle in accordance with embodiments of the present disclosure.

FIG. 10 shows a method for autonomously driving a vehicle in accordance with embodiments of the present disclosure. A general order for the steps of the method 1000 is shown in FIG. 10. Generally, the method 1000 starts with a start operation 1004 and ends with an end operation 1028. The method 1000 can include more or fewer steps or can arrange the order of the steps differently than those shown in FIG. 10. The method 1000 can be executed as a set of computer-executable instructions executed by a computer system and encoded or stored on a computer readable medium. Further, the method 1000 can be performed by gates or circuits associated with a processor, an ASIC, a FPGA, a SOC, or other hardware device. Hereinafter, the method 1000 shall be explained with reference to the systems, components, devices, modules, software, signals, data structures, interfaces, methods, etc. described in conjunction with FIGS. 1-9 and 11-28.

Figures 27A, 27B:
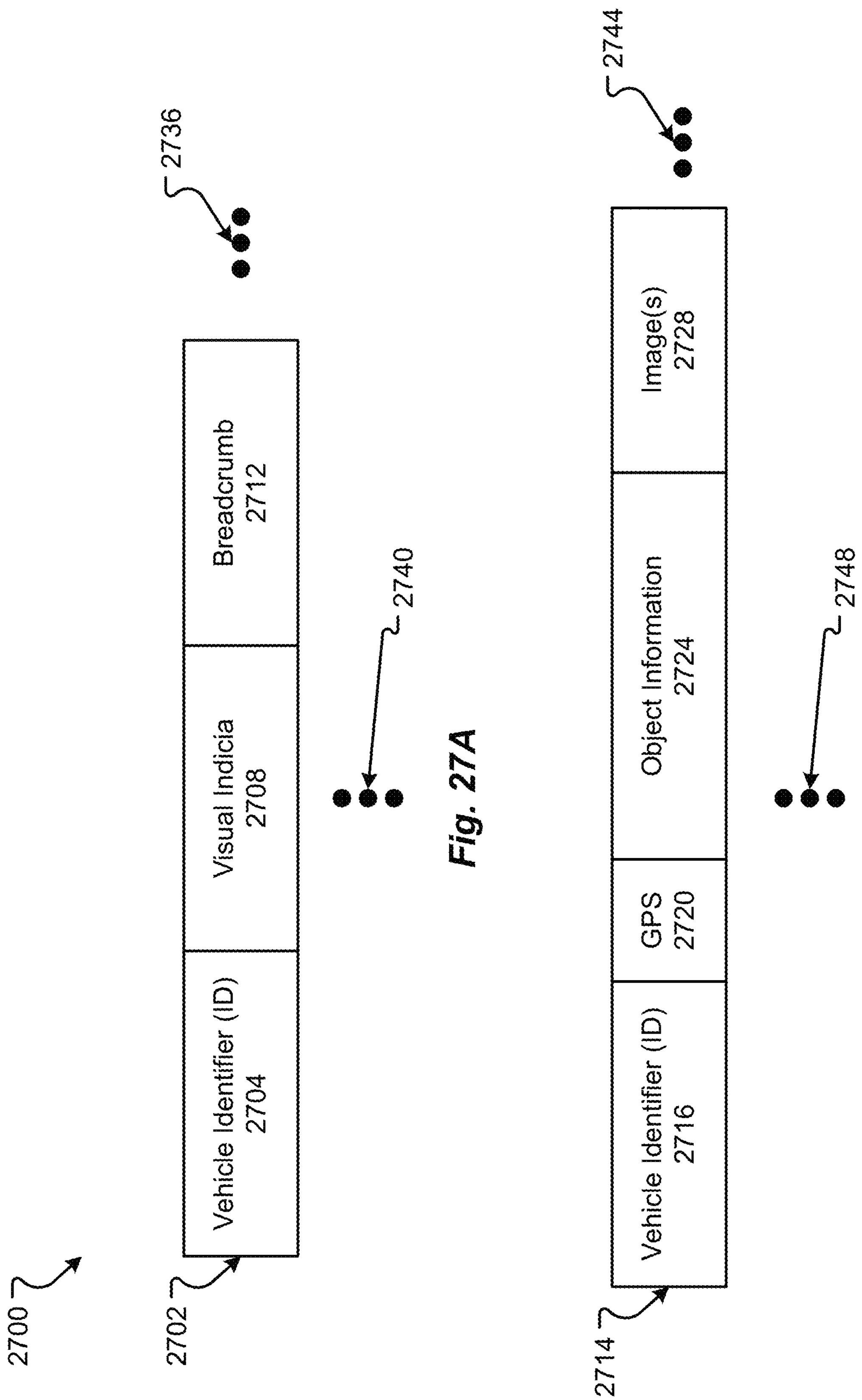
FIG. 27A depicts additional details of a data structure for storing and/or communication information in accordance with embodiments of the present disclosure.
FIG. 27B depicts additional details of a data structure for storing and/or communication information in accordance with embodiments of the present disclosure.

The processor 204 can receive an indication of a vehicle 124 that may be available to follow, in step 1008. The processor 204 can receive a signal for another entity, e.g., the server 122, which identifies a vehicle 124, in a caravan, having particular characteristics that may be traveling along the same route, at least for a portion of the route. The signal sent to the processor 204 can include identifying information for the vehicle 124, for example, the vehicle 104 may receive data structure 2702 from a data store 2700, as shown in FIG. 27A. The data structure can include a vehicle identifier (ID), visual indicia 2708, and or breadcrumbs 2712. There may be more or fewer fields in data structure 2702, as represented by ellipses 2736. Each caravan or association of vehicles can have a data structure 2702, as represented by ellipses 2740.

The vehicle ID can be automatically generated and represent any type of identifier including one or more of, but not limited to, a numeric ID, a license plate number, an alphanumeric ID, a globally unique ID (GUID), etc. The visual indicia can be any visual information, which can be provided as one or more of, but is not limited to, an image of the vehicle, a vehicle type, a vehicle make and/or model, a vehicle color, a license plate number, a bumper sticker, an image of damage to the vehicle, etc. The breadcrumb 2712 is an electronic beacon or waypoint of the second vehicle that allows the first vehicle to follow the route of the second vehicle even if the second vehicle is out of sight. Thus, the breadcrumb 2712 can include one or more of, but is not limited to, a Global Positioning Satellite (GPS) coordinates for the second vehicle at some moment in time, images seen by the second vehicle at a moment in time, etc. The second vehicle 2408 and the first vehicle may maintain a communication link 112B, while caravanning, to continue to exchange information, for example, data structure 2702.

The image processing node, executed by the processor 204 and implemented in the convolutional neural network as an ML model, may process the images of the driving environment 100 to locate the identified vehicle 2408. Within the image, different edges, the position of those edges, and other information can be determined. Conditions can include an edge or other information, such as movement of an edge over time, location of other sensed data, etc. The vehicle 2408 may be identified and followed as described previously in conjunction with FIGS. 22A-22E.

From the conditions, a next ML model associated with an object detection node may identify one or more objects within the image. The shape of the object can inform the processor 204 as to what type of object is being sensed. This information may then be stored by the processor 204 for determining actions required for driving in the environment 100. After identifying vehicles within the image, an object detection node can compare the object to the information provided by data structure 2702.

Figure 24A:
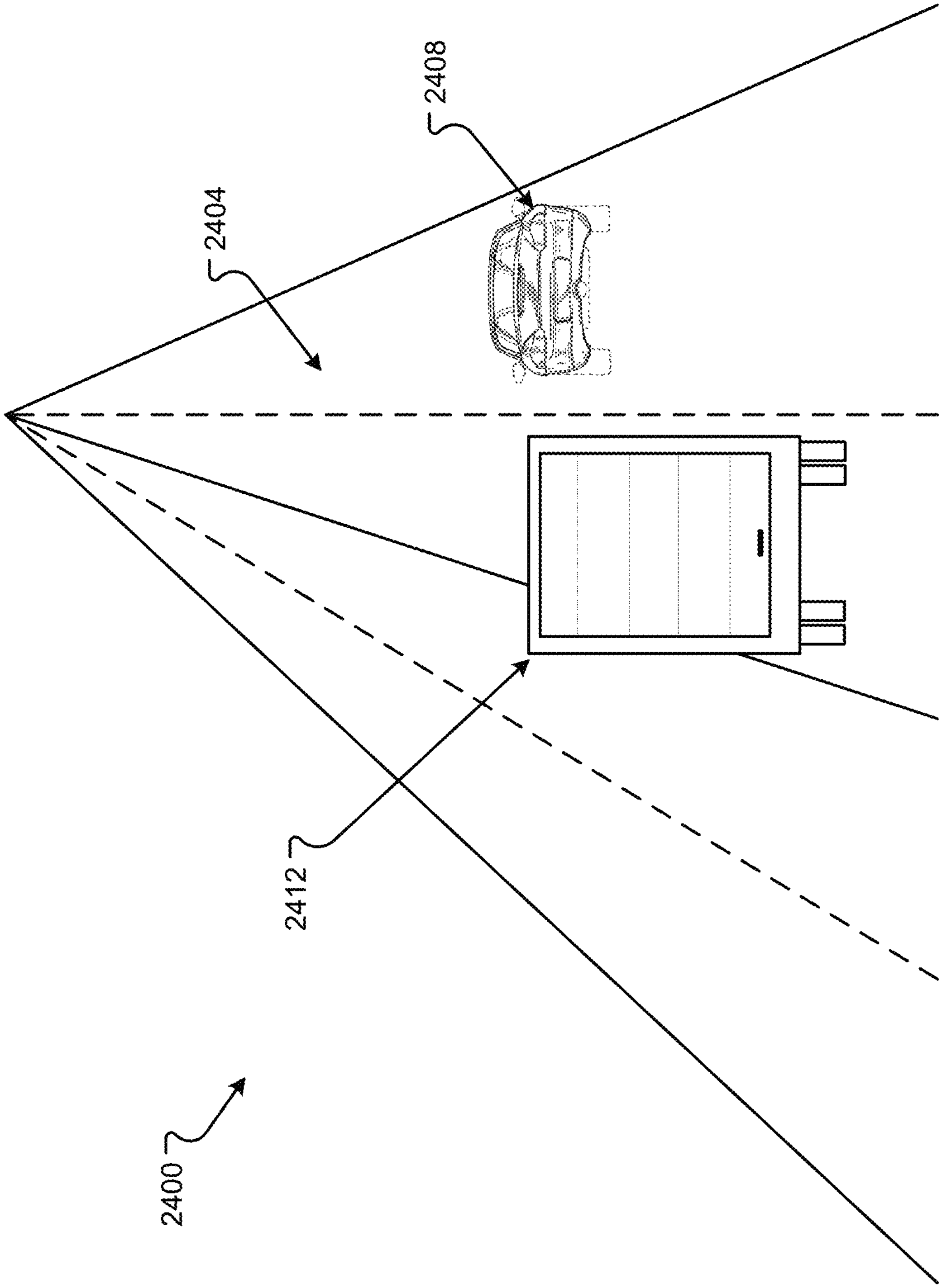
FIG. 24A depicts additional details related to following a lane in accordance with embodiments of the present disclosure.
Figure 24B:
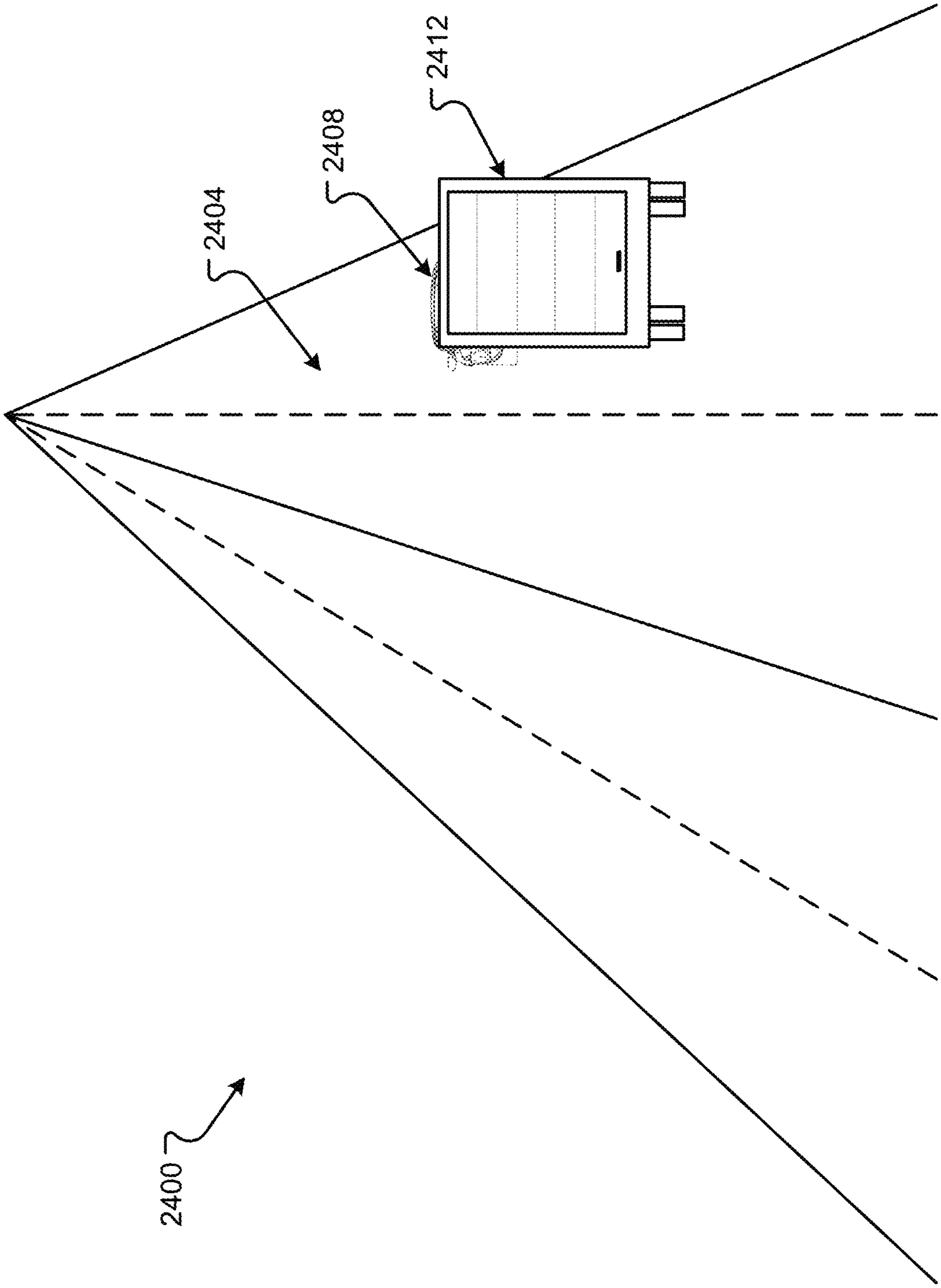
FIG. 24B depicts additional details related to following a lane in accordance with embodiments of the present disclosure.

The processor 204 can then determine if the identified vehicle is in view in the image, in step 1012. For example, the processor 204 can determine if vehicle 2408 is being seen by the sensors 208 of vehicle 104. If a vehicle 2408 is in view, as shown in FIG. 24A, the process 1000 proceeds YES to step 1016. However, if the identified vehicle is not in view, the process 1000 proceeds NO to step 1024. For example, another vehicle 2412 may enter lane 2404 between vehicle 104 and vehicle 2408, as shown in FIGS. 24A and 24B. Thus, as shown in FIG. 24B, vehicle 2408 is obscured and not in view of vehicle 104.

In step 1024, the control node changes the autonomous driving mode to "lane follow" or "vehicle follow" but using a different vehicle, e.g., vehicle 2412, other than the vehicle 2408 identified, as described in conjunction with FIG. 7 and FIGS. 24A and 24B. Then, for some period of time, the processor 204 may continue to search for the identified vehicle 2308 while autonomously driving in a different mode. The period of time may be predetermined, established by a user, and/or established by a third party, for example, the server 122, the vehicle manufacturer, etc. Thus, the method 1000 can return to step 1012 for successive iterations of step 1012 until the period of time expires or another event cause the process to proceed to the end operation 1028.

The control node, in contrast, can maintain the autonomous state to follow the second vehicle 2408, in step 1016. Thus, control node can establish a spatial relationship with the identified and discovered vehicle 2408. The control node, thus, can establish a particular distance from the vehicle 2408 and alignment to that vehicle 2408 that may be effectuated and maintained through controls sent through the CAN bus 232 to the control systems 236-254.

The processor 204 may then follow the vehicle 2408, in step 1020. If the vehicle 2408 moves, e.g., changes lanes, the vehicle 104 may then change lanes to continue to follow the vehicle 124. In this way, the needed computational effort by the processor 204 is greatly reduced. Further, the ability to drive autonomously is simplified as only a single object need be tracked to for driving in the environment 100 and can drive autonomously when another vehicle obscures the lane lines.

Figure 11:
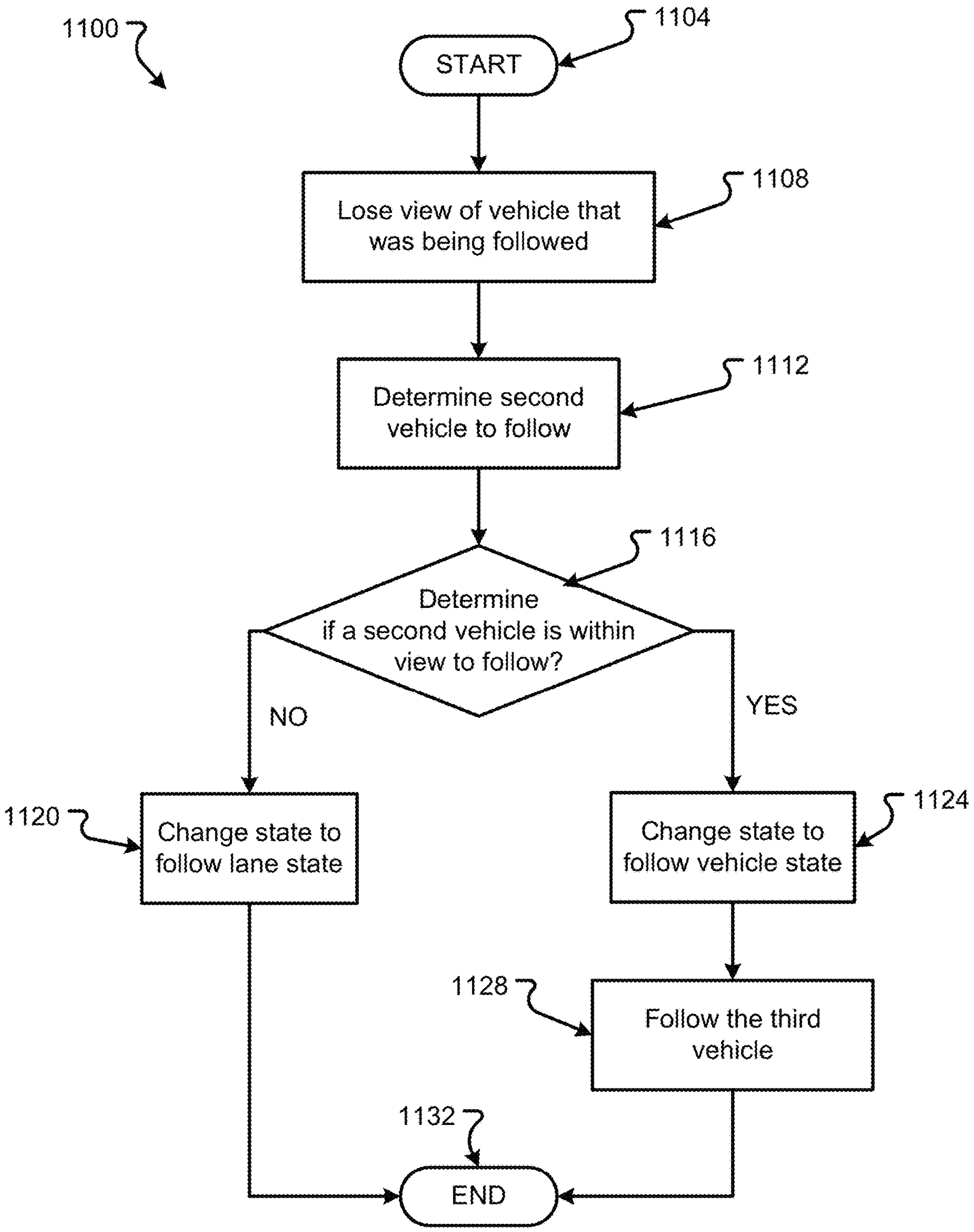
FIG. 11 depicts a fifth method for autonomously driving a vehicle in accordance with embodiments of the present disclosure.

FIG. 11 shows a method for autonomously driving a vehicle in accordance with embodiments of the present disclosure. A general order for the steps of the method 1100 is shown in FIG. 11. Generally, the method 1100 starts with a start operation 1104 and ends with an end operation 1132. The method 1100 can include more or fewer steps or can arrange the order of the steps differently than those shown in FIG. 11. The method 1100 can be executed as a set of computer-executable instructions executed by a computer system and encoded or stored on a computer readable medium. Further, the method 1100 can be performed by gates or circuits associated with a processor, an ASIC, a FPGA, a SOC, or other hardware device. Hereinafter, the method 1100 shall be explained with reference to the systems, components, devices, modules, software, signals, data structures, interfaces, methods, etc. described in conjunction with FIGS. 1-10 and 12-28.

The control node can enter the autonomous state to follow an identified vehicle 124. For example, as shown in FIGS. 24A and 24B, an association with a vehicle 2408 may be maintained through controls sent through the CAN bus 232 to the control systems 236-254. The control node follows the vehicle 2408 along the route by monitoring that vehicle 2408 and maintaining an association with that vehicle 2408. The association is a relationship with the vehicle 2408, in that, the vehicle 104 follows vehicle 2408 but allows some changes in where the vehicle 2408 is compared to vehicle 104.

The control node can then detect a change of position of the vehicle 2408. In processing the image data through the image processing node, a change in position of the vehicle 2408 may be determined by a shift in the position of the vehicle 2408 object in one image to a subsequent image, as described previously in conjunction with FIGS. 22A-22E. Then, if the vehicle 2408 moves, e.g., changes lanes, the vehicle 104 may then determine whether the vehicle 2408 remains in view. The vehicle 104 can continue along a route regardless of a vehicle 2408 staying on the same route. Thus, in some situations, the vehicle 2408 may exit the route, and the processor 204 may then lose a view of the vehicle 2408 from the image(s) generated by the sensors 208, in step 1108. For example, the vehicle 2408 may exit a road, may change lanes and become obscured by another vehicle, may accelerate away from the vehicle 104, may decelerate and end up behind vehicle 104 (making following physically impossible), another vehicle may position itself between the vehicle 104 and vehicle 2408 (as shown in FIGS. 24A and 24B, etc.

The processor 204 can determine that the vehicle 2408 has deviated from the route (e.g., is no longer in lane 2404 driving in a same direction) and/or is no longer is present in the images of the sensor 208. If the vehicle 2408 no longer is visible in the images, the control node can then determine to attempt to follow a third vehicle 2412 in the view of the sensors 208, in step 1112. The control node can then determine if a third vehicle is in view in the image and located the third vehicle to follow in subsequent images, in step 1116, as described previously in conjunction with FIGS. 22A-22E. For example, the control node can determine if vehicle 2412 is being seen by the sensors 208 of vehicle 104. If a third vehicle 2412 is in view, the process 1100 proceeds YES to step 1124. However, if no vehicle is in view, the process 1100 proceeds NO to step 1120. In step 1120, the control node can change the driving mode. The driving mode may be switched to the lane follow mode, as described in conjunction with FIG. 7. Thus, the vehicle 104 can maintain a same route while changing to another autonomous driving mode, e.g., the lane following mode.

The control node, in contrast, can change the autonomous state to follow the third vehicle 2412, in step 1124. The control node can decide how to follow the third vehicle 2412 and change or not change the position of the vehicle 104 to follow vehicle 2412, in step 1128. In some situations, the positional change of the vehicle 2412 may be small or inconsequential, e.g., lane drift. In these situations, the control node can decide not to follow the change of position precisely. In other situations, the vehicle 2412 may change lanes, accelerate, decelerate, etc. The control node may decide to still not imitate these changes, but allow variation in the position of the vehicle 2412 to the vehicle 104. If the vehicle 2412 begins to move away from vehicle 104, then the control node may attempt to keep some distal relationship with vehicle 2412 by issuing commands through the CAN bus 232 to the control systems 236-254. However, if the vehicle 2412 remains relatively proximal to vehicle 104 and maintains a same route as the first vehicle 104, the control node may not make any changes in the position or driving settings and stay in the same lane and/or at the same speed and continue to follow the third vehicle 2412. Thus, the control node maintains the vehicle 104 in a follow mode with vehicle 2412.

Figure 12:
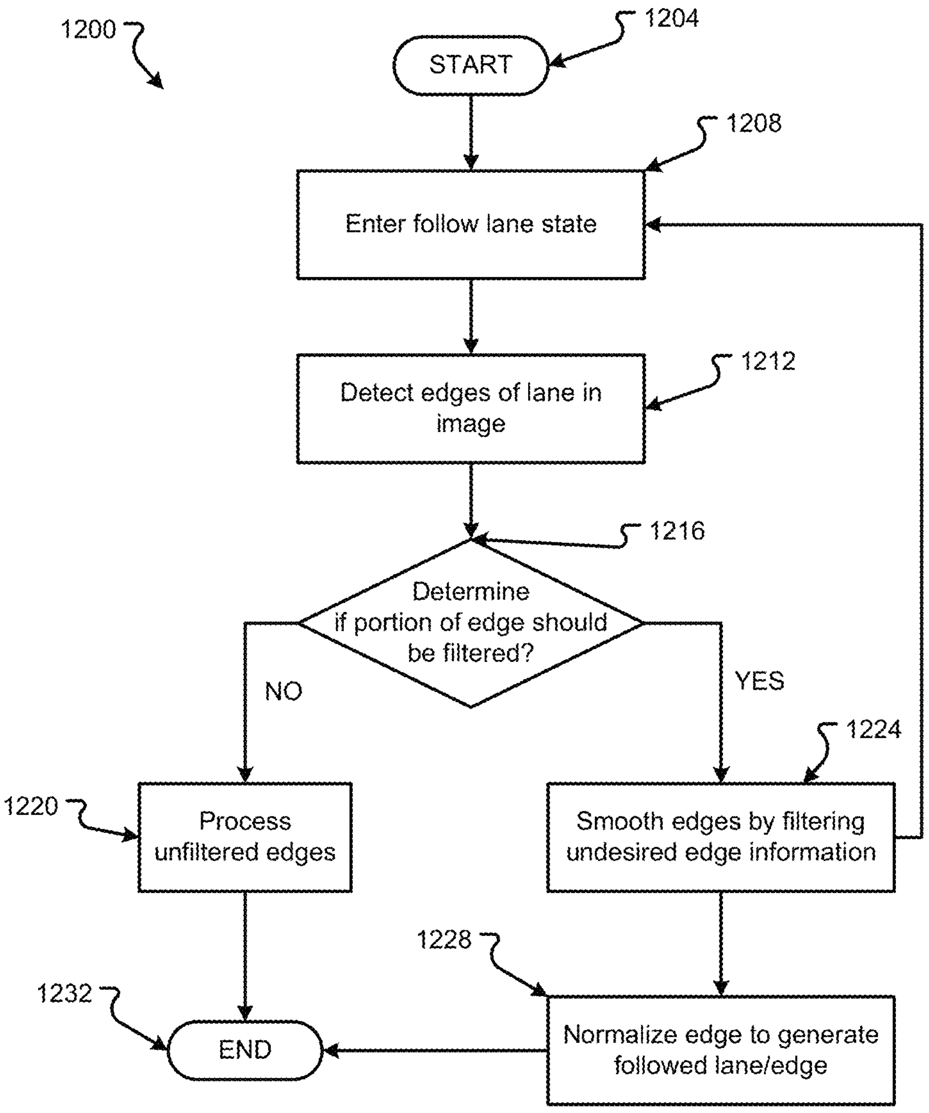
FIG. 12 depicts a sixth method for autonomously driving a vehicle in accordance with embodiments of the present disclosure.

FIG. 12 shows a method for autonomously driving a vehicle in accordance with embodiments of the present disclosure. A general order for the steps of the method 1200 is shown in FIG. 12. Generally, the method 1200 starts with a start operation 1204 and ends with an end operation 1232. The method 1200 can include more or fewer steps or can arrange the order of the steps differently than those shown in FIG. 12. The method 1200 can be executed as a set of computer-executable instructions executed by a computer system and encoded or stored on a computer readable medium. Further, the method 1200 can be performed by gates or circuits associated with a processor, an ASIC, a FPGA, a SOC, or other hardware device. Hereinafter, the method 1200 shall be explained with reference to the systems, components, devices, modules, software, signals, data structures, interfaces, methods, etc. described in conjunction with FIGS. 1-11 and 13-28.

In step 1208, the control node enters the autonomous driving mode to "lane follow." In the lane follow mode, the control node follows road features, e.g., the marked lanes, curbs, tire tracks, etc. Thus, the control node can still control the operation of the vehicle 104 autonomously but need not have a vehicle to follow.

The lane identification node executed by the lane identification node can identify the edges of the lanes or other road feature in the image(s). Thus, as explained above, the lane or other road object feature may be identified. This road feature may then followed by directing the path of vehicle 104 to interleave or slot between the lanes or other road features. In this way, the lane identification node keeps the vehicle 104 traveling on the road and within the lane.

The lane detection node can execute a ML model, associated with a CNN, to analyze the image for an edge that can define a lane. The edge can be a contrast in color or light between two adjacent areas define by a line or other straight delineation. An example of how the lane is defined may be as shown in FIGS. 25A through 25D. In an image 2500 of the driving environment, a lane 2504 may be defined by at least one lane line 2506*a*, 2506*b*. The ML model can recognize edge that continue onto or to within proximity with a vanishing point 2510. Once a lane line 2506 is recognized, the lane detection node can locate and define two or more points 2512*a*, 2512*b*, 2512*c*, 2512*d*, etc. that define a location of the lane line 2506, and as a result, the lane 2504 itself.

The points 2512 can be positioned at predetermined intervals along a vertical axis 2516 of the image. The intervals between successive points may be equidistant or at random or varying distances. Each point can be defined by a data structure. The data structure can include a point identifier ID, a location (some number of horizontal and vertical pixels, in the pixel grid, from a known and predetermined location in the image, e.g., the bottom right corner, the center of the image, the vanishing point 2510) of the point, and/or the lane to which the point is associated (e.g., left lane, right lane, middle lane, etc.). The point ID can be any type of identifier, for example a GUID, a numeric ID, a name, an alphanumeric ID, etc.

However, there are difficulties with determining the edges of the lane. In step 1216, the lane identification node can determine if there is a portion of the edge defining the lane that should be filtered. For example, the pixilation of the lane edge can be jagged or have sections that do not conform to a straight or continuous line. Other problems are also possible, for example, the lane markers on the road surface may not be in a uniform or continuous line. In other words, the paint or markers that indicate the lane line 2506 can be wavy or non-uniform. If the vehicle were to strictly follow these inaccurate or non-uniform lane edges, the vehicle 104 could shift from side-to-side or "shake" between the lane edges. To prevent these issues, the lane detection node can filter out these errors or inconsistencies.

To identify areas to filter, the lane identification node can analyze the procession of the edge. If the edge makes a change compared to some set benchmark, e.g., more than 10°, that edge section may be marked. If the edge returns to a more uniform line, that end of the section may also be marked. Thus, the portion deviating from a normalized or best fit line can be marked.

Figure 25A:
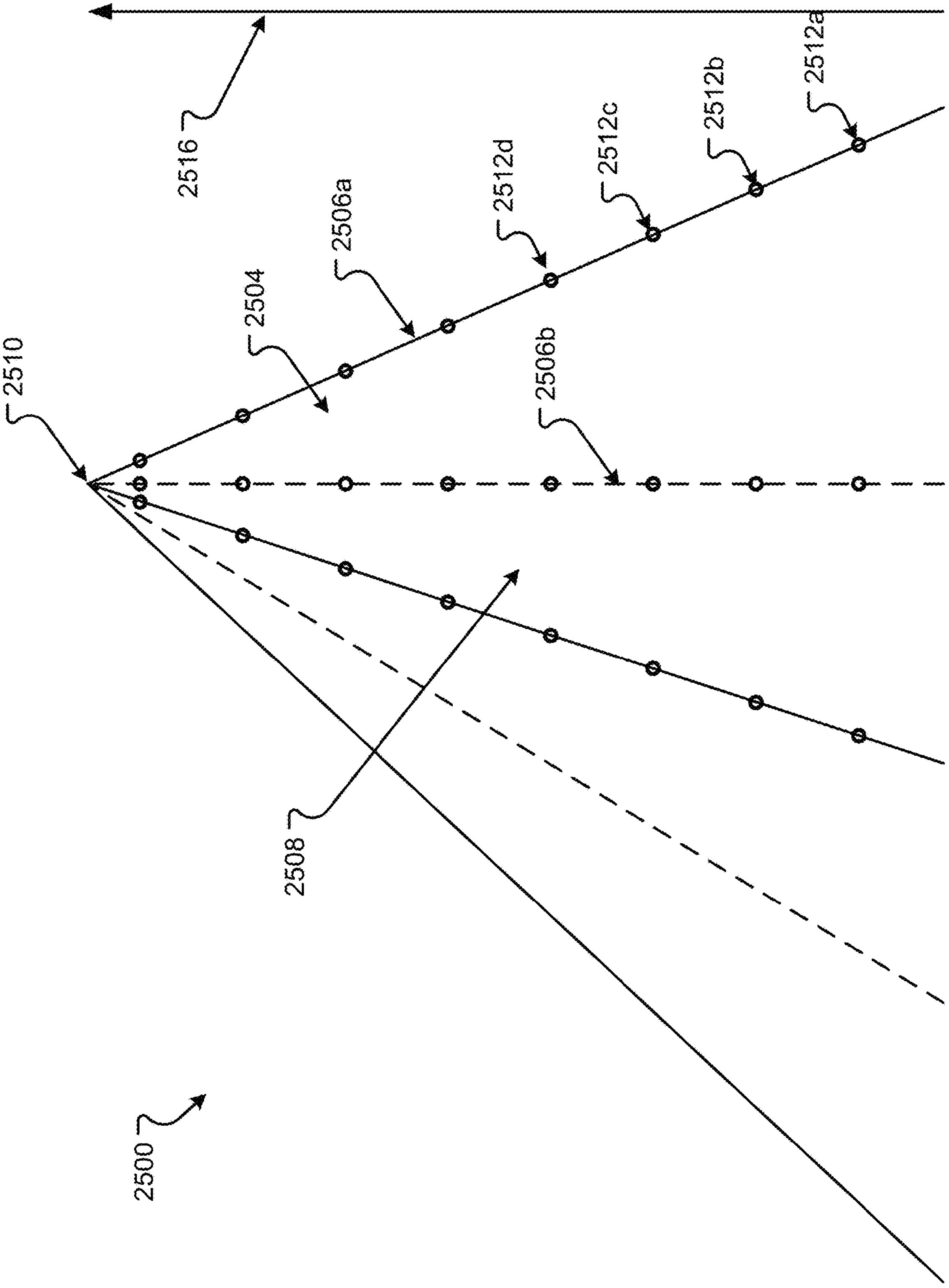
FIG. 25A depicts additional details related to defining a lane in accordance with embodiments of the present disclosure.
Figure 25B:
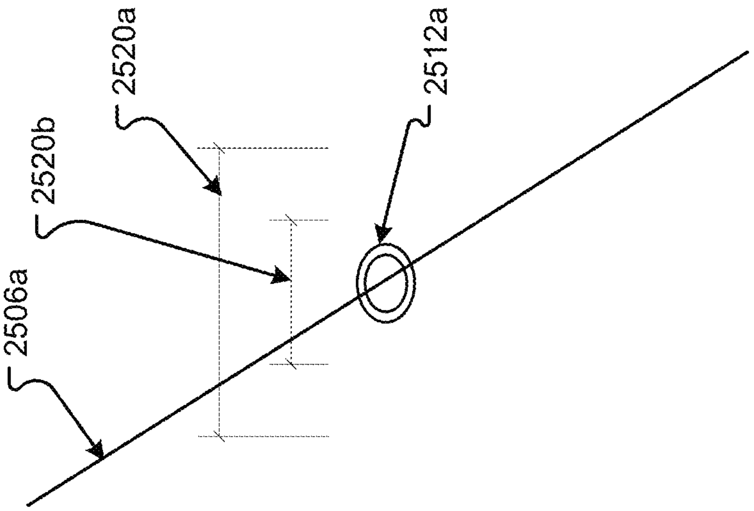
FIG. 25B depicts additional details related to defining a lane in accordance with embodiments of the present disclosure.

Alternatively or additionally, each of the points 2512 can be checked against a predetermined envelop, as shown in FIG. 25B. A point 2512*a* may be analyzed against previous points in previous images. Thus, the location of point 2512*a* can be compared to a previous location of the same or associated point in a previous image. If the location and the previous location deviate by more than a predetermined threshold 2520*a*, that point may be filtered out of the set of points that defined the location of the lane line 2506*a*. The current location can be checked against more than one previous location in more than one previous image. In other words, the current location can be checked against a moving average of the location or an average location. Further, depending on the location of a point 2512 along the vertical access 2516, the threshold 2520 may be different. For example, due to the proximity of the lane line 2506 to the vehicle 104, the lane lines 2506 in the image may move more lower in the image that nearer the vanishing point 2510. Thus, the predetermined threshold 2520*a* may be greater for points 2512*a*, 2512*b* lower in the image 2500 than the predetermined threshold 2520*b* for points 2512*d* higher in the image 2500.

Figure 25C:
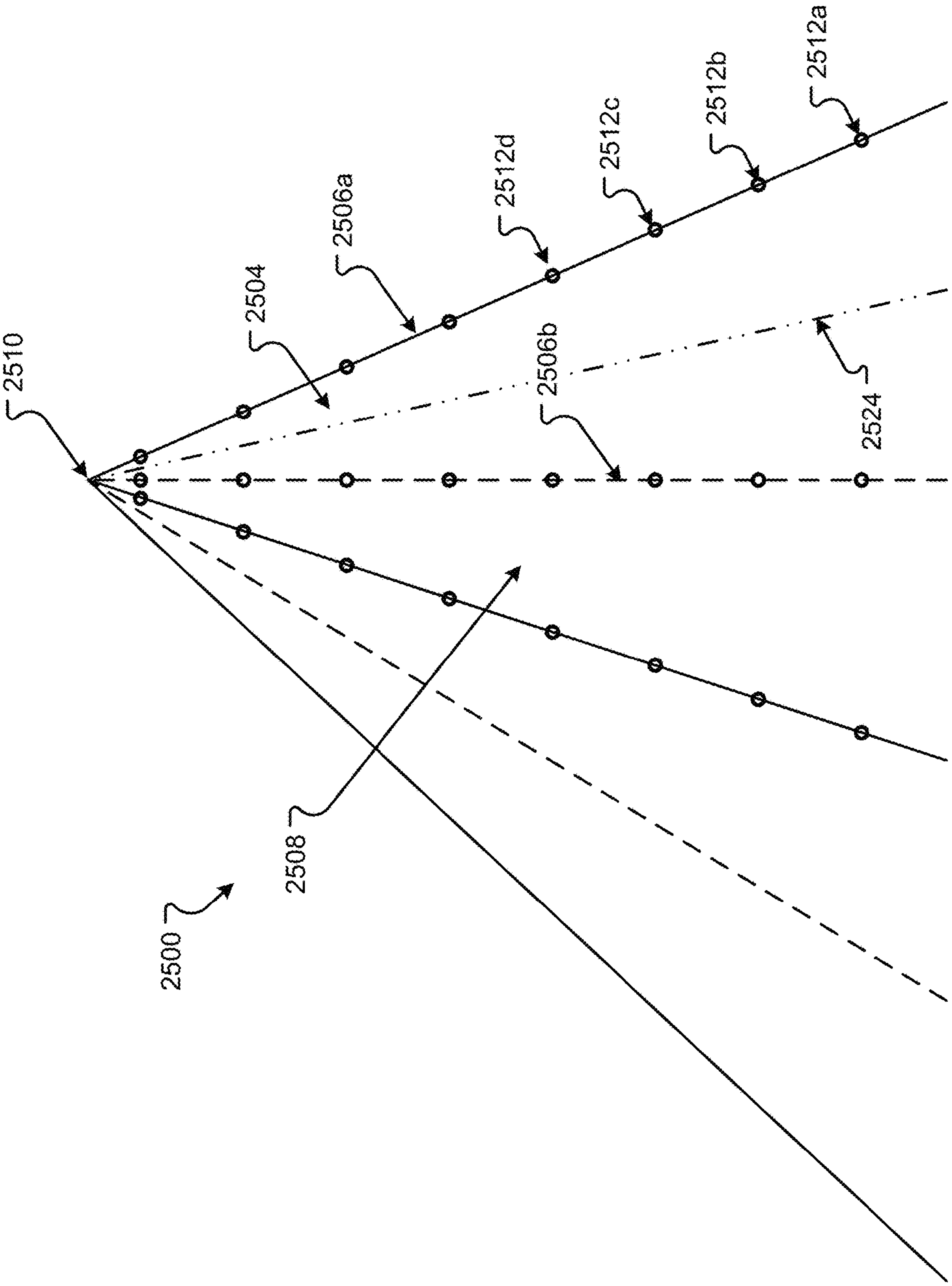
FIG. 25C depicts additional details related to defining a lane in accordance with embodiments of the present disclosure.

If there is a portion of the edge 2506 or points 2512 that needs to be filtered, the process 1200 can proceed YES to step 1224. If there is no portion of the edge 2506 to points 2512 that needs to be filtered, the process 1200 can proceed NO to step 1220. In step 1220, the lane identification node processes the unfiltered edges and follows those edges to maintain the vehicle 104 within the lane by issuing commands through the CAN bus 232 to the control systems 236-254 to follow the lane. To follow the lane lines 2506*a*, 2506*b*, the control node can automatically steer the vehicle 104 between the two or more points 2512 defining a first lane 2506*a* and the two or more points 2512 defining a second lane 2506*b*. Thus, the control node attempts to steer alone a line 2524 that bisects the points 2512, as shown in FIG. 25C.

Figure 25D:
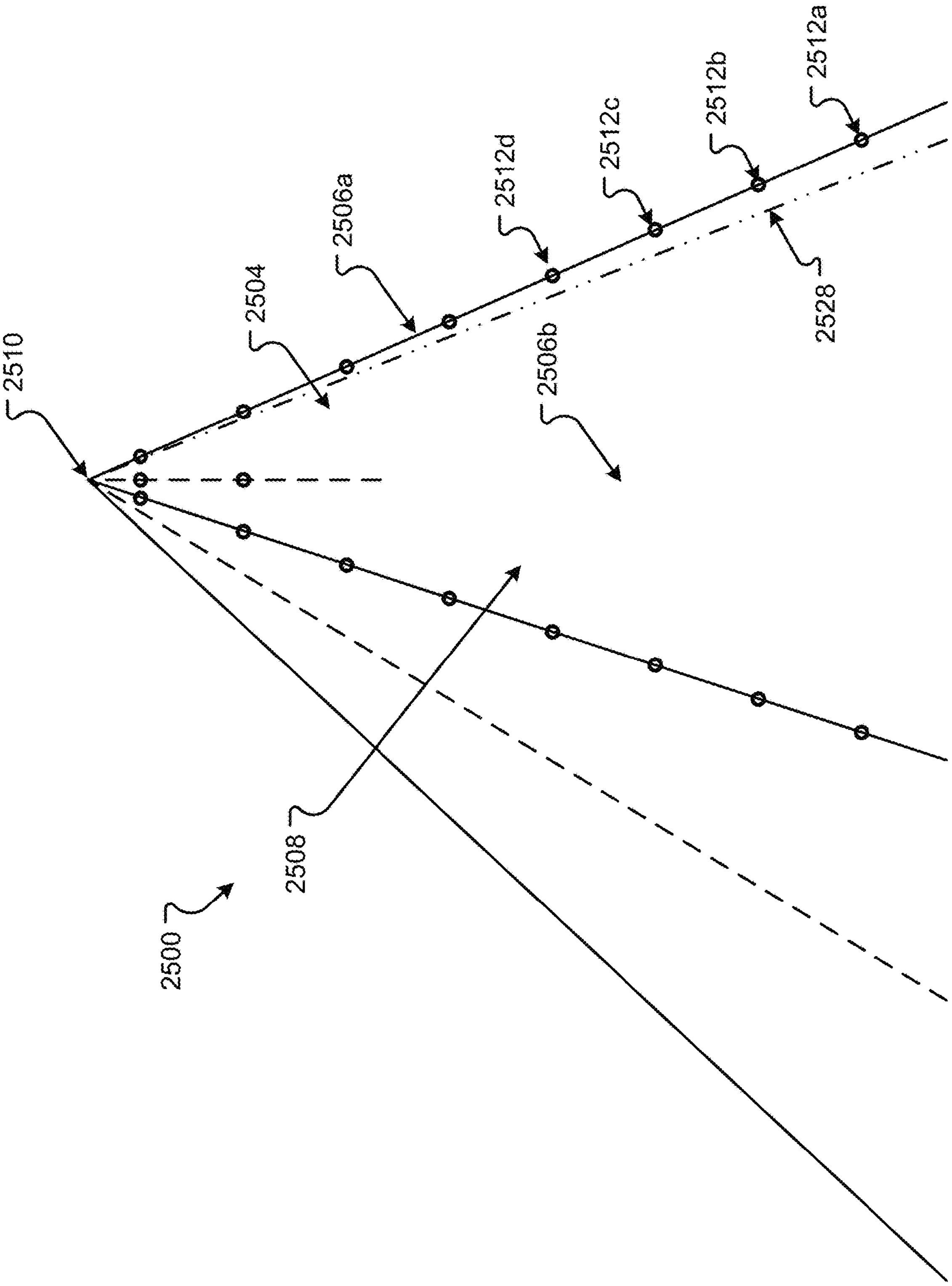
FIG. 25D depicts additional details related to defining a lane in accordance with embodiments of the present disclosure.

In step 1224, the lane identification node smooths the edge by filtering the undesired edge portion 2506 or points 2512. All edge information from a first marker to a second marker, established as explained above, indicating the deviating edge section may be erased or ignored for future processing. Thus, a section or portion of the lane edge is missing for the lane line 2506*b* following the filtering operation, as shown in FIG. 25D. As can be seen, a significant portion of the lane line 2506*b* is missing.

The lane identification node may then normalize the edge, in step 1228. To normalize the edge, the lane identification node can generate a replacement portion of the edge that corresponds to a best fit line along the edge before and after the filtered edge portion. In this way, the lane identification node maintains a continuous edge of the lane for the vehicle 104 to follow in subsequent processing.

In other configurations, normalization 1228 can change how the control node steers the vehicle 104. Rather than bisect the points 2512 as explained in conjunction with FIG. 25C, which is not possible with a set of the points 2512 missing, the control node steers from a single lane line 2506*a*. In other words, the control node automatically steers to maintain a path 2528 of the vehicle 104 a predetermined number of pixels from the two or more points 2512 defining a first lane 2506*a*. In this way, the vehicle 104 maintains its course even without two lane lines 2506.

Figure 13:
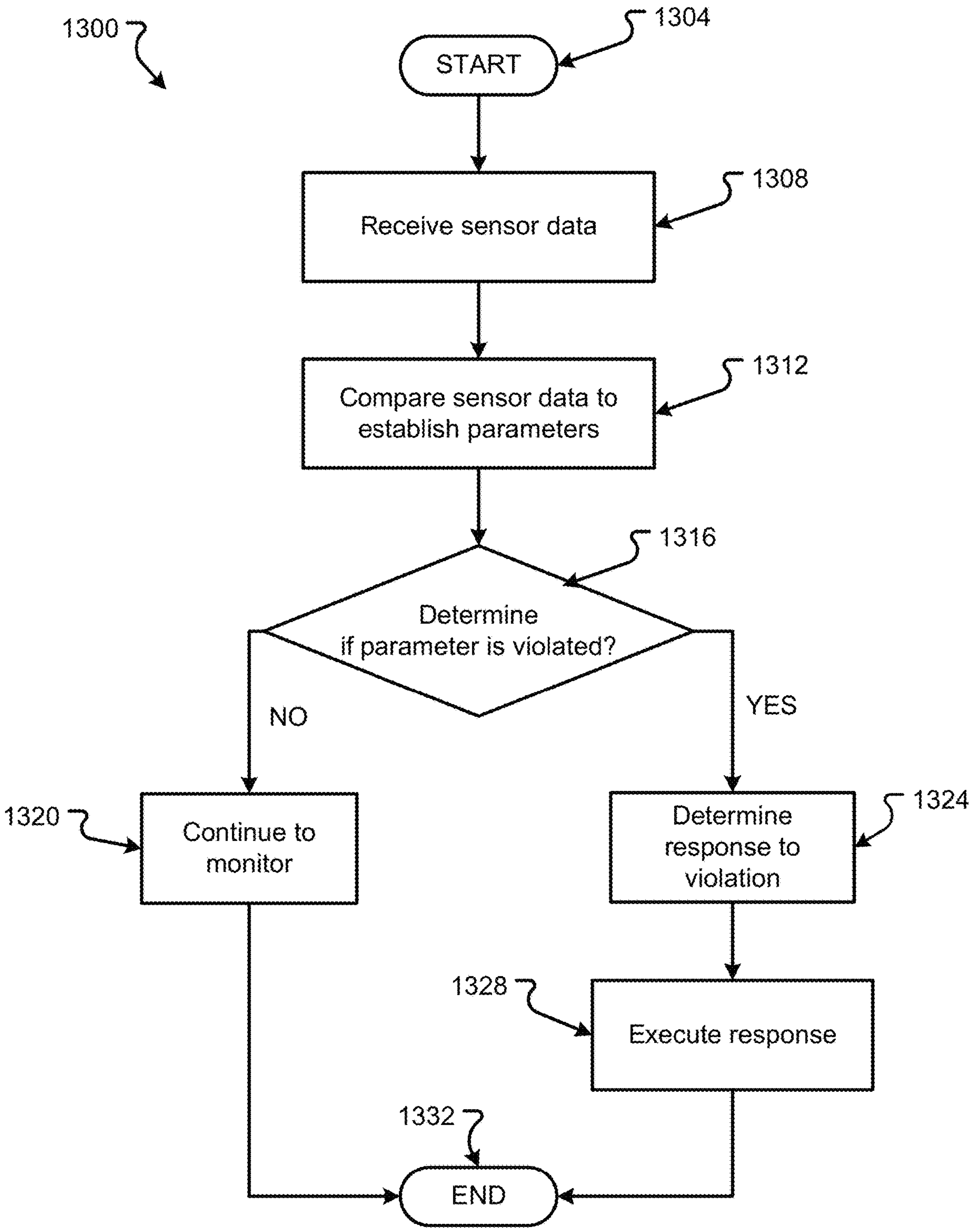
FIG. 13 depicts a method for determining an environmental concern for an autonomous vehicle in accordance with embodiments of the present disclosure.

FIG. 13 shows a method for determining an environmental concern for an autonomous vehicle in accordance with embodiments of the present disclosure. A general order for the steps of the method 1300 is shown in FIG. 13. Generally, the method 1300 starts with a start operation 1304 and ends with an end operation 1332. The method 1300 can include more or fewer steps or can arrange the order of the steps differently than those shown in FIG. 13. The method 1300 can be executed as a set of computer-executable instructions executed by a computer system and encoded or stored on a computer readable medium. Further, the method 1300 can be performed by gates or circuits associated with a processor, an ASIC, a FPGA, a SOC, or other hardware device. Hereinafter, the method 1300 shall be explained with reference to the systems, components, devices, modules, software, signals, data structures, interfaces, methods, etc. described in conjunction with FIGS. 1-12 and 14-28.

The processor 204 can determine one or more conditions of the environment 100 while the vehicle 104 is not moving, in step 1308. The processor 204 can receive one or more images from the image sensors 208. The nodes 304 deploy a ML model executed by the processor 204 and associated with a CNN may process the image. Within the image, different edges, the position of those edges, and other information can be determined. Conditions can include an edge or other information, such as movement of an edge over time, location of other sensed data, etc.

From the conditions, a next node may identify one or more objects within the image. The shape of the object can inform the processor 204 as to what type of object is being sensed. This information may then be stored by the processor 204 for determining actions required for driving in the environment 100. The stored objects can include images of business signs, street signs, words, disposed waste, other people, etc. Other sensor data may also be processed, such as the time, GPS data indicating location, and other types of sensor data.

The processor 204 can then compare the sensed information to one or more parameters, in step 1312. A parameter can be a legal requirement, a business requirement, a law, a code, or other type of necessity. For example, the GPS sensor data can be compared to a location prohibited by a restraining order. In another example, an image of a cocktail glass and a time can be compared to a business requirement that discourages drinking during business hours. Other such comparisons are possible. The processor 204 then determines if a parameter has been violated, in step 1316. If a violation has occurred, the process 1300 proceeds YES to step 1324. However, if no violation has occurred, the process 1300 proceeds NO to step 1320. In step 1320, the processor 204 continues to monitor the environment.

The processor 204 can determine a response to the violation, in step 1324. The response to a violation may be stored in user information data store 224. Thus, a violation of a restraining order may require the police be contacted by the processor 204 sending a message through the communication interface 256. A violation of the drinking policy may require the prohibition of the vehicle 104 from starting, the calling of a cab through the communications interface 256, and/or the sending of an incident report to a superior through the communications interface 256. In step 1328, the response is executed by the processor 204.

Figure 14:
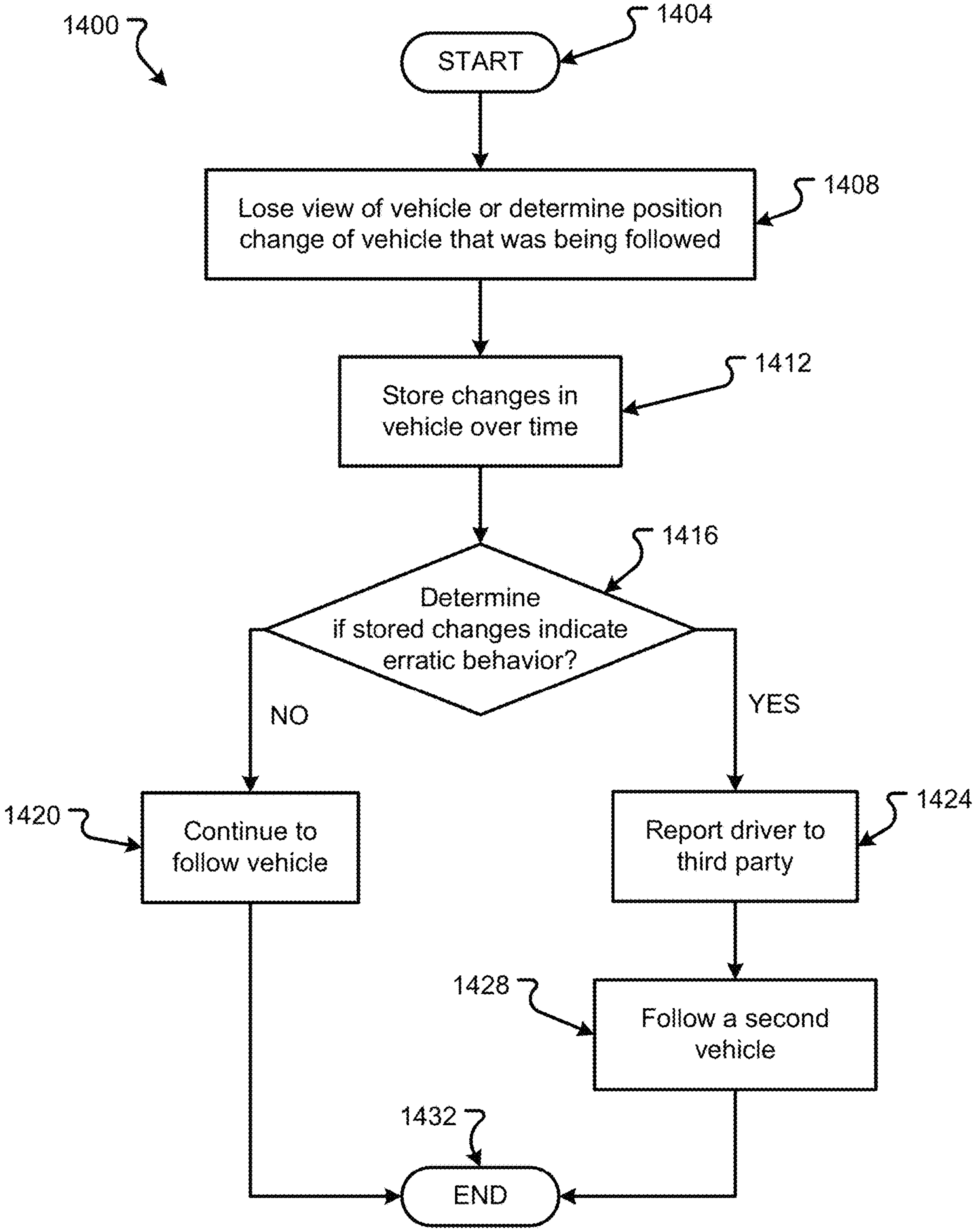
FIG. 14 depicts a seventh method for autonomously driving a vehicle in accordance with embodiments of the present disclosure.

FIG. 14 shows a method for autonomously driving a vehicle in accordance with embodiments of the present disclosure. A general order for the steps of the method 1400 is shown in FIG. 14. Generally, the method 1400 starts with a start operation 1404 and ends with an end operation 1432. The method 1400 can include more or fewer steps or can arrange the order of the steps differently than those shown in FIG. 14. The method 1400 can be executed as a set of computer-executable instructions executed by a computer system and encoded or stored on a computer readable medium. Further, the method 1400 can be performed by gates or circuits associated with a processor, an ASIC, a FPGA, a SOC, or other hardware device. Hereinafter, the method 1400 shall be explained with reference to the systems, components, devices, modules, software, signals, data structures, interfaces, methods, etc. described in conjunction with FIGS. 1-13 and 15-28.

The processor 204 can enter the autonomous state to follow an identified vehicle 124. Thus, an association but not necessarily a particular distance or alignment to that vehicle 124 may be maintained through controls sent through the CAN bus 232 to the control systems 236-254. The processor 204 follows the vehicle 124 along the route by monitoring that vehicle 124 and maintaining an association with that vehicle 124. The association is a relationship with the vehicle 124, in that, the vehicle 104 follows vehicle 124 but allows some changes in where the vehicle 124 is compared to vehicle 104.

Thus, the processor 204 can detect a change of position of the vehicle 124, in step 1408. In processing the image data through the nodes 304, a change in position of the vehicle 124 may be determined by a shift in the position of the vehicle 124 object in one image to a subsequent image. Then, if the vehicle 124 moves, e.g., changes lanes, the vehicle 104 may then determine whether the vehicle 124 remains in view. The vehicle 104 can continue along a route regardless of a vehicle 124 staying on the same route. Thus, in some situations, the vehicle 124 may deviate from the route and disappear from the image generated by the sensors 208. The processor 204 can determine that the vehicle 124 has deviated from the route and no longer is present in the images of the sensor 208. These changes in position of the vehicle 124 over time may be stored, with metadata explaining what, when, where, and why the information was stored, as image data 216, in step 1436.

From the stored data, the processor 204 can determine if the vehicle 124 is driving erratically. For example, if a number of adjustments per hour exceeds a predetermined benchmark, the processor 204 can determine the driving of the vehicle 124 is erratic. If a number of lane changes or other positional change is more than a predetermined threshold, the processor 204 can determine the vehicle 124 is behaving erratically. If the processor 204 determines that the vehicle is behaving erratically, the process 1400 may proceed Yes to step 1424. However, if the processor 204 determines that the vehicle is not behaving erratically, the process 1400 may proceed NO to step 1420, wherein the processor 204 continues to follow the vehicle 124. In some examples, a parameter change, such as but not limited to lane changes, acceleration, deceleration, velocity, etc. may be utilized to determine the condition of the followed vehicle. In some situations, a condition of the followed vehicle may be determined to be erratic, not-safe, safe, not-erratic, etc. In some situations, the processor 204 may coordinate a message to be sent, where the message may be sent to the followed vehicle, a different reporting agency, or otherwise, using the network 260 for example.

In step 1424, the processor 204 can report the behavior and the vehicle 124 to the authorities or to another entity. Thus, the processor 204 can send an automated message to a third party through the communications interface 256. Further, the processor 204 may also start following a second vehicle 128 as described above.

Figure 15:
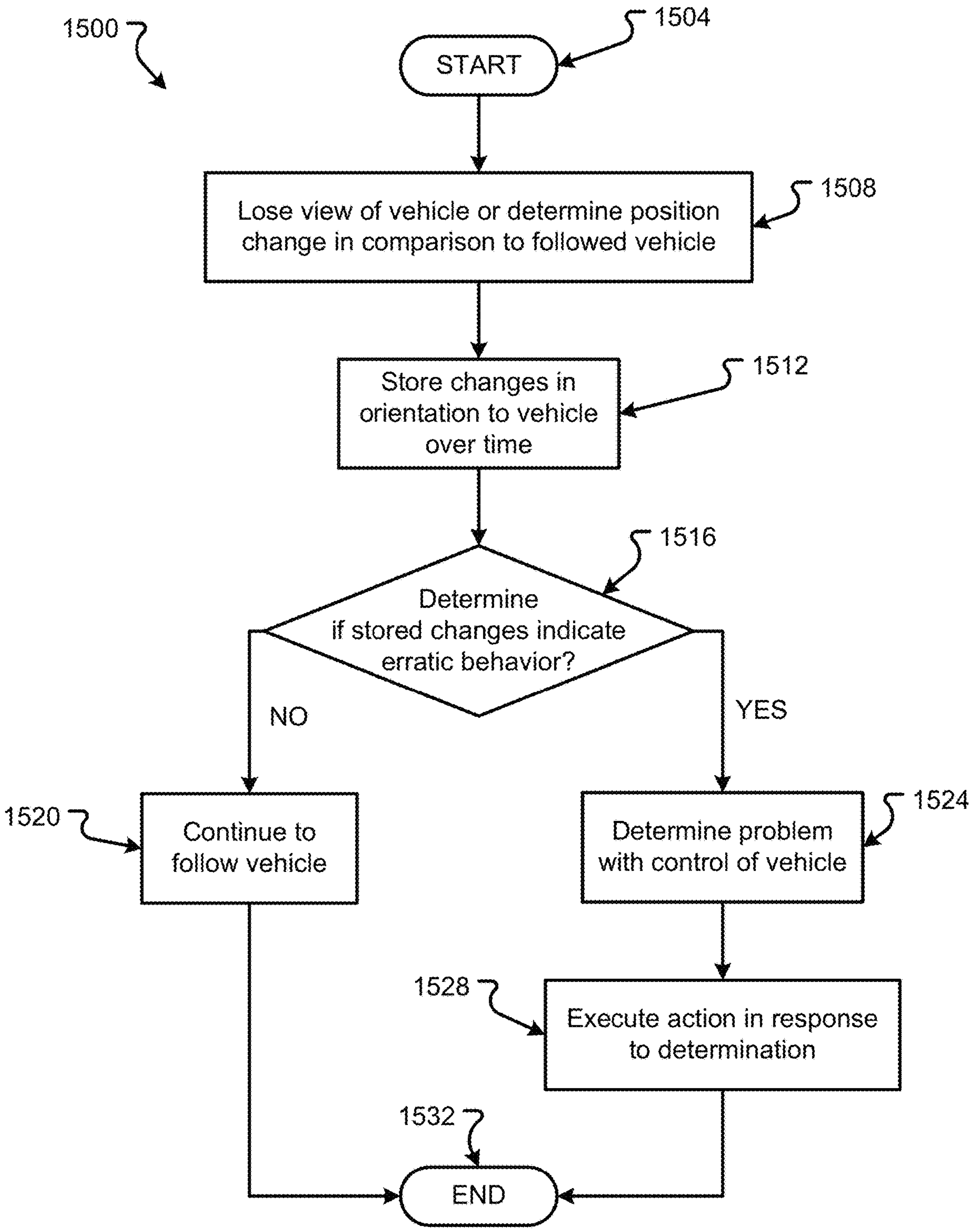
FIG. 15 depicts an eighth method for autonomously driving a vehicle in accordance with embodiments of the present disclosure.

FIG. 15 shows a method for autonomously driving a vehicle in accordance with embodiments of the present disclosure. A general order for the steps of the method 1500 is shown in FIG. 15. Generally, the method 1500 starts with a start operation 1504 and ends with an end operation 1532. The method 1500 can include more or fewer steps or can arrange the order of the steps differently than those shown in FIG. 15. The method 1500 can be executed as a set of computer-executable instructions executed by a computer system and encoded or stored on a computer readable medium. Further, the method 1500 can be performed by gates or circuits associated with a processor, an ASIC, a FPGA, a SOC, or other hardware device. Hereinafter, the method 1500 shall be explained with reference to the systems, components, devices, modules, software, signals, data structures, interfaces, methods, etc. described in conjunction with FIGS. 1-14 and 16-28.

The processor 204 can enter the autonomous state to follow an identified vehicle 124. Thus, an association but not necessarily a particular distance or alignment to that vehicle 124 may be maintained through controls sent through the CAN bus 232 to the control systems 236-254. The processor 204 follows the vehicle 124 along the route by monitoring that vehicle 124 and maintaining an association with that vehicle 124. The association is a relationship with the vehicle 124, in that, the vehicle 104 follows vehicle 124 but allows some changes in where the vehicle 124 is compared to vehicle 104.

Thus, the processor 204 can detect a change of position of the vehicle 124, in step 1508. In processing the image data through the nodes 304, a change in position of the vehicle 124 may be determined by a shift in the position of the vehicle 124 object in one image to a subsequent image. Then, if the vehicle 124 moves, e.g., changes lanes, the vehicle 104 may then determine whether the vehicle 124 remains in view. The vehicle 104 can continue along a route regardless of a vehicle 124 staying on the same route. Thus, in some situations, the vehicle 124 may deviate from the route and disappear from the image generated by the sensors 208. The processor 204 can determine that the vehicle 124 has deviated from the route and no longer is present in the images of the sensor 208. These changes in position of the vehicle 124 over time may be stored, with metadata explaining what, when, where, and why the information was stored, as image data 216, in step 1536.

From the stored data, the processor 204 can determine if the vehicle 104 is driving erratically. For example, if a number of adjustments per hour exceeds a predetermined benchmark, the processor 204 can determine the driving of the vehicle 104 is erratic. If a number of lane changes or other positional change is more than a predetermined threshold, the processor 204 can determine the vehicle 104 is behaving erratically. If the processor 204 determines that the vehicle 104 is behaving erratically, the process 1500 may proceed Yes to step 1524. However, if the processor 204 determines that the vehicle 104 is not behaving erratically, the process 1500 may proceed NO to step 1520, wherein the processor 204 continues to follow the vehicle 124.

In step 1524, the processor 204 can determine problem with the control of the vehicle and, in step 1528, execute a response for the problem. For example, the processor can determine a necessity for and execute the reporting of the behavior and driver of the vehicle 104 to the authorities or to another entity. Thus, the processor 204 can send an automated message to a third party through the communications interface 256. Further, the processor 204 may also start following a second vehicle 128 as described above. In still other situations, the processor 204 can indicate a problem with something in the autonomous drive system based on the erratic behavior. In this situations, the processor 204 may instruct the driving systems to pull over the vehicle 104 and wait for repairs or service.

As provided above, one or more calibration parameters may be obtained over time; such calibration parameters allow for the calibration of the image acquisition device in an efficient and ongoing manner. Thus, rather than having an autonomous vehicle have to relocate to a calibration facility, such calibration can be performed dynamically on the fly and/or over an ongoing basis.

Figure 16:
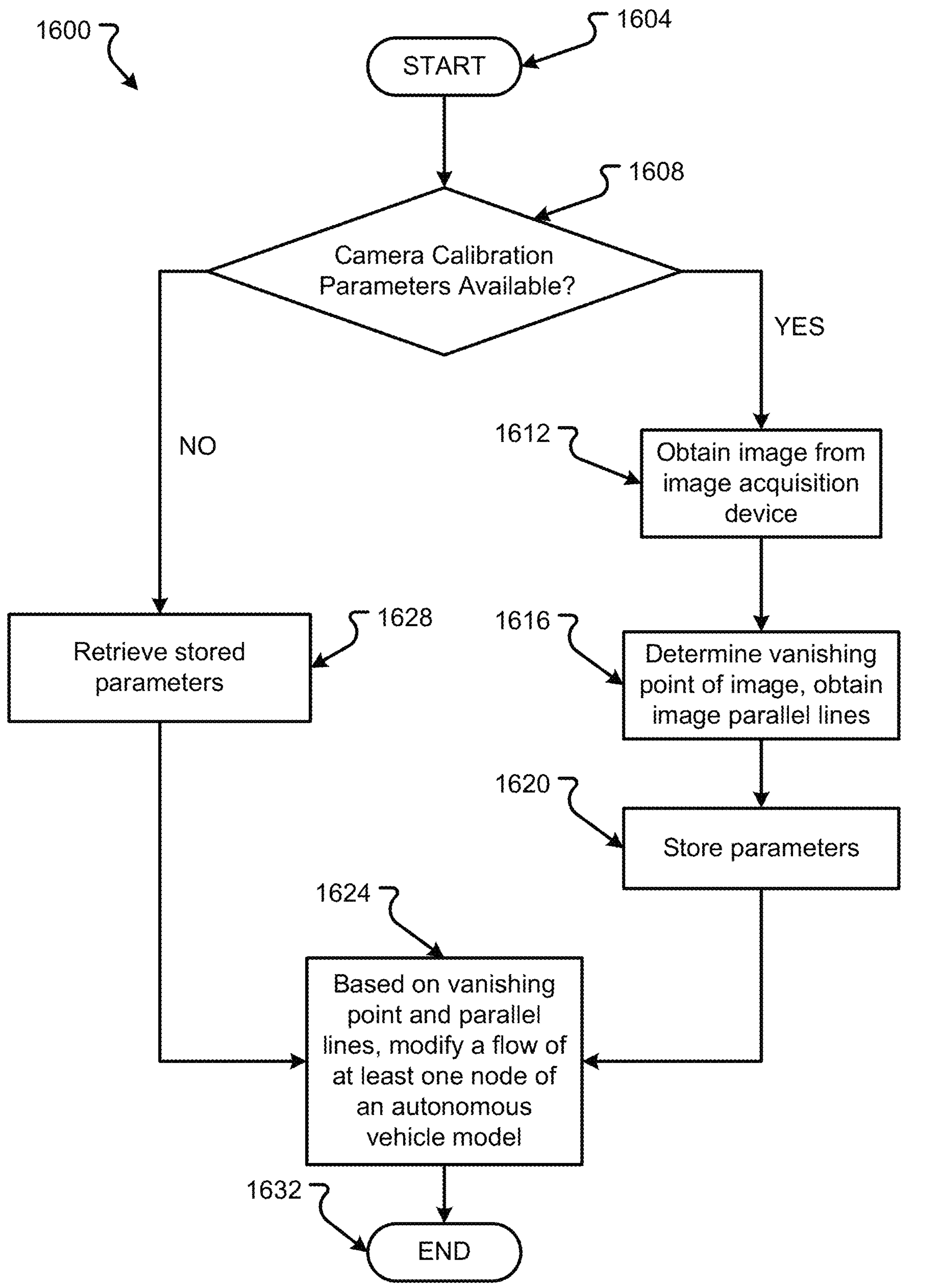
FIG. 16 depicts a method for automatically calibrating one or more image acquisition devices in accordance with embodiments of the present disclosure.

FIG. 16 depicts a method for automatically calibrating one or more image acquisition devices in accordance with embodiments of the present disclosure. A general order for the steps of the method 1600 is shown in FIG. 16. Generally, the method 1600 starts with a start operation 1604 and ends with an end operation 1632. The method 1600 can include more or fewer steps or can arrange the order of the steps differently than those shown in FIG. 16. The method 1600 can be executed as a set of computer-executable instructions executed by a computer system and encoded or stored on a computer readable medium. Further, the method 1600 can be performed by gates or circuits associated with a processor, an ASIC, a FPGA, a SOC, or other hardware device. Hereinafter, the method 1600 shall be explained with reference to the systems, components, devices, modules, software, signals, data structures, interfaces, methods, etc. described in conjunction with FIGS. 1-15 and 17-28.

The method may be initiated at step 1604 and flow to step 1608 where the system may determine if existing calibration parameters are already available for the image acquisition device. For example, the system processor may access the database, and retrieve previously stored image acquisition device calibration parameters at step 1508. If, at step 1608, the system determines that existing calibration parameters are not available, the method may proceed to step 1612, where an image, or scene, from the image acquisition device may be obtained. Accordingly, at step 1616, the method may extract one or more features from the image, as previously described, and may further identify parallel lines associated with the extracted features. For example, if an image of a scene includes a polygon shape such as a stop sign, the system can identify parallel lines from edges of the polygon. Extending such parallel lines from the extracted feature can determine a point of intersection in the horizon. Based on multiple points of intersection in the horizon, one or more vanishing points for the scene may be determined. A vanishing point is a point on the image plane of a perspective drawing where the two-dimensional perspective projections of mutually parallel lines in three-dimensional space appear to converge. The system may then use the vanishing points and the parallel lines determine one or more calibration parameters, such as pose, height, field of view, angle, etc. Accordingly, one or more flows of a model may be modified based on the new calibration parameters such that a higher statistical degree of camera accuracy, and therefore model accuracy, can be obtained.

Figure 26A:
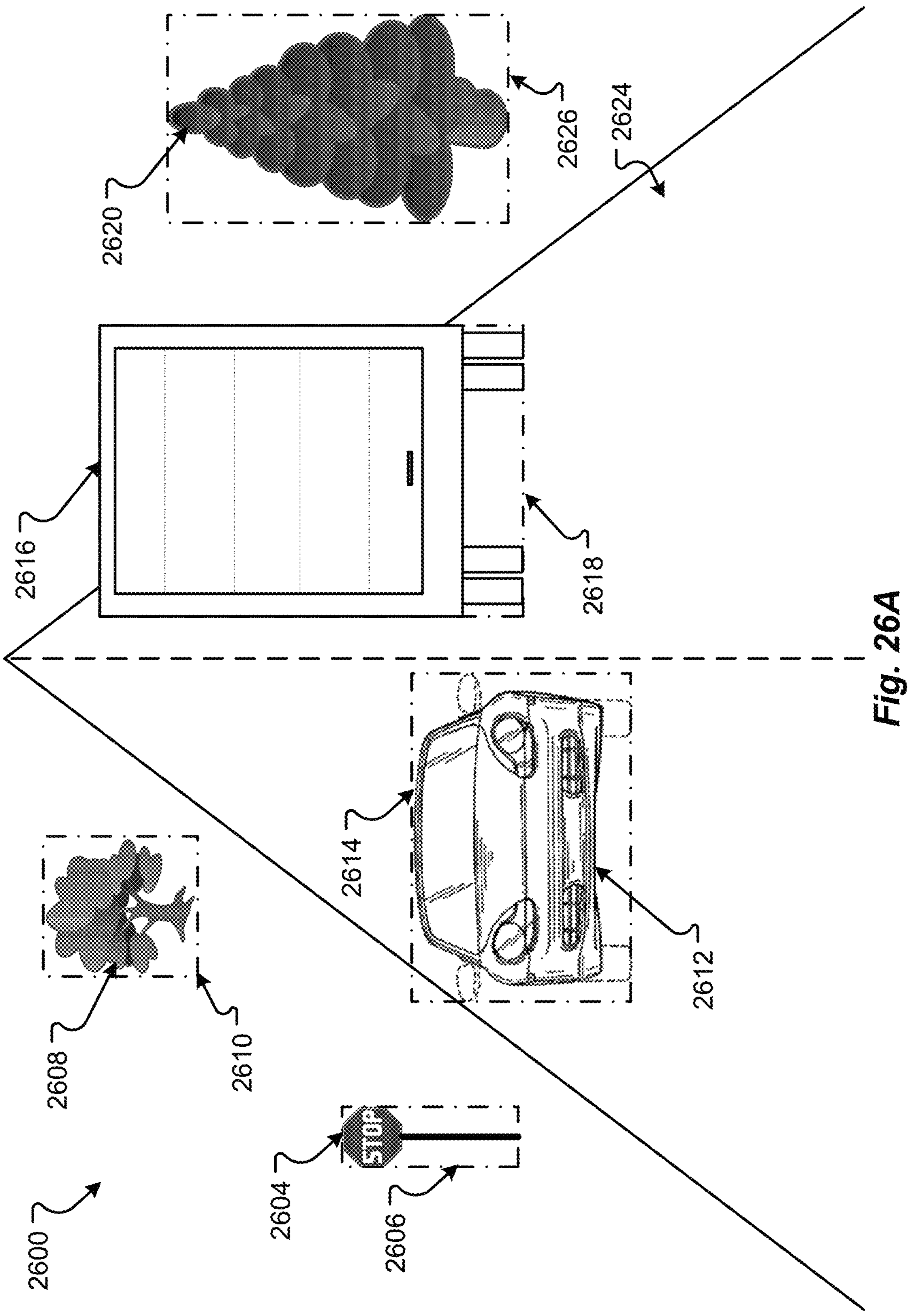
FIG. 26A depicts additional details related to calibration using an image in accordance with embodiments of the present disclosure.
Figure 26B:
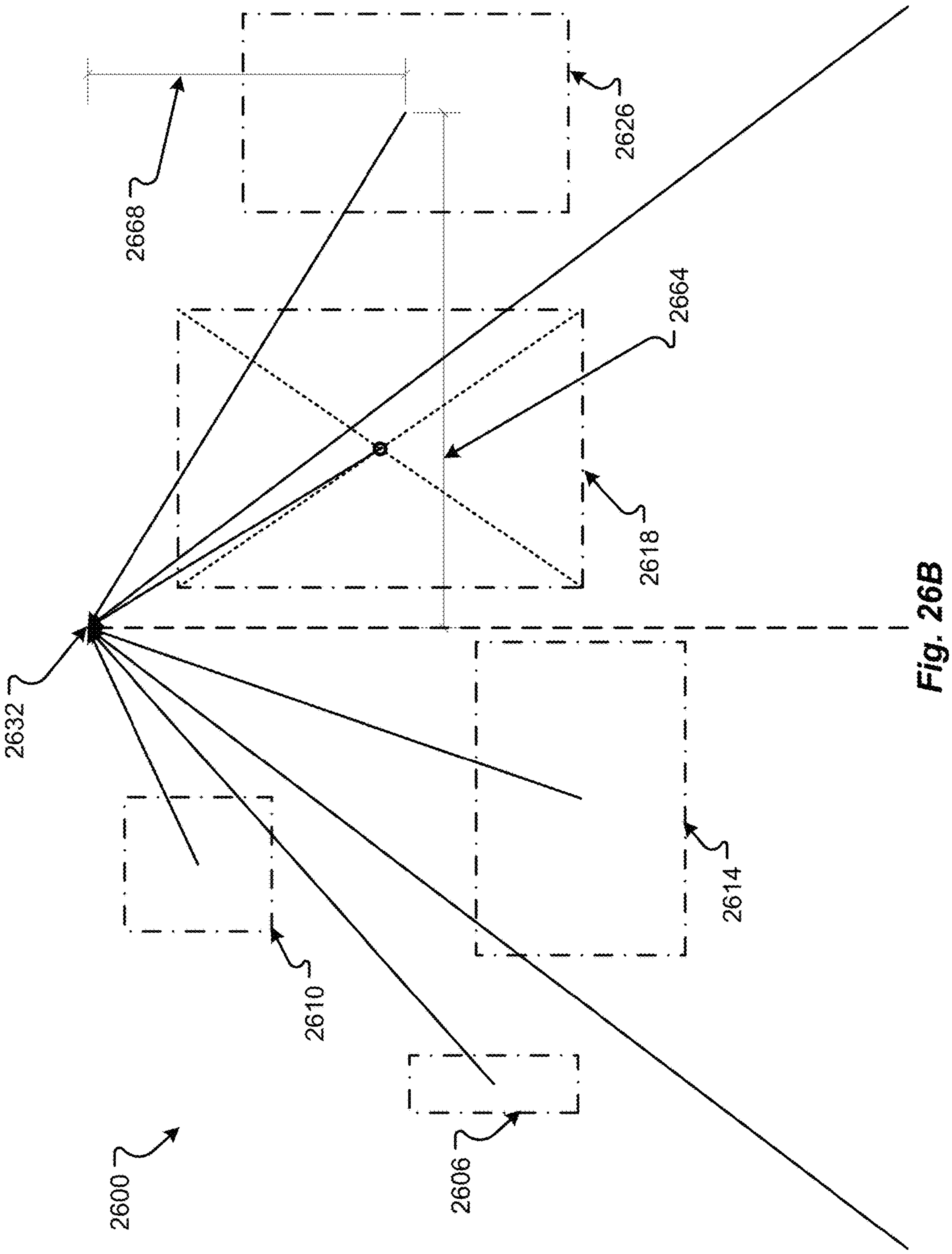
FIG. 26B depicts additional details related to calibration using an image in accordance with embodiments of the present disclosure.
Figure 26C:
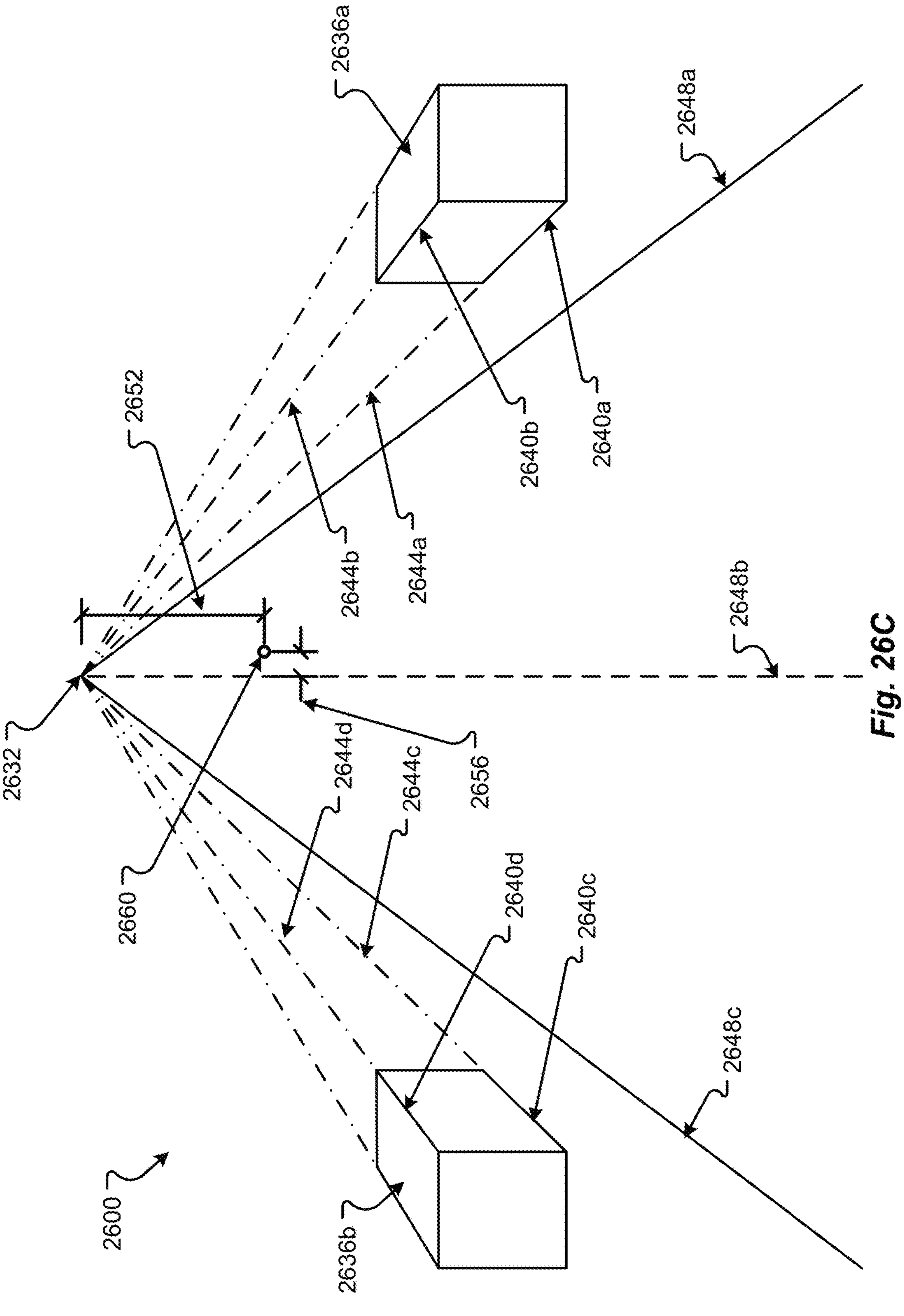
FIG. 26C depicts additional details related to calibration using an image in accordance with embodiments of the present disclosure.

A calibration may be as shown in FIGS. 26A-26C. First referring to FIG. 26C, an image 2600 is provided having one or more objects 2636*a*, 2636*b*, 2648*a*-2648*c*. These objects 2636, 2648 can represent buildings and lane lines or lane markers, respectively, in the image 2600 that can help determined the vanishing point 2632 in the image 2600. The building 2636 can have one or more edges 2640*a*, 2640*b*, 2640*c*, 2640*d* that help determine the vanishing point. The edges 2640 can be projected from the building 2636 to a horizon as lines 2644*a*, 2644*b*, 2644*c*, 2644*d* to determine a common point 2632, which represents the vanishing point. The angle of the edge 2640 indicates the projection of the line 2644 and thus, the angle of the edge 2640 indicates the location for the vanishing point 2632. The lane marker 2648 can also end or terminate at the vanishing point 2632. There may be a small discrepancy as to where the edge 2640 project to and/or where the lane markers 2648 end. An average of the points may provide the vanishing point 2632, which can be represented by a pixel coordinate in the horizontal and vertical direction. These pitch and yaw calibration parameters can be stored by the vehicle and applied to subsequent images to compensate for the center of the camera not being perfectly aligned with the image of the driving environment.

Based on the vanishing point 2632, the image acquisition devise can determine calibration parameters. The calibration parameters can include at least the pitch 2652 of the image acquisition devise and the yaw 2656 of the image acquisition devise. The pitch parameter 2652 represent the number of pixels, in a vertical direction, the center 2660 of the image is from a horizontal line that represents the vertical position of the vanishing point 2632. The yaw parameter 2656 represent the number of pixels, in a horizontal direction, the center 2660 of the image is from a vertical line that represents the horizontal position of the vanishing point 2632.

In accordance with embodiments of the present disclosure, and as previously described, the new camera parameters may be utilized to modify an existing flow and/or node of an autonomous vehicle model, such as the autonomous vehicle model 452. That is, one or more of nodes and/or flows associated with the image processing, the feature extraction, and/or the classification steps as previously described may be modified. Accordingly, in as much that the calibration parameters may affect the image preprocessing step, such parameters may also affect an accuracy associated with feature extraction, feature classification, and/or the ultimate adjustment that is made by the model. Accordingly, one or more of the camera calibration parameters may be utilized as an input to one or more levels, flows, and/or nodes of the convolutional neural network.

Figure 17:
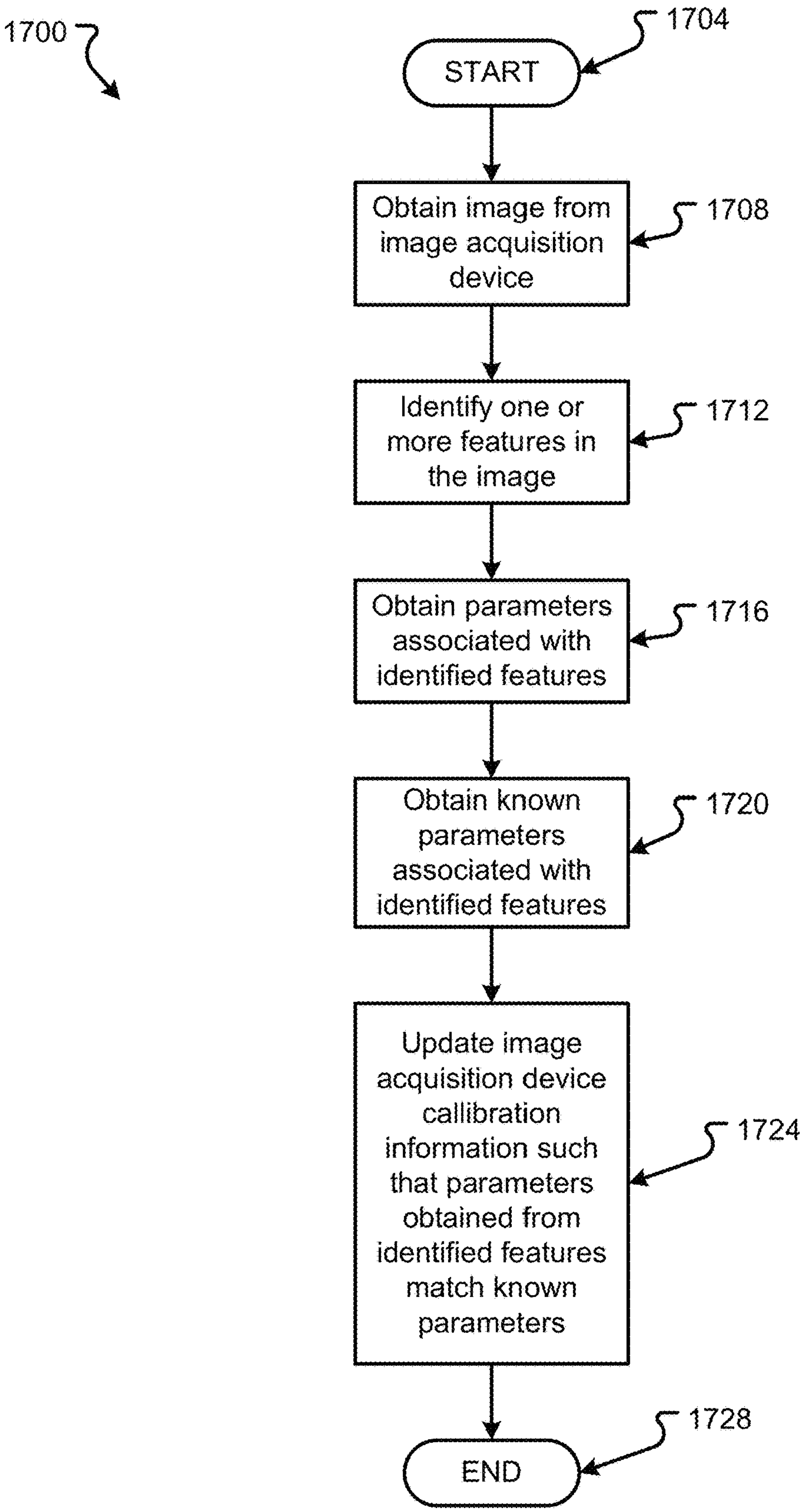
FIG. 17 depicts a method of calibrating one or more camera parameters over time in accordance with embodiments of the present disclosure.

FIG. 17 depicts a method of calibrating one or more camera parameters over time using classified feature information obtained from an image of the image acquisition device in accordance with embodiments of the present disclosure. That is, at step 1704, the flow may be initiated and proceed to step 1708, where a scene, or image, may be obtained from an image acquisition device, as previously described. Image information may then be obtained utilizing a feature extraction and classification process as previously described. The feature extraction and classification process may then identify one or more features in the scene or image at step 1712. At step 1716, parameters associated with the identified and extracted feature, such as an object, may be obtained. For example, if the autonomous vehicle model identifies a stop sign and/or traffic light, size information from the stop sign and/or traffic light (such as the aperture openings, size of LED etc. . . . ) may be obtained. Such object parameter information may be used as ongoing calibration data for the camera. For example, the known feature information may be retrieved from a database at step 1720 and may be utilized to the scale or otherwise update one or more calibration parameters associated with the object identified and/or extracted from the image provided by the image acquisition device. At step 1724, the new calibration parameters associated with the image acquisition device and vehicle may then be stored in the database, such as database 444.

Figure 18:
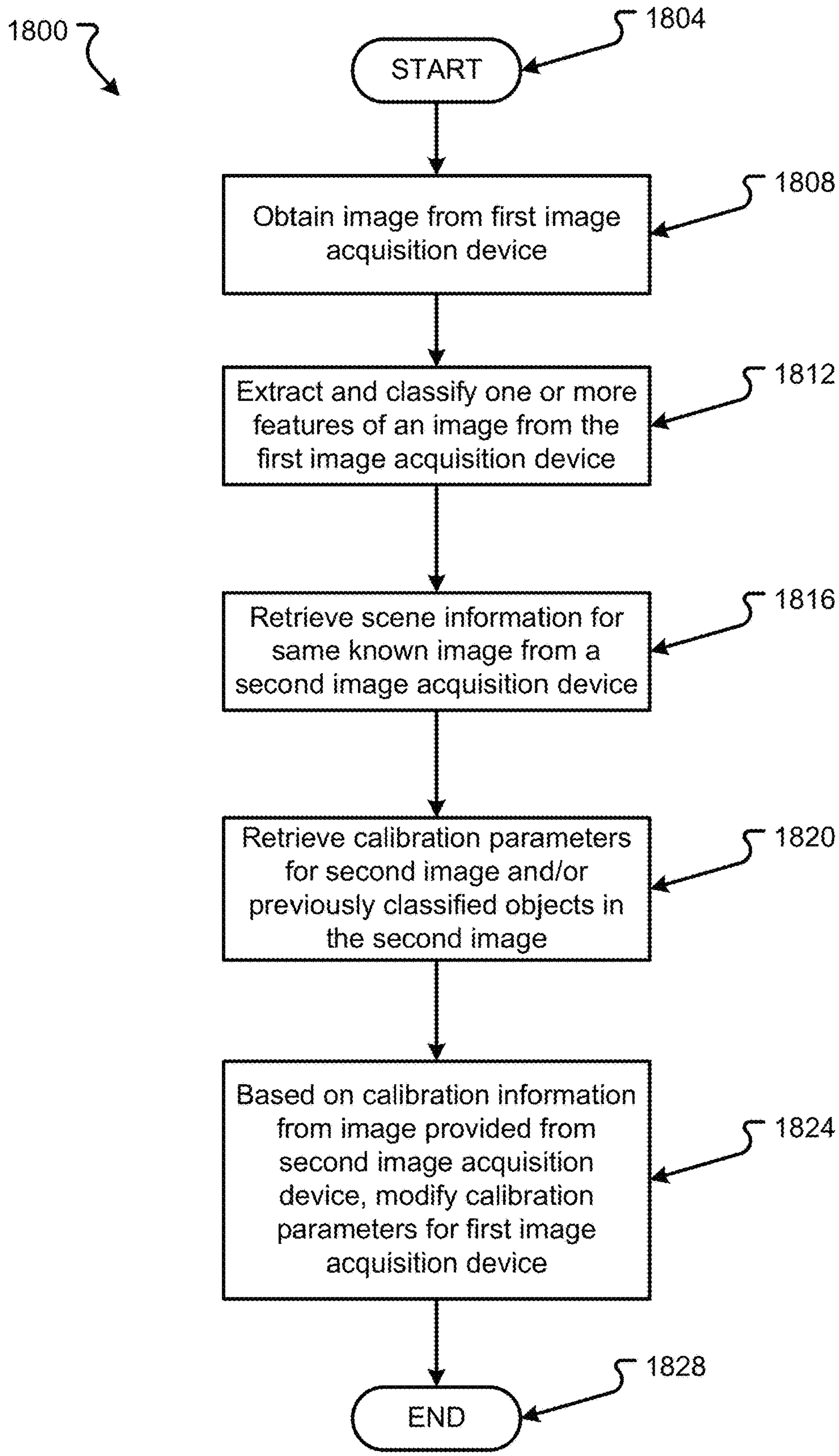
FIG. 18 depicts a method for calibrating a first image acquisition device based on information received from a second image acquisition device in accordance with embodiments of the present disclosure.

FIG. 18 depicts a method 1800 for calibrating a first image acquisition device based on information received from a second image acquisition device in accordance with embodiments of the present disclosure. As depicted in FIG. 18, the system may initiate method 1800 at step 1804, where the method may proceed to step 18008 where an image from a first image acquisition device is obtained. The method then proceeds to step 1812 where one or more objects are detected, via feature extraction and classification, as explained previously in conjunction with FIGS. 22A-22E.

At step 1816, information from a second image acquisition device may be obtained; that is, the second image acquisition device may obtain a second image. The second image acquisition device may be associated the same vehicle or a different vehicle. For example, an image may be obtained from a second vehicle where the second image includes scene information that is the same as or similar to a scene obtained from the first image acquisition device. The information obtained from the second image acquisition device may be obtained for a same location as the image obtained from the first image acquisition device. For example, the second vehicle can send a data structure 2714 as described in conjunction with FIG. 27B.

The vehicle 104 may receive data structure 2714 from a data store 2700, as shown in FIG. 27B, and/or from a second image acquisition devise associated with a second vehicle. The data structure 2714 can include a vehicle identifier (ID) 2716, a GPS coordinate 2720, object information 2724, and/or a second image 2728. There may be more or fewer fields in data structure 2714, as represented by ellipses 2744. Each association of vehicles can have a data structure 2714, as represented by ellipses 2748.

The vehicle ID can be automatically generated and represent any type of identifier including one or more of, but not limited to, a numeric ID, a license plate number, an alphanumeric ID, a globally unique ID (GUID), etc. Thus, GPS information 2720 can include a location of the second vehicle at a time when the image was acquired. In this way, the first vehicle can obtain a same image from a same location. Object information 2724 may be as defined in conjunction with FIG. 28A. Images 2728 can be one or more images taken by the second image acquisition devise for the first image acquisition devise.

FIG. 28 illustrates an example data structure 2800 in accordance with examples of the present disclosure. The data structure 2800 may include one or more of an Object ID 2806, Height 2808, Width 2810, Center 2812, and Location of Center 2814 and may store information associated with one or more objects as explained in conjunction with FIGS. 22A-22E, objects 2604, 2608, 2612, 2616, 2620, and 2606, 2610, 2614, 2618, and 2626 as shown in FIGS. 26A and 26B. The processor 204 may access one or more elements of the data structure 2800 to store and/or retrieve object information, such as a height, width, and center of the box as well as well as a location of the center of the box within the image as described herein. Additional fields may be included as indicated by the ellipses 2820; additional objects may be stored in the data structure 2800 as indicated by the ellipses 2816. Data 2804 for an object having an Object ID of A45FA is further illustrated.

As explained in conjunction with FIGS. 22A-22E, objects 2604, 2608, 2612, 2616, and 2620 may be located within the image 2600, as shown in FIGS. 26A and 26B. Thus, at least one of the features in the second image comprises the objects 2604, 2608, 2612, 2616, 2620 and at least one of the parameters is the location of those objects the 2604, 2608, 2612, 2616, and 2620. Boxes 2606, 2610, 2614, 2618, 2622 may be drawn around the objects 2604, 2608, 2612, 2616, 2620. The center of the boxes may be determined for each box as previously described in conjunction with FIGS. 22A-22E. As shown in FIG. 26B, the location, enumerated by a number of pixels (e.g., as a vector length and angle or as a number of pixels in a horizontal direction 2664 and vertical direction 2668) from a vanishing point 2632. In this way, the calibration node at the first vehicle can use the calibration information for the second image acquisition device and the location of the second vehicle when the image was acquired to make a comparison to a similar image made by the first image acquisition devise of the first vehicle. The comparison can reveal where the vanishing point 2632 should be and how to determine the pitch and yaw of the camera as explained in conjunction with FIG. 26C.

At step 1820, calibration information, such as one or more previously described parameters, may be retrieved and/or obtained for the second image and/or for the second image acquisition device. Based on the calibration information associated with the second image and/or the second image acquisition device, as described above, one or more calibration parameters associated with the first image acquisition device may be modified. As one example, if an image including a first scene is obtained from the first image acquisition device, calibration parameters from a second image acquisition device for an image of the first scene may be obtained and may be utilized to update and/or modify the calibration parameters of the first image acquisition device. The method 1800 may end at step 1828. However, the calibration processes above may occur periodically to ensure the image acquisition devise remains calibrated.

Figure 19A:
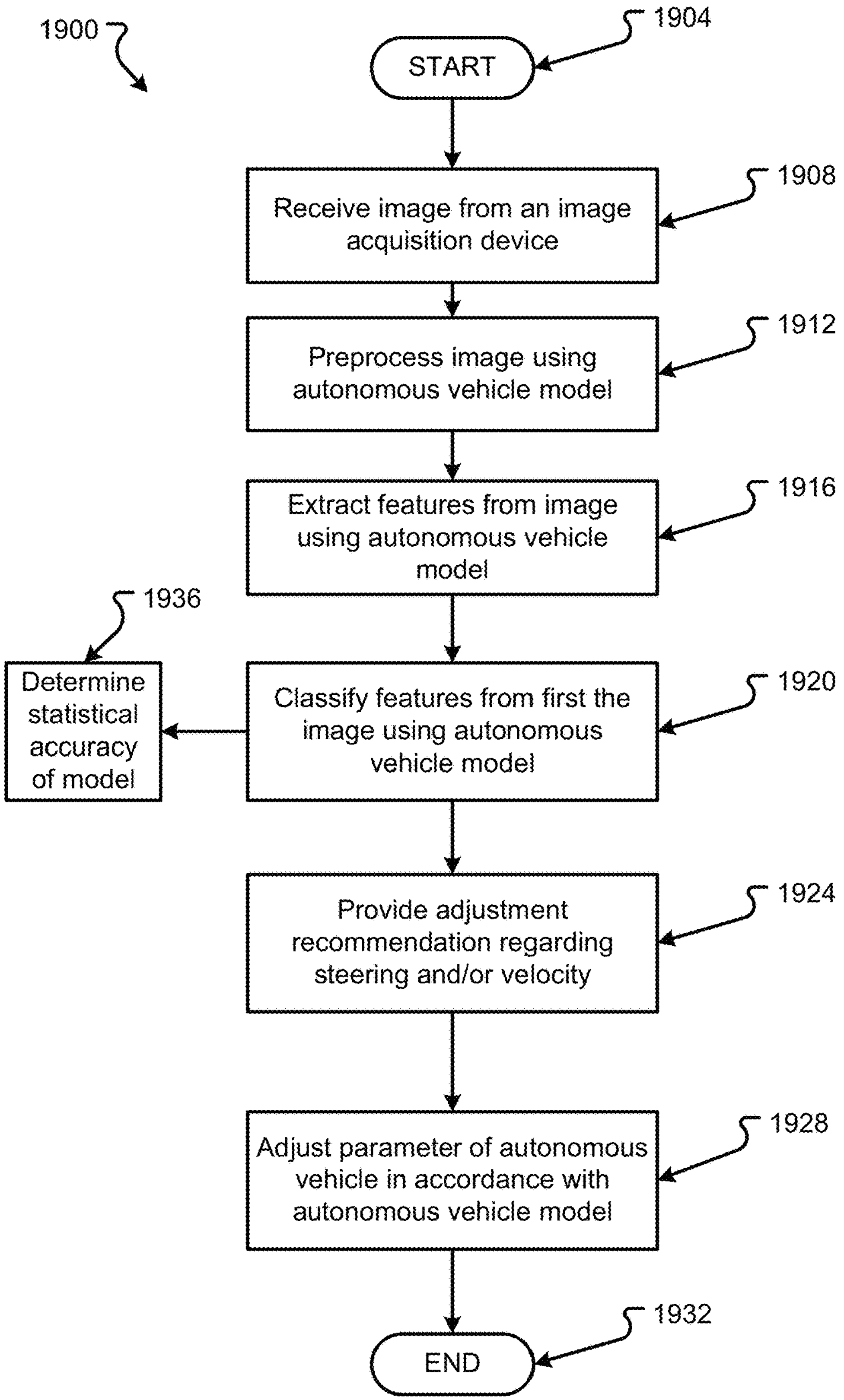
FIG. 19A depicts a method utilized to adjust one or more parameters of an autonomous vehicle based on an autonomous vehicle model in accordance with embodiments of the present disclosure.
Figure 19B:
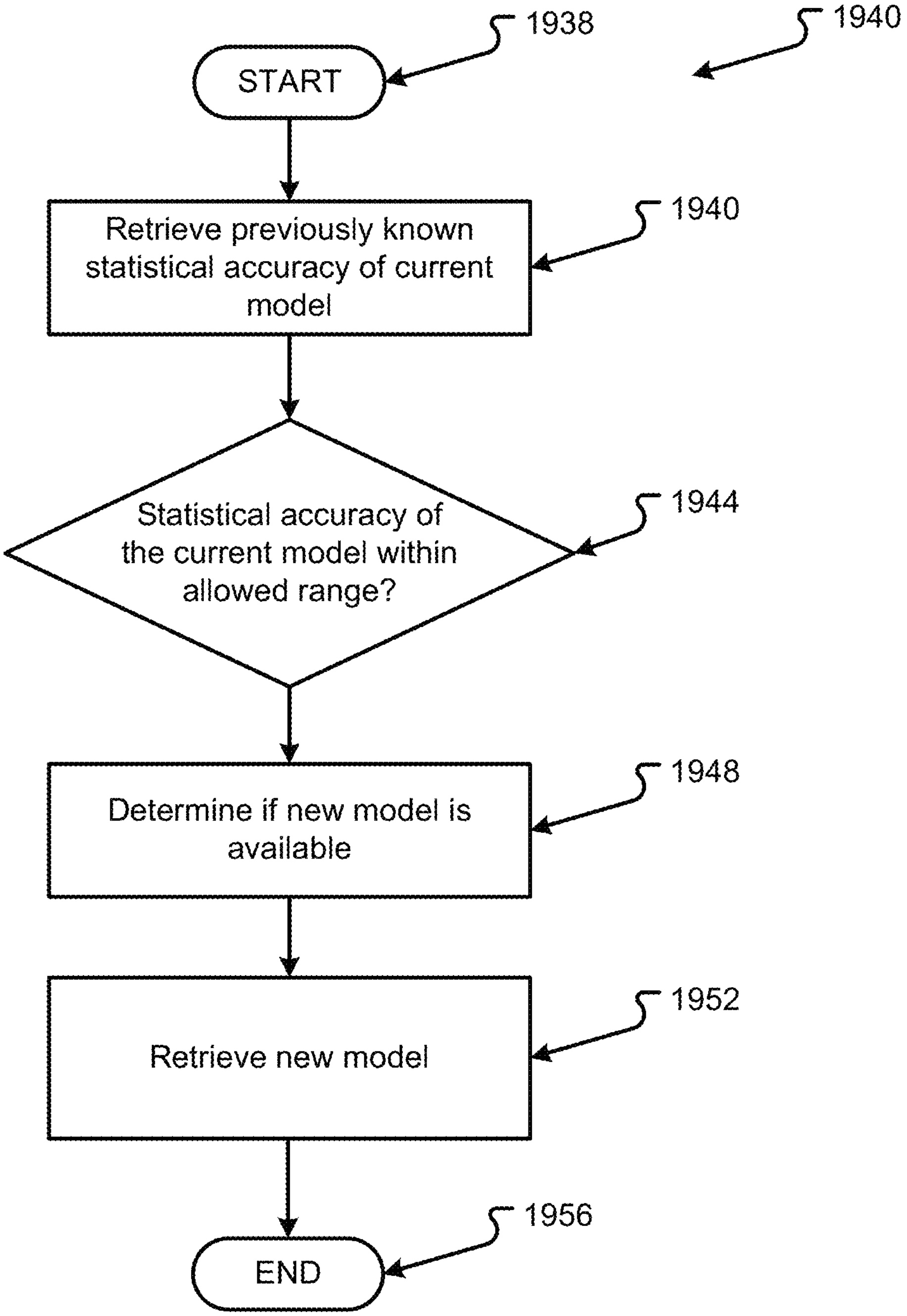
FIG. 19B depicts a method utilized to adjust one or more parameters of an autonomous vehicle based on an autonomous vehicle model in accordance with embodiments of the present disclosure.

FIG. 19A depicts a method utilized to adjust one or more parameters of an autonomous vehicle based on an autonomous vehicle model in accordance with embodiments of the present disclosure. As depicted in FIG. 19A, the method 1900 may begin at step 1904 where the method proceeds to receive an image from an image acquisition device at step 1908. At step 1912, the image may be preprocessed, as previously described, and one or more features may be extracted and classified at step 1916. At step 1920, features may be classified from the first image using the autonomous vehicle model and any adjustment may be recommended using the same autonomous vehicle model. At step 1928, the autonomous vehicle model may provide the recommendation to the steering angle adjust 468 and/or the velocity adjust 472 where a vehicle adjustment may be made. The method 1900 may then end at step 1932.

In accordance with embodiments of the present disclosure, a statistical accuracy of the model may be monitored over time. For example, as a result of the output prediction at 560 and/or the output of the vehicle adjust at 464, the number of and type of user engagements and/or disengagements may be monitored and correlated with an output accuracy of the autonomous vehicle model. Such correlating may occur at step 1936. In accordance with embodiments of the present disclosure, the statistical accuracy of the model from step 1936 may be utilized to determine if a new model 452 may need to be obtained, generated, and/or requested. That is, at step 1938, the method 1940 may retrieve a previous, or prior, statistical accuracy that was recorded by the method 1900 at step 1936. The statistical accuracy and/or method may vary over time but may be maintained in such a manner that the statistical accuracy does not drop below a certain threshold. For example, if the statistical accuracy of the model based on vehicle adjust output drops below being 94% accurate at step 1944, a request for a new model, or an updated node, may be made at step 1948 if such model is available at step 1952, the new model may be retrieved and/or provided by the autonomous vehicle model generation system 416 automatically. Statistically accuracy may include a measure of time for which user intervention was not needed vs a measure of time for which user intervention was needed. Alternatively, or in addition, statistically accuracy may include a measure of an output, such as a steering adjustment, throttle adjustment, and/or braking adjustment compared to a correct output, where a correct output may be from another vehicle, another system, a post processing technique (e.g., image data is processed at a location other than the autonomous vehicle and such processing may provide different steering angle adjustments, throttle adjustments, braking adjustments, than a model executing at the autonomous vehicle in real-time. In some instances, a statistical accuracy may be based on based on at least one of a quantity of course corrections or a quantity of course deviations, where a course correction includes determining that an input associated with a manual override was received. In some instances, a course deviation includes determining that a path traveled by an autonomous vehicle is different from a projected path traveled by the autonomous vehicle. For example, an actual path, due in part to user engagement/disengagement for example, may alter an actual path traveled by the autonomous vehicle from a projected path. The method 1940 may then end at step 1956.

Figure 20:
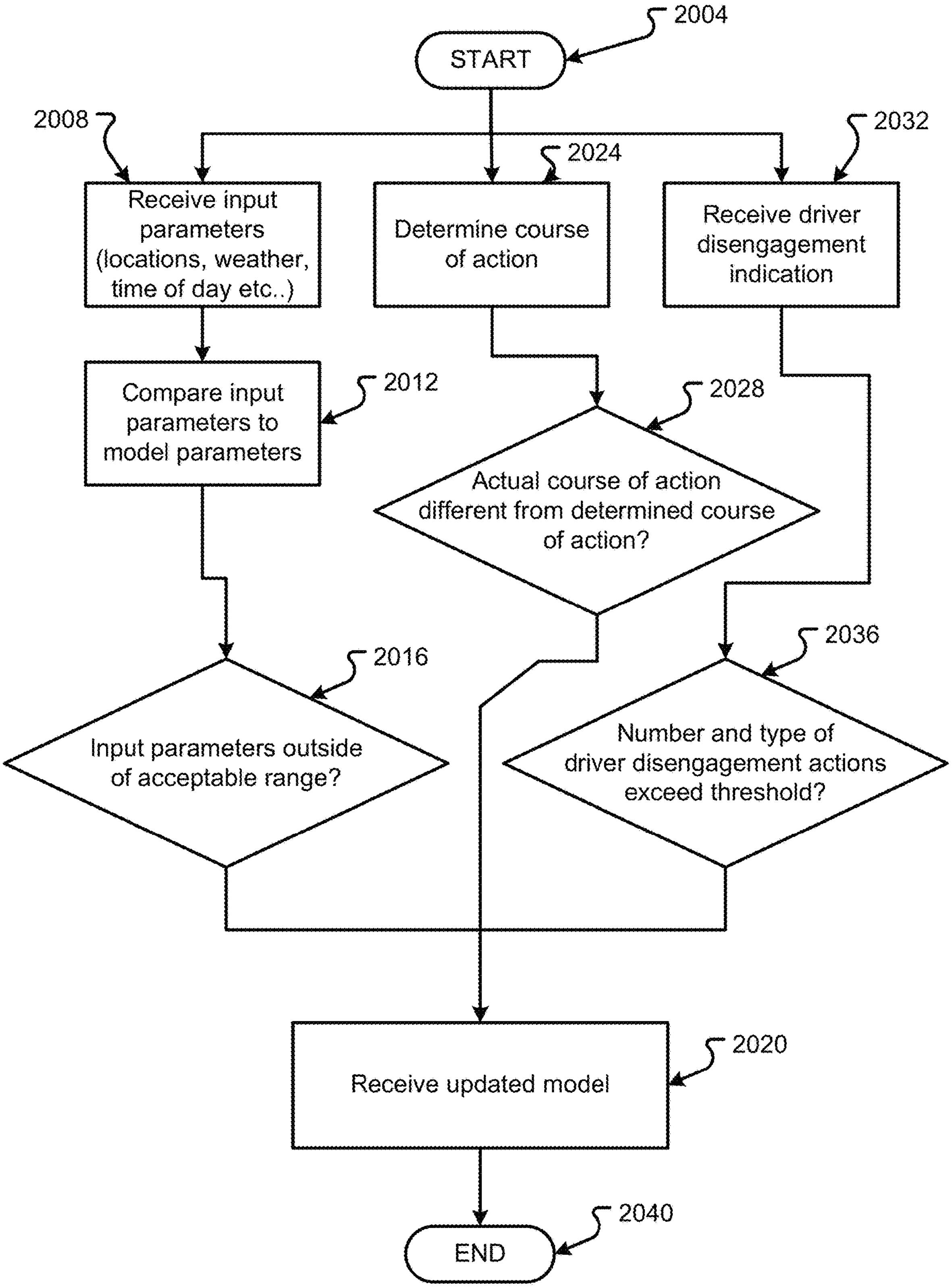
FIG. 20 depicts one or more methods for receiving and/or requesting a new autonomous vehicle model in accordance with embodiments of the present disclosure.

FIG. 20 depicts one or more methods for receiving and/or requesting a new model in accordance with embodiments of the present disclosure. The method 2000 may begin at step 2004 and may proceed to step 2008, where in a first instance, model input parameters may be evaluated to determine if the input parameters comply with model requirements. For example, an input for a location may be provided to a model, for example, autonomous vehicle model 452. A specific autonomous vehicle model 452 may be valid for a specified location. If the input location is outside the valid location, for example at steps 2012 and 2016, a new model may be requested and/or received. Similarly, such input parameters may apply to various times of day, various real-time weather conditions, various times of year, and/or various changes in a user/vehicle.

In accordance with examples of the present disclosure, an autonomous vehicle model 452 may be restricted to or otherwise limited to working within a geographic area or region. For example, an autonomous vehicle model 452 may only be approved, certified, or otherwise designated to operate in a specific region, such as but not limited to a mountainous region, a flat region, a hilly region, a dry region, a wet region, a snowy region, a city, an urban area, a rural area, a state, a territory, and/or a country. Accordingly, an input location may be received, for example, from a GPS receiver or otherwise, providing a location of an autonomous vehicle. If the autonomous vehicle approaches a boundary, such as a geofenced boundary, or otherwise a distance between the vehicle and/or the boundary is less than a threshold, the autonomous vehicle model 452 may be requested and/or otherwise received at the vehicle. In some instances, the autonomous vehicle model 452 may be pushed to the autonomous vehicle. The new autonomous vehicle model 452 may be associated with the approaching region such that the autonomous vehicle includes a geographically relevant autonomous vehicle model.

In accordance with some examples, one or more portions of an autonomous vehicle model may be associated with a period of time for which it is valid. For example, an autonomous vehicle model may be provided for a period of time for which it is most accurate, such as for a specific season (e.g., fall, winter, spring, summer), for a specific weather event (e.g., snow, thunderstorm, rain, hail, sand, etc.), or for another atmospheric condition, such as temperature changes, cloudiness, lighting condition, etc.).

In accordance with some examples, an autonomous vehicle model 452 or a portion of the autonomous vehicle model 452 may be updated. For example, a specific node (for example 304C) associated with identifying one or more lane markers may be updated at a first time, while a specific node (for example, 304I/304J) associated with controlling a steering angle of a vehicle may be updated at a second time. Alternatively, or in addition, both of the previously mentioned nodes may be updated at a same time. In some instances, the update may include a parameter, such as a single threshold; in other instances, an entire node may be replaced with a node included in the update.

In addition, a number of course deviations and/or corrections may be utilized to determine if a new autonomous vehicle model 452 is needed and/or should be updated. In accordance with embodiments of the present disclosure, a first course of action, such as providing a steering adjustment, may be determined at step 2024. If an actual steering adjustment is different from the suggested steering adjustment, for example at step 2028, a new autonomous vehicle model may be requested and/or received at step 2020. The method may end at step 2040.

Similarly, a number of driver engagements and/or disengagements may be monitored over time. As a number of driver engagements, that is a number of times a driver corrects a course of action (for example, provides a steering adjustment), changes a parameter or setting, and/or intervenes in some manner is tracked and if such number of interventions exceeds a threshold, a new model may be requested and/or received. Importantly, the threshold may vary in accordance with or otherwise based on time, location, date, weather, and/or other input parameters as previously described.

Figure 21:
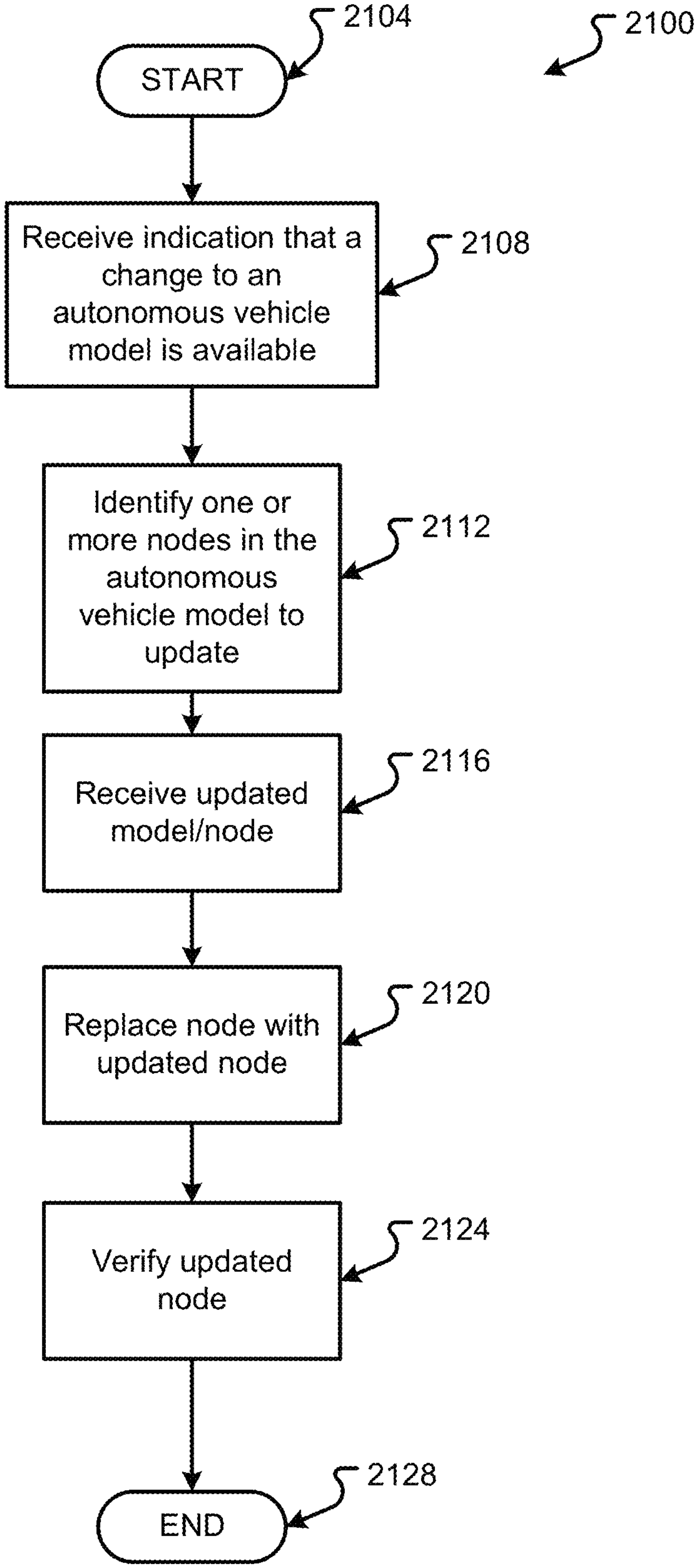
FIG. 21 depicts an example method directed to updating one or more autonomous vehicle models in accordance with embodiments of the present disclosure.

FIG. 21 depicts an example method 2100 in accordance with embodiments of the present disclosure. The method 2100 may be directed to updating one or more autonomous vehicle models as previously described. Alternatively, or in addition, the method 2100 may be directed to updating a portion of one or more autonomous vehicle models as previously described. That is, an entirety of an autonomous vehicle model 452 may be modified, updated, changed, and/or replaced in some instances, while in other instances, one or more nodes 304 of a model 452 may be updated, changed, modified, or deleted. Alternatively, or in addition, one or neurons, layer of neurons, and/or pooling and subsampling may be modified, deleted, added, or otherwise changed. As provided in FIG. 21, an indication that a change to an autonomous vehicle model 452 may be received at step 2108. At step 2112, one or more nodes, layers, neurons, nodes, etc. . . . may be determined to which the update received at step 2108 has been received. At step 2116, the updated mode and/or node may be received. At step 2120, the model and/or node may be replaced and verified at step 2124. The method may then end at step 2128.

The processor 204 may also continually monitor the rate of speed, rate of deceleration, and/or the rate of acceleration. Thus, based on sensor data from an accelerometer, the acceleration system 244, deceleration system 240, the image sensors, etc., the processor 204 can compare a rate of speed, acceleration, and/or deceleration to a predetermined threshold. IF the rate meets and/or crosses the threshold, the processor can take a predetermined action. For example, if the deceleration crosses a threshold, the processor 204 may automatically engage the hazard lights to warn of other vehicles approaching from behind of the increased deceleration. In other embodiments, the action may occur from measuring a change in rate of another vehicle being sensed by the image sensors.

The processor 204 can also monitor situations while the vehicle 104 is stopped but still in transit. For example, the processor 204 can receive image data associated with an intersection. When a traffic signal/light changes, e.g., goes from red to green, the processor 204 may start a timer. If the driver does not move the vehicle during a predetermined period of time, e.g., 2 seconds, the processor 204 can send a signal to the audio system of the vehicle 104 to create an audible alarm for the user. The period of time and the type and volume of the alarm may be configured by the user. Thus, the user can prevent situations where other people may honk at the user for stalling at a green light.

In some examples, the processor 204 may determine that an issue or condition exists with another object based on received image data. For example, at an intersection, a light may change from red to green; however, a vehicle in front of the autonomous vehicle may not move. Thus, the processor may determine that an issue exists with another vehicle in proximity to the autonomous vehicle having the processor.

In still other situations, the processor 204 can monitor other conditions in the driving environment. For example, the processor 204 may monitor the location, speed, direction, and other characteristics of the lanes and other vehicles to the side and behind the vehicle 104. If a situation arises that may result in an accident, the processor 204 can send an audible alarm or usurp driver control to keep the vehicle and the occupants in the vehicle safe. For example, the processor 204 can identify which lane the vehicle is in. The processor 204 can also continuously monitor and identify open lanes to the right or left of the vehicle 104. Should a another vehicle be approaching fast from the rear and present an imminent threat, the processor 204 can send an audible alert to the user to "Merge left immediately," or provide a similar announcement. In other situations, if the user does not respond to the alert or without giving an alert, the processor 204 can control the vehicle 104 to move automatically into the open lane or area.

Any of the steps, functions, and operations discussed herein can be performed continuously and automatically.

The exemplary systems and methods of this disclosure have been described in relation to vehicle systems and vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

In accordance with at least one example of the present disclosure, a method is provided, where the method includes: receiving sensor data associated with a driving environment of a vehicle; determining an object within the driving environment; determining if the object is a second vehicle; if the object is a second vehicle, changing an autonomous driving mode to follow the second vehicle automatically; and if the object is not a second vehicle, changing the autonomous driving mode to follow a lane viewed in the driving environment. At least one aspect of the above method includes where the sensor data is an image of the driving environment. At least one aspect of the above method includes where determining the object comprises automatically drawing a box over the object in the image. At least one aspect of the above method includes where determining the object comprises executing a machine learning model that identifies the object in the box as a vehicle. At least one aspect of the above method includes where the box delineates the extents of the object within the image. At least one aspect of the above method includes where a center of the box is determined. At least one aspect of the above method includes where to follow the second vehicle, a position of the center of the box is maintained in subsequent images. At least one aspect of the above method includes where the second vehicle is in a caravan with the vehicle. At least one aspect of the above method includes where determining if the object is a second vehicle comprises identifying the second vehicle as part of the caravan. At least one aspect of the above method includes where the second vehicle is identified by indicia on the vehicle. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: entering, by a first vehicle, an autonomous driving mode that follows a second vehicle; determining a change in a second position of the second vehicle while the first vehicle is following the second vehicle; determining if the change in the second position requires adjusting a first position of the first vehicle; if the change in the second position requires adjusting the first position of the vehicle, changing automatically the first position of the first vehicle to match the change in the second position; and if the change in the second position does not require adjusting the first position of the vehicle, ignoring the change in the second position. At least one aspect of the above method includes where the second position is determined by sensor data of a driving environment associated with the first vehicle, and wherein the sensor data is at least an image of the driving environment. At least one aspect of the above method includes where the second position is determined by drawing a box over the second vehicle in the image. At least one aspect of the above method includes where the box delineates extents of the second vehicle within the image. At least one aspect of the above method includes where a center of the box is determined. At least one aspect of the above method includes where to follow the second vehicle, the first vehicle automatically adjusts a steering angle to maintain a position of the center of the box in subsequent images. At least one aspect of the above method includes where, when turning, the position of the center of the box in a subsequent image is adjusted by at least one pixel. At least one aspect of the above method includes where the second vehicle is in a caravan with the first vehicle. At least one aspect of the above method includes where determining if an object in the image is a second vehicle comprises identifying the second vehicle as part of the caravan. At least one aspect of the above method includes where the second vehicle is identified by indicia on the vehicle. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: entering, by a first vehicle, an autonomous driving mode that follows a second vehicle; determining a change in a second position of the second vehicle while the first vehicle is following the second vehicle; continuing to follow the second vehicle; and maintaining an association with the second vehicle without matching the change to the second position. At least one aspect of the above method includes where the second position is determined by sensor data of a driving environment associated with the first vehicle, and wherein the sensor data is at least an image of the driving environment. At least one aspect of the above method includes where the second position is determined by drawing a box over the second vehicle in the image. At least one aspect of the above method includes where the box delineates extents of the second vehicle within the image. At least one aspect of the above method includes where a center of the box is determined. At least one aspect of the above method includes where to follow the second vehicle, the first vehicle automatically maintains a steering angle to maintain a direction of the first vehicle while a visual location of the second vehicle changes position in subsequent images. At least one aspect of the above method includes where the second vehicle changes lanes and the first vehicle maintains a first position in another lane. At least one aspect of the above method includes where the second vehicle is in a caravan with the vehicle. At least one aspect of the above method includes where determining if an object in the image is a second vehicle comprises identifying the second vehicle as part of the caravan. At least one aspect of the above method includes where the second vehicle is identified by indicia on the vehicle. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: receiving an indication of a second vehicle to follow, by a first vehicle, while in an autonomous driving mode, wherein the indication provides identifying information associated with the second vehicle; determining if the second vehicle is visible in an image from a sensor of the first vehicle; if the second vehicle is visible in the image from a sensor of the first vehicle, automatically associating the first vehicle with the second vehicle to cause the first vehicle to follow the second vehicle automatically; and if the second vehicle is not visible in the image from a sensor of the first vehicle, continuing to search for the second vehicle while autonomously driving in a different mode. At least one aspect of the above method includes where the second vehicle is in a caravan with the vehicle. At least one aspect of the above method includes where the first vehicle determines if an object in the image is the second vehicle. At least one aspect of the above method includes where determining if an object in the image is the second vehicle comprises identifying the second vehicle as part of the caravan. At least one aspect of the above method includes where the second vehicle is identified by indicia on the vehicle. At least one aspect of the above method includes where the second position is determined by drawing a box over the second vehicle in the image. At least one aspect of the above method includes where the box delineates extents of the second vehicle within the image, wherein a center of the box is determined, and wherein to follow the second vehicle, a position of the center of the box is maintained in subsequent images. At least one aspect of the above method includes where when the second vehicle is not visible in the image from a sensor of the first vehicle, the second vehicle provides breadcrumbs to the first vehicle to follow. At least one aspect of the above method includes where the breadcrumbs are Global Positioning Satellite (GPS) coordinates for the second vehicle at some moment in time. At least one aspect of the above method includes where the first vehicle and the second vehicle maintain a communication link when in the caravan. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: following a second vehicle, by a first vehicle, while in an autonomous driving mode; determining that the second vehicle is no longer visible in an image from a sensor of the first vehicle; locating a third vehicle to follow in the image; and changing the autonomous mode to follow the third vehicle. At least one aspect of the above method includes where the second vehicle deviates from a route of the first vehicle. At least one aspect of the above method includes where determining that the second vehicle is no longer visible comprises: determining an object within the image; and determining if the object is the second vehicle. At least one aspect of the above method includes where locating a third vehicle to follow in the image comprises automatically drawing a box over the third vehicle in the image. At least one aspect of the above method includes where the box delineates extents of the third vehicle within the image. At least one aspect of the above method includes where a center of the box is determined. At least one aspect of the above method includes where to follow the third vehicle, a position of the center of the box is maintained in subsequent images. At least one aspect of the above method includes where the third vehicle maintains a same route as the first vehicle. At least one aspect of the above method includes where when a third vehicle is no longer visible in the image, maintaining the same route while changing to second autonomous driving mode. At least one aspect of the above method includes where the second autonomous driving mode is a lane follow mode. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: receiving image data from an image sensor of a first vehicle, while in an autonomous driving mode; determining if a portion of the image data includes an edge defining a lane; determining if a second portion of the edge should be filtered; and filtering the second portion from the image data to smooth the edge of the lane. At least one aspect of the above method includes where determining if a portion of the image data includes an edge defining a lane comprises applying a machine learning (ML) model to analyze the image for the edge. At least one aspect of the above method includes where the ML model provide a set of two or more points on the lane that define a location of the lane in the image. At least one aspect of the above method includes where determining if a second portion of the edge should be filtered comprises comparing the location of a point to a previous location of an associated point in a previous image. At least one aspect of the above method includes where the location and the previous location deviate by more than a predetermined threshold, filtering out the point as defining the location of the lane. At least one aspect of the above method includes where the two or more points are positioned at predetermined intervals along a vertical axis of the image. At least one aspect of the above method includes where the predetermined threshold is greater for points lower in the image than points higher in the image. At least one aspect of the above method includes where the first vehicle automatically steers between the two or more points defining a first lane and the two or more points defining a second lane. At least one aspect of the above method includes where the first vehicle automatically steers to maintain a path of the vehicle a predetermined number of pixels from the two or more points defining a first lane. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: determining if one or more calibration parameters are available for an image acquisition device; if the one or more calibration parameters are not available for the image acquisition device: obtaining an image from the image acquisition device; determining a vanishing point for the image; modifying at least one of the one or more calibration parameters based on the determined vanishing point for the image. At least one aspect of the above method includes where the one or more calibration parameters include pitch and yaw of the image acquisition device. At least one aspect of the above method includes where the pitch is a first number of pixels, in a vertical direction, a center of an image is from the vanishing point. At least one aspect of the above method includes where the yaw is a second number of pixels, in a horizontal direction, the center of an image is from the vanishing point. At least one aspect of the above method includes where the vanishing point is determined from an object in the image. At least one aspect of the above method includes where an edge of the object helps determine the vanishing point. At least one aspect of the above method includes where an angle of the edge indicates a location for the vanishing point. At least one aspect of the above method includes where the object is a lane marker. At least one aspect of the above method includes where the object is a building. At least one aspect of the above method includes where the calibration parameters are stored and applied to subsequent images. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: receiving an image from a first image acquisition device; identifying one or more features in the image; obtaining one or more parameters associated with the identified one or more features; obtaining calibration information for one or more of the identified one or more features from a second image acquisition device; and calibrating the first image acquisition device based the one or more parameters and the calibration information from the second image acquisition device. At least one aspect of the above method includes where one or more features in the image comprises an object. At least one aspect of the above method includes where the one or more parameters associated with the identified one or more features comprises a location of the object in the image. At least one aspect of the above method includes where the location is a number of pixels from a vanishing point in the image. At least one aspect of the above method includes where the first image acquisition device is associated with a first vehicle. At least one aspect of the above method includes where the second image acquisition device is associated with a second vehicle. At least one aspect of the above method includes where the second vehicle also sends a location of the second vehicle when the calibration information for the second image acquisition device was obtained. At least one aspect of the above method includes where calibrating the first image acquisition device occurs periodically. At least one aspect of the above method includes where the calibration information includes pitch and yaw of the first image acquisition device. At least one aspect of the above method includes where the pitch is a first number of pixels, in a vertical direction, a center of an image is from the vanishing point, and wherein the yaw is a second number of pixels, in a horizontal direction, the center of an image is from the vanishing point. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: receiving a first autonomous vehicle model; determining that at least one of a location or a time associated with the first autonomous vehicle model has changed; and updating the first autonomous vehicle model to a second autonomous vehicle model based on the change in the at least one of the location or the time. At least one aspect of the above method includes: receiving an update to apply to the first autonomous vehicle model; and updating the autonomous vehicle model to the second autonomous vehicle model based on the received update. At least one aspect of the above method includes where the update includes one or more autonomous vehicle model parameters for a portion of the first autonomous vehicle model. At least one aspect of the above method includes where the first autonomous vehicle model is associated with a first geographical region and the second autonomous vehicle model is associated with a second geographical region that is different from the first geographical region. At least one aspect of the above method includes: determining an approval status of the first autonomous vehicle model in the first geographical region; and based on the approval status of the first autonomous vehicle model in the first geographical region, updating the first autonomous vehicle model to the second autonomous vehicle model. At least one aspect of the above method includes where the first autonomous vehicle model includes an autonomous driving mode that is not included in the second autonomous vehicle model. At least one aspect of the above method includes: determining that a distance between an autonomous vehicle and the second geographical region is less than threshold; and updating the first autonomous vehicle model to the second autonomous vehicle model based on the distance. At least one aspect of the above method includes: determining that a period of time associated with the first autonomous vehicle model has expired; and updating the first autonomous vehicle model to the second autonomous vehicle model based on the expiration of the period of time. At least one aspect of the above method includes where the period of time is based on at least one of a season, a weather event, or an atmospheric condition. At least one aspect of the above method includes where the first autonomous vehicle model is received at an autonomous vehicle. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: receiving a first autonomous vehicle model; detecting a condition associated with a performance of the first autonomous vehicle model; determining that the first autonomous vehicle model should be updated based on the detected condition; receiving at least one update for the first autonomous vehicle model; applying the at least one update; and generating a second autonomous vehicle model based on the at least one update. At least one aspect of the above method includes where detecting a condition associated with the performance of the first autonomous vehicle model includes determining that at least one of a quantity of course corrections or a quantity of course deviations exceeded a threshold within a period of time. At least one aspect of the above method includes where a course correction includes determining that an input associated with a manual override was received. At least one aspect of the above method includes where the input associated with the manual override includes one of a manual velocity change or manual steering angle change. At least one aspect of the above method includes where a course deviation includes determining that a path traveled by an autonomous vehicle is different from a projected path traveled by the autonomous vehicle. At least one aspect of the above method includes where the threshold varies based on one or more of time, location, date, or weather condition. At least one aspect of the above method includes where the at least one update includes one or more model parameters for a portion of the first autonomous vehicle model. At least one aspect of the above method includes: recording a location associated with one or more course corrections and/or course deviations. At least one aspect of the above method includes where the second autonomous vehicle model is received at an autonomous vehicle. At least one aspect of the above method includes where the second autonomous vehicle model is generated at an autonomous vehicle. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: receiving a statistical accuracy associated with a first autonomous vehicle model; determining that the statistical accuracy associated with the first autonomous vehicle model indicates that the first autonomous vehicle model is statistically incorrect; and updating the first autonomous vehicle model to a second autonomous vehicle model based on the determination that the first autonomous vehicle model is statistically incorrect. At least one aspect of the above method includes: receiving at least one update for the first autonomous vehicle model; applying the at least one update to the first autonomous vehicle model; and generating the second autonomous vehicle model based on the at least one update. At least one aspect of the above method includes where the at least one update includes one or more model parameters for a portion of the first autonomous vehicle model. At least one aspect of the above method includes where the statistical accuracy associated with the first autonomous vehicle model is based on at least one of a quantity of course corrections or a quantity of course deviations. At least one aspect of the above method includes where a course correction includes determining that an input associated with a manual override was received. At least one aspect of the above method includes where a course deviation includes determining that a path traveled by an autonomous vehicle is different from a projected path traveled by the autonomous vehicle. At least one aspect of the above method includes where determining that the statistical accuracy associated with the first autonomous vehicle model indicates that the first autonomous vehicle model is statistically incorrect includes determining that the statistical accuracy associated with the first autonomous vehicle model is less than a threshold. At least one aspect of the above method includes: providing the second autonomous vehicle model to an autonomous vehicle. At least one aspect of the above method includes: providing the second autonomous vehicle model to a second autonomous vehicle. At least one aspect of the above method includes where the second autonomous vehicle model is generated at an autonomous vehicle. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: receiving an update associated with a first autonomous vehicle model; determining one or more nodes of the first autonomous vehicle model that are to be updated based on the received update; and applying the update to the determined one or more nodes of the first autonomous vehicle model to generate a second autonomous vehicle model. At least one aspect of the above method includes where applying the update to the determined one or more nodes of the first autonomous vehicle model includes replacing the determined one or more nodes of the first autonomous vehicle model. At least one aspect of the above method includes where applying the update to the determined one or more nodes of the first autonomous vehicle model includes changing a parameter of the determined one or more nodes of the first autonomous vehicle model. At least one aspect of the above method includes where a first node of the one or more nodes is associated with at least one of changing a steering angle and/or changing a velocity of an autonomous vehicle. At least one aspect of the above method includes where a second node of the one or more nodes is associated with at least one of receiving an image, processing the image, identifying one or more objects in the image, and/or tracking the identified one or more objects in the image. At least one aspect of the above method includes where a second node of the one or more nodes is associated with at least one of determining a path for an autonomous vehicle to follow and/or determining an operating mode for an autonomous vehicle. At least one aspect of the above method includes where determining one or more nodes of the first autonomous vehicle model that are to be updated is based on at least one of a location or a time associated with the one or more nodes. At least one aspect of the above method includes: providing the second autonomous vehicle model to an autonomous vehicle. At least one aspect of the above method includes: providing the second autonomous vehicle model to a second autonomous vehicle. At least one aspect of the above method includes where the second autonomous vehicle model is generated at an autonomous vehicle. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: receiving an indication that an autonomous driving mode has been disengaged by a user; determining when a cumulative number of user disengagements of the autonomous driving mode, including the indication that the autonomous driving mode has been disengaged by the user, exceeds a threshold; requesting a portion of an autonomous vehicle model based on the cumulative number of user disengagements of the autonomous driving mode exceeding the threshold; and receiving the requested portion of the autonomous vehicle model. At least one aspect of the above method includes where a user disengagement of the autonomous driving mode includes implementing at least one course correction or correcting a course deviation. At least one aspect of the above method includes where a course correction includes determining that an input associated with a manual override was received. At least one aspect of the above method includes where the input associated with the manual override includes one of a manual velocity change or manual steering angle change. At least one aspect of the above method includes where a course deviation includes determining that a path traveled by an autonomous vehicle is different from a projected path traveled by the autonomous vehicle. At least one aspect of the above method includes where the threshold varies based on one or more of time, location, date, or weather condition. At least one aspect of the above method includes: generating a second autonomous vehicle model by applying the received requested portion of the autonomous vehicle model to an existing autonomous vehicle model. At least one aspect of the above method includes: storing a location associated with the indication that the autonomous driving mode has been disengaged by the user. At least one aspect of the above method includes where the requested portion of the autonomous vehicle model is based on the stored location. At least one aspect of the above method includes: providing the requested portion of the autonomous vehicle model to an autonomous vehicle. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: receiving image data from a sensor of a first vehicle; identifying a first object based on the image data; determining that the first object has changed; and determining that an issue exists when a parameter corresponding to a change of the first object does not change. At least one aspect of the above method includes: identifying a second object based on the image data; and determining that the issue exists with the second object when a parameter associated with the second object does not change based on the change of the first object. At least one aspect of the above method includes where the first object is a traffic light and the second object is a second vehicle. At least one aspect of the above method includes: determining that an issue exists with the second vehicle when the traffic light changes from red to green and a distances between the first vehicle and the second vehicle does not increase. At least one aspect of the above method includes: determining that an issue exists with the second vehicle when the traffic light changes from red to green and an acceleration of the second vehicle does not change. At least one aspect of the above method includes where the parameter corresponding to a change of the first object is an acceleration of the first vehicle. At least one aspect of the above method includes where the first vehicle is static. At least one aspect of the above method includes: receiving sensor data from a second sensor of the first vehicle; and determining that the issue exists when the sensor data from the second sensor exceeds a threshold. At least one aspect of the above method includes: providing a notification to a user of the first vehicle based on the determination that the issue exists. At least one aspect of the above method includes where the first object is a traffic light. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

In accordance with at least one example of the present disclosure, a method is provided, where the method includes: receiving sensor data from a sensor of a first vehicle while the first vehicle is in an autonomous drive mode; determining that a parameter of a second vehicle followed by the first vehicle has changed; determining that a quantity of parameter changes within a period of time exceeds a threshold; and when the quantity of parameter changes within the period of time exceeds the threshold, automatically storing a condition of the second vehicle. At least one aspect of the above method includes where the parameter of the second vehicle corresponds to a lane change. At least one aspect of the above method includes where the parameter of the second vehicle corresponds to at least one of a change in velocity and/or a change in acceleration. At least one aspect of the above method includes where the condition of the second vehicle is an assessment of the vehicle condition. At least one aspect of the above method includes where the first vehicle provides a message indicating the condition of the second vehicle. At least one aspect of the above method includes where the message is provided to the second vehicle. At least one aspect of the above method includes where the second vehicle is not in an autonomous drive mode. At least one aspect of the above method includes changing an operating parameter of the first vehicle based on the stored condition of the second vehicle. At least one aspect of the above method includes where the operating parameter includes a disengagement from the autonomous drive mode. At least one aspect of the above method includes associating the stored condition of the second vehicle with a previously stored condition of the second vehicle. In accordance with at least one example of the present disclosure, a system is provided, where the system includes a memory and a processor in communication with the memory, wherein the processor executes instructions stored in the memory, which cause the processor to execute the above method, at least one aspect of the above method, or combinations thereof. In accordance with at least one example of the present disclosure, a non-transitory computer readable medium is provided, where the non-transitory computer readable medium includes instructions stored thereon, which when executed by a processor cause the processor to execute the above method, at least one aspect of the above method, or combinations thereof.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

What is claimed is:

1. A method comprising:

receiving sensor data from a sensor of a first vehicle while the first vehicle is in an autonomous drive mode;

determining that a parameter of a second vehicle followed by the first vehicle has changed, wherein the second vehicle is not in an autonomous drive mode;

determining the changed parameter indicates a condition that affects safe operation of the second vehicle; and providing, by the first vehicle and to the second vehicle, a message including an instruction, which causes an autonomous drive system, of the second vehicle, to:

autonomously enter the autonomous drive mode, where the autonomous drive system of the second vehicle assumes control of the second vehicle from a human driver; and autonomously pull over, using the autonomous drive system, the second vehicle from a roadway.

2. The method of claim 1, wherein the parameter of the second vehicle corresponds to a lane change.

3. The method of claim 1, wherein the parameter of the second vehicle corresponds to at least one of a change in velocity and/or a change in acceleration.

4. The method of claim 1, further comprising: determining that a quantity of parameter changes within a period of time exceeds a threshold wherein the condition of the second vehicle is an assessment of the vehicle condition.

5. The method of claim 4, further comprising: when the quantity of parameter changes within the period of time exceeds the threshold, automatically storing a condition of the second vehicle.

6. The method of claim 5, wherein the message is provided to a third party.

7. The method of claim 6, wherein the second vehicle waits for repair after pulling over.

8. The method of claim 7, further comprising: changing an operating parameter of the first vehicle based on the stored condition of the second vehicle.

9. The method of claim 8, wherein the operating parameter includes a disengagement from the autonomous drive mode.

10. The method of claim 9, further comprising associating the stored condition of the second vehicle with a previously stored condition of the second vehicle.

11. A system comprising:

a memory;

a processor in communication with the memory, wherein the processor executes instructions stored in the memory, which cause the processor to execute a method, the method compromising:

receiving sensor data from a sensor of a first vehicle while the first vehicle is in an autonomous drive mode;

determining that a parameter of a second vehicle followed by the first vehicle has changed, wherein the second vehicle is not in an autonomous drive mode;

determining that the changed parameter indicates a condition that affects safe operation of the second vehicle; and providing, by the first vehicle to the second vehicle, a message including an instruction, which causes an autonomous drive system, of the second vehicle, to:

autonomously enter the autonomous drive mode, where the autonomous drive system of the second vehicle assumes control of the second vehicle from a human driver; and autonomously pull over, using the autonomous drive system, the second vehicle from a roadway.

12. The system of claim 11, wherein the parameter of the second vehicle corresponds to a lane change.

13. The system of claim 11, wherein the parameter of the second vehicle corresponds to at least one of a change in velocity and/or a change in acceleration.

14. The system of claim 11, the method further comprising: determining that a quantity of parameter changes within a period of time exceeds a threshold.

15. The system of claim 14, the method further comprising: when the quantity of parameter changes within the period of time exceeds the threshold, automatically storing a condition of the second vehicle.

16. A non-transitory computer readable medium having stored thereon instructions, which when executed by a processor cause the processor to execute a method, the method comprising:

receiving sensor data from a sensor of a first vehicle while the first vehicle is in an autonomous drive mode;

determining that a parameter of a second vehicle followed by the first vehicle has changed, wherein the second vehicle is not in an autonomous drive mode;

determining that the changed parameter indicates a condition that affects safe operation of the second vehicle; and providing, by the first vehicle and to the second vehicle, a message including an instruction, which causes an autonomous drive system, of the second vehicle, to:

autonomously enter the autonomous drive mode, where the autonomous drive system of the second vehicle assumes control of the second vehicle from a human driver; and autonomously pull over, using the autonomous drive system, the second vehicle from a roadway.

17. The non-transitory computer readable medium of claim 16, wherein the parameter of the second vehicle corresponds to a lane change.

18. The non-transitory computer readable medium of claim 16, wherein the parameter of the second vehicle corresponds to at least one of a change in velocity and/or a change in acceleration.

19. The non-transitory computer readable medium of claim 16, the method further comprising: determining that a quantity of parameter changes within a period of time exceeds a threshold.

20. The non-transitory computer readable medium of claim 19, the method further comprising: when the quantity of parameter changes within the period of time exceeds the threshold, automatically storing a condition of the second vehicle.

* * * * *